Aug. 21, 1962 E. F. LINDQUIST 3,050,248

METHODS AND APPARATUS FOR PROCESSING DATA

Filed Sept. 21, 1955 22 Sheets-Sheet 1

INVENTOR
EVERET F. LINDQUIST

BY Mead, Browne, Schuyler & Burridge
ATTORNEY

INVENTOR
EVERET F. LINDQUIST

BY Mead, Browne, Schuyler & Beveridge
ATTORNEY

Aug. 21, 1962 E. F. LINDQUIST 3,050,248

METHODS AND APPARATUS FOR PROCESSING DATA

Filed Sept. 21, 1955 22 Sheets-Sheet 3

INVENTOR
EVERET F. LINDQUIST

BY Mead, Browne, Schuyler & Beveridge
ATTORNEY

METHODS AND APPARATUS FOR PROCESSING DATA

INVENTOR
EVERET F. LINDQUIST
BY- Mead, Browne, Schuyler & Burridge
ATTORNEY

INVENTOR
EVERET F. LINDQUIST

BY Mead, Browne, Schuyler & Beveridge
ATTORNEY

INVENTOR
EVERET F. LINDQUIST

BY Mead, Browne, Schuyler & Beveridge
ATTORNEY

INVENTOR
EVERET F. LINDQUIST
BY Neal, Brown, Schuyler & Beveridge
ATTORNEY

INVENTOR
EVERET F. LINDQUIST

BY Mead, Browne, Schuyler & Burridge
ATTORNEY

INVENTOR
EVERET F. LINDQUIST

BY Mead, Browne, Schuyler & Beveridge
ATTORNEY

INVENTOR
EVERET F. LINDQUIST

BY Mead, Browne, Schuyler & Beveridge
ATTORNEY

INVENTOR
EVERET F. LINDQUIST

BY Mead, Browne, Schuyler & Beveridge
ATTORNEY

INVENTOR
EVERET F. LINDQUIST

BY Mead, Browne, Schuyler & Beveridge
ATTORNEY

INVENTOR
EVERET F. LINDQUIST

BY Mead, Browne, Schuyler & Beveridge
ATTORNEY

INVENTOR
EVERET F. LINDQUIST

BY Mead, Browne, Schuyler & Beveridge
ATTORNEY

Aug. 21, 1962 E. F. LINDQUIST 3,050,248
METHODS AND APPARATUS FOR PROCESSING DATA
Filed Sept. 21, 1955 22 Sheets-Sheet 15
FIG. 22.
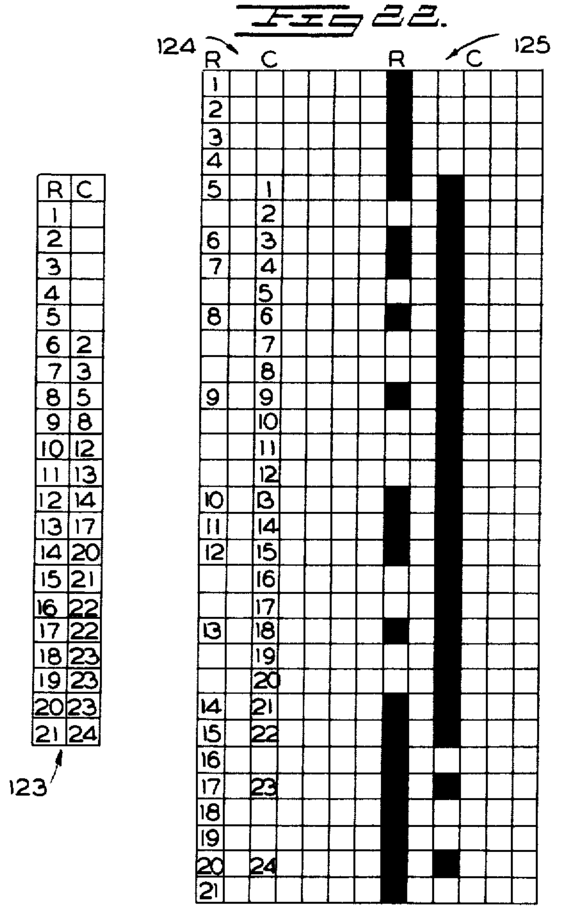
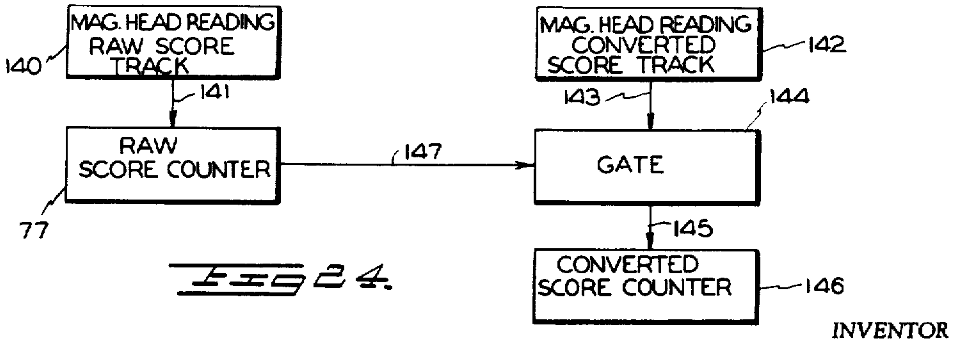
INVENTOR
EVERET F. LINDQUIST
BY Mead, Browne, Schuyler & Beveridge
ATTORNEY Aug. 21, 1962 E. F. LINDQUIST 3,050,248

METHODS AND APPARATUS FOR PROCESSING DATA

Filed Sept. 21, 1955 22 Sheets-Sheet 16

INVENTOR
EVERET F. LINDQUIST

BY Mead, Browne, Schuyler & Beveridge
ATTORNEY

INVENTOR
EVERET F. LINDQUIST
BY Mead, Browne, Schuyler & Beveridge
ATTORNEY

Aug. 21, 1962 E. F. LINDQUIST 3,050,248

METHODS AND APPARATUS FOR PROCESSING DATA

Filed Sept. 21, 1955 22 Sheets-Sheet 18

INVENTOR
EVERET F. LINDQUIST

BY- Neal, Brown, Snyder & Burridge

ATTORNEY

Aug. 21, 1962 E. F. LINDQUIST 3,050,248

METHODS AND APPARATUS FOR PROCESSING DATA

Filed Sept. 21, 1955 22 Sheets-Sheet 19

INVENTOR
EVERET F. LINDQUIST

BY Mead, Browne, Schuyler & Beveridge
ATTORNEY

INVENTOR
EVERET F. LINDQUIST
BY Mead, Browne, Schuyler & Beveridge
ATTORNEY

INVENTOR
EVERET F. LINDQUIST

BY Mead, Browne, Schuyler & Beveridge
ATTORNEY

INVENTOR
EVERET F. LINDQUIST

BY Neal, Brown, Schuyler & Burridge
ATTORNEY 3,050,248
Patented Aug. 21, 1962

3,050,248

METHODS AND APPARATUS FOR PROCESSING DATA

Everet F. Lindquist, Iowa City, Iowa, assignor to Measurement Research Center, Inc., Iowa City, Iowa, a corporation, not for profit, of Iowa Filed Sept. 21, 1955, Ser. No. 535,587
29 Claims. (Cl. 235—61.7)

This invention relates to methods and apparatus for processing data and more particularly to methods and apparatus for obtaining desired output data from a tremendous number of sources of original input or raw data.

The problems with which the present invention is concerned are well exemplified by objective testing programs in current use today. In the field of education, for example, more and more use is being made of mass testing programs to obtain desired educational information on a widespread, such as a statewide, basis. These testing programs can involve many thousands of pupils each of whom may be called upon to provide a great number of answers, say one thousand answers, in a given battery of tests. Obviously, the problem of merely scoring the tests for thousands of pupils wherein each test can involve say one thousand answers is a staggering problem.

The fact is that the problem is more than one of merely scoring the tests because, in the field of education, the so-called raw scores have to be converted into so-called converted scores of different types known in the educational field in order to obtain meaningful and useful information from an educational statistical standpoint. These converted scores must frequently be combined into weighted linear composites; sometimes several composites, involving different selected tests, as required from the same battery. Furthermore, summary data for groups of answer sheets (such as average scores for each group, or group variances and intercorrelations) must be computed, and conveniently organized, list or roster type reports giving the names of the examinees and their scores, or "report cards" for individual examinees, must be prepared. The problem of scoring is thus compounded by the problem of converting, analyzing and reporting the results.

Present techniques for meeting these problems relies primarily upon manual labor. To illustrate, when a large scale, say statewide, testing program has been administered, the marked answer sheets are sent to a central location for scoring and subsequent statistical work. At the central location, a staff of scorers visually inspect the marked answer sheets, using such mechanical aids as masks and stencils to lighten the burden, and determine the number of right and wrong answers for each answer sheet. This obviously time consuming procedure gives the so-called raw scores. Then, with the aid of such available equipment as automatic computing machines, statistical machines, automatic bookkeeping machines, typewriters, and the like, various operations are performed upon the raw score data to convert them into desired converted score data and to analyze and report the results.

The nature of the whole operation is such that a large staff of persons is needed at the central location and the size of the staff may be between fifty and one hundred persons for a single statewide testing program. Even with a well equipped staff of this kind, it takes weeks to accomplish the desired scoring, converting, analyzing and reporting operations. The problem is further aggravated by the fact that the staff is needed on only a temporary basis because wide scale testing programs may be given no more than annually. This means that each time a test processing operation is to be performed for a given administration of a testing program, it is necessary to reassemble a staff. This presents practical difficulties in personnel recruitment and these difficulties are a big factor in limiting the availability of wide scale testing programs.

By employing methods and apparatus in accordance with the teaching of the present invention, it is possible to perform the desired scoring, converting, analyzing and reporting operations in a matter of days, even hours, as compared to weeks. In other words, it is unnecessary to have a staff of from fifty to one hundred persons. In fact, if it were attempted to duplicate the speed of scoring, converting, analyzing and reporting possible by following the teaching of the present invention by employing a staff as described above, the size of the staff would have to be at least several hundred as compared to the above described size of between fifty and one hundred persons. Furthermore, the capabilities of methods and apparatus according to the present invention are such that many more converting, analyzing and reporting operations can be performed upon the raw score data without sacrificing, to any appreciable extent, the speed of completing the desired reports. Because relatively few operators are needed to perform the desired operations, the problem of periodic large staff recruitment is effectively eliminated.

While, as described above, methods and apparatus according to the teaching of the present invention have particular utility in the field of education, it will be apparent to those skilled in the art that such methods and apparatus also have utility in fields where the problems involved are similar to those described above in connection with wide scale testing programs in the field of education. For example, various Government agencies and private industry conduct aptitude and proficiency tests of varying degrees of scope. Such tests obviously present the problems of scoring and converting the raw score data and organizing them into reports of results indicative of various aptitudes with which the particular tests may be concerned. Census taking and mass surveys of various types, political and commercial for example, are other fields of activity where it is necessary to process a tremendous amount of initial data and then further process the information obtained according to desired final breakdowns applicable to the particular operation being performed.

Industry and commerce in general offer opportunities to utilize the teaching of the present invention. Examples of operations in these fields are the processing of time cards, inventory sheets, sales slips and the like where it is possible to enter the information or data in accordance with the teaching of the present invention and then process the card, sheet or slip and obtain and report the desired raw or converted information or data in accordance with the teaching of the present invention. Therefore, while the present invention is described in relation to its particular utility to wide scale testing programs in the educational field, its utility in relation to similar problems in other fields is to be kept in mind.

It is accordingly an object of the present invention to provide new and improved methods and apparatus for processing data to obtain desired output data from a tremendous number of sources of initial input data.

It is another object of the present invention to provide such methods and apparatus whereby the desired output data is obtained in but a fraction of the time that it takes to obtain such data by conventional means now known.

It is a further object of the present invention to provide such methods and apparatus whereby the output data obtained may be of different types according to the type of output data desired.

It is still another object of the present invention to provide such methods and apparatus whereby various types of output data as desired may be obtained without any appreciable sacrifice in speed as compared to the obtaining of relatively simple output data.

It is a still further object of the present invention to provide new and improved apparatus components for processing data at high speed to obtain desired output data from a tremendous number of sources of initial input data.

Briefly described, and again referring to wide scale testing programs in the education field, a preferred practice of the present invention comprises having each examinee enter his answers to the test questions in a predetermined manner, then automatically and in rapid succession comparing the answers on each answer sheet with the correct answers on a basic or key answer sheet, and simultaneously counting the correct answers for each test on the answer sheet in a separate counter for each test, and then, before each succeeding answer sheet is scored, automatically converting the raw scores obtained from the previous sheet into desired converted scores, securing various composites of these scores, cumulating the results for groups of answer sheets, and printing the individual and group results. A preferred embodiment of apparatus according to the teaching of the present invention comprises individual test, key or correct answer, and conversion code sheets, a memory means, sensing means, counting means, and means to move the various sheets in relation to the memory and sensing means so that the key answers and the conversion code are retained by the memory and each individual test answer sheet is compared by the sensing means with the key answers to obtain the raw score for each sheet. This raw score is thereafter processed according to the conversion code sensed from the memory to provide a desired converted score output for each answer sheet. The raw scores and the converted scores are preferably entered and retained in electronic type counters. Composites of these scores may also be entered in appropriate counters. Still other counters may be used to cumulate any of these scores for groups of answer sheets. Any of these scores, as desired, are printed out by means of a high speed output printer actuated in accordance with the particular count in a particular counter. In addition to the foregoing, methods and means are provided to enter, sense, and print out such alphabetic information as the examinee's name and such numeric information as his age; to obtain a graphic plotting of the frequency distribution of scores for the tests involved; and to obtain a graphic plotting of the frequency of correct responses to individual test items. High speed in the processing of data according to the teaching of the present invention is obtained by utilizing electronic components wherever practicable.

Other objects and advantages of the present invention will become more apparent from the following detailed description taken in conjunction with the attached drawings wherein:

FIG. 22 shows an example of a raw data to converted data relation;

FIG. 24 is a circuit diagram showing circuitry useful to obtain converted data totals where the raw data to converted data relation is like that shown in FIG. 22;

In view of the previously mentioned particular utility of methods and apparatus according to the teaching of the present invention in relation to wide scale testing programs in the education field, the following detailed description is concerned primarily with such utility. This, however, is without limitation as to the utility of such methods and apparatus in other fields wherein the problems encountered are similar to those encountered in relation to wide scale testing programs in the education field.

*Data Input*

In the case of wide scale testing programs, each examinee is a point of origin of initial or raw data, as it is usually called. The examinee supplies the answers to the test questions and the task thereafter is to "correct" his paper to obtain the so-called raw score totals and then convert the raw score information into desired converted score equivalents according to the particular educational statistical conversion system being employed, and to employ subsequent operations on these converted data.

Where thousands of examinees are involved, it is apparent that any practicable method of processing the raw test data must begin with some orderly or uniform procedure for obtaining the initial input data from the examinee. The teaching of the present invention may therefore be said to begin with the manner in which the examinee makes available the data which is to be subsequently processed. In computer terminology, this aspect of the present invention can be likened to coding of input data.

Figure 1:
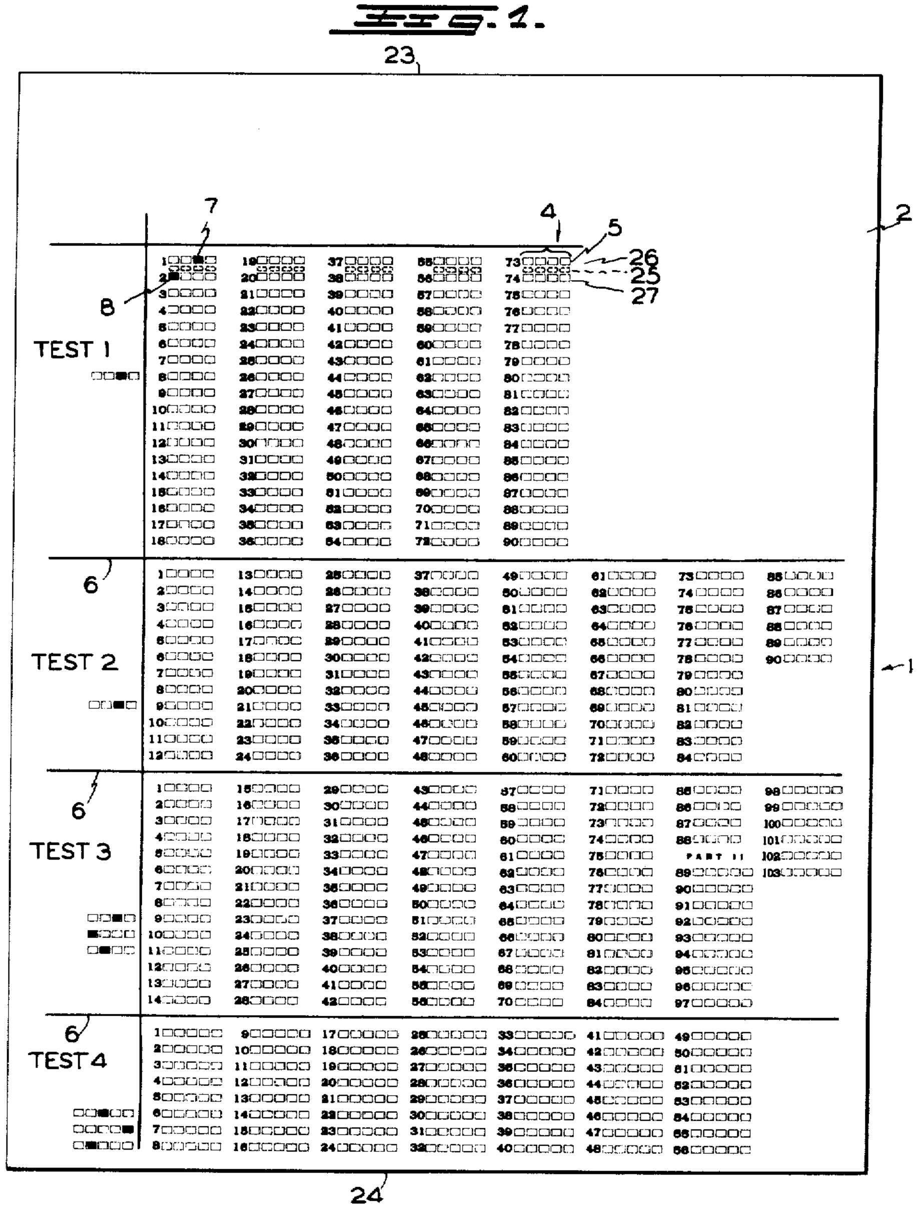
FIG. 1 shows the front side of an example of a test answer sheet according to the teaching of the present invention.
Figure 2:
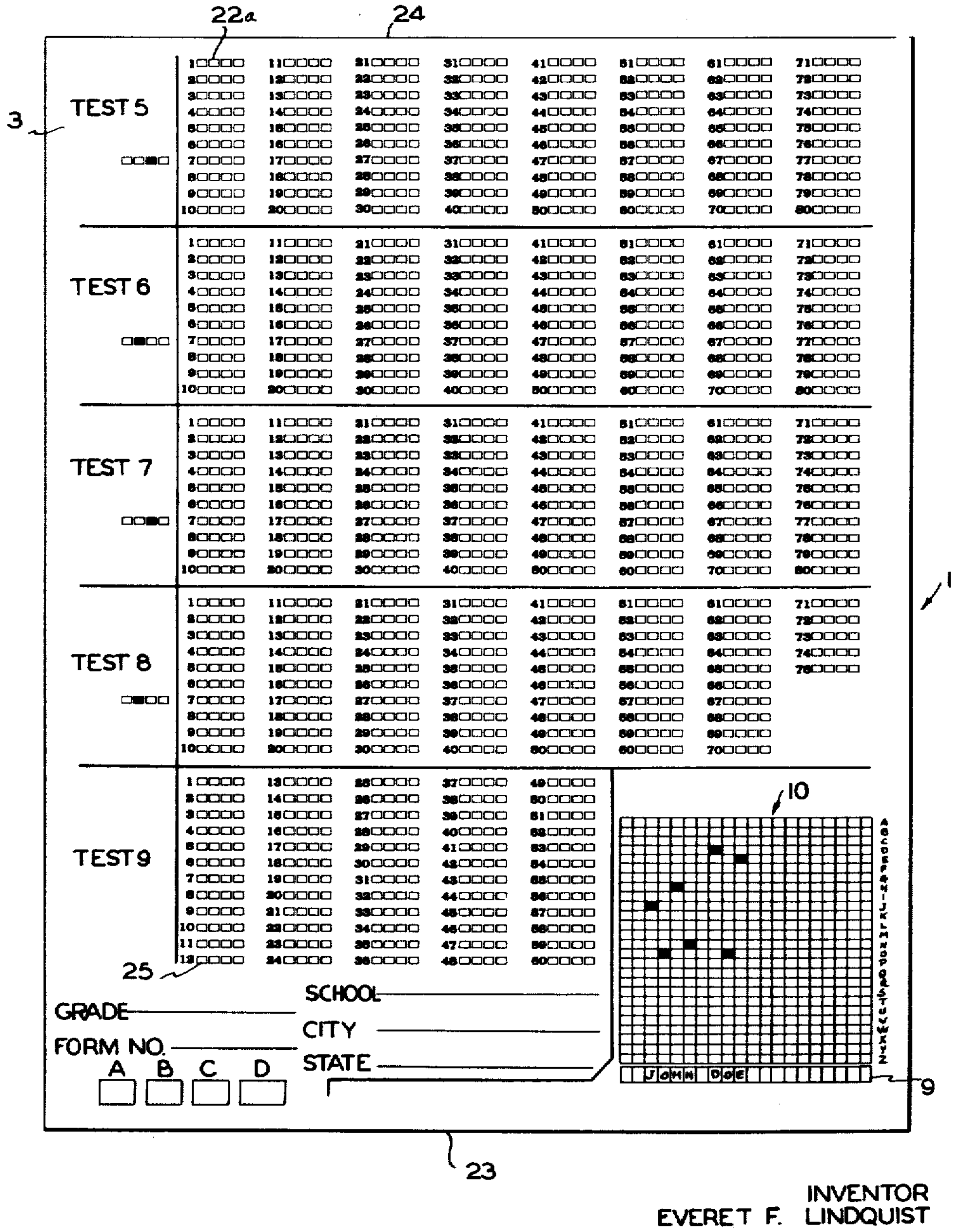
FIG. 2 shows the rear side of the sheet shown in FIG. 1.

A preferred medium according to the teaching of the present invention for obtaining the initial data or answers from each examinee is a sheet of homogeneous translucent material upon which the examinee marks his answers by pencil, or the like. The sheet may be made of homogeneous paper of the conventional 8½ x 11 size. Such a sheet is shown in FIGS. 1 and 2 where the sheet is designated generally by the reference numeral 1. FIG. 1 shows the front side 2 of the sheet and FIG. 2 shows the rear side 3 of the sheet.

Upon examining the front side 2 of the sheet, it is observed that there are a number of sets 4 of small boxes 5 printed or otherwise placed upon the surface 2 of sheet 1. The boxes in each set are arranged in a horizontal row and the sets themselves are in horizontal rows and vertical columns as shown in FIG. 1. Furthermore, groups of sets are separated by horizontal division lines 6. The same arrangement is provided on the rear side 3 of sheet 1 as is evident from an inspection of FIG. 2. The rows on the back of the sheet are interspaced between those on the front, in a manner and for a reason to be made clear later.

This arrangement provides groups of sets of boxes on the test answer sheet 1 thus accommodating a number of different tests on the same answer sheet. Thus, referring to FIG. 1, the uppermost group of sets of boxes can apply to Test 1, the next lower group can apply to Test 2, and so on. Depending upon the number of horizontal section lines 6 employed, it is possible to accommodate a greater or lesser number of different tests on the single answer sheet. Within each group, the sets of boxes can be numbered consecutively to correspond to the numbering of the questions applicable to that particular group.

The test answer sheet shown in FIGS. 1 and 2 is applicable to a multiple choice type of test wherein, for each test question, the examinee has to select one of a number of possible answers as the correct answer. Such a multiple choice type of test can range from a simple true-false type of test wherein there are two choices for each test question to any practicable greater number of possible choices. There are four boxes 5 in each set 4 in the group of sets applicable to Test 1 shown in FIG. 1, thus making this particular test applicable to a multiple choice test question wherein the examinee is to select one of four possible answers as the correct answer. In Test 3, some five box sets are included with four box sets thus indicating that for some of the questions in this particular test the examinee is to select one of five possible answers as the correct answer. Thus, in the embodiment of the test answer sheet shown in FIGS. 1 and 2, it is apparent that certain tests can involve as many as five possible choices for a particular test question. The equipment could be readily designed, if desired, to provide for any larger number of answers per question. However, by utilizing only two of the boxes in a particular set, it is likewise possible to utilize the test answer sheet shown in FIGS. 1 and 2 for a true-false type of examination.

In taking an examination utilizing the test answer sheet shown in FIGS. 1 and 2, the examinee is provided with a set of test questions for each test involved. The sets 4 of answer boxes 5 applicable to the test questions in the particular test involved are numbered as indicated in FIG. 1 to correspond to the test questions in that test and the position of each box in a set 4 of boxes 5 corresponds to a particular possible answer in the group of possible answers to the particular test question involved. Thus, referring to FIG. 1, assuming that for question 1 of Test 1, the third choice out of four possible choices is the correct answer, then the examinee will mark the third box in the upper left-hand set of boxes as indicated by the reference numeral 7. Assuming that the first choice is the correct answer for question 2 of Test 1, the examinee will fill in the first box in the set of boxes applicable to question 2 as indicated by the reference numeral 8 in FIG. 1. In this manner, the examinee proceeds through the test questions marking the appropriate box in each set of boxes applicable to each test with an ordinary lead pencil or the like until he has completed the answers to all of the tests involved in a particular test being given.

Referring to FIG. 2, the examinee will, at some appropriate time during the taking of the tests, usually at the beginning, have entered appropriate information in the blanks shown at the bottom of FIG. 2 and will have printed his name in a row 9 of boxes located at the lower right-hand corner of the rear side 3 of sheet 1 as shown in FIG. 2. There are twenty boxes in row 9 and, for purposes of illustration, the name "John Doe" is shown printed in seven of the twenty boxes in row 9. An alphabet grid, designated generally by the reference numeral 10, is located immediately above row 9 and it will be noted that grid 10 consists of twenty-six rows of boxes, each row containing twenty boxes and the respective boxes being arranged in vertical columns so that a column of twenty-six boxes appears above each box in row 9. The reason for the twenty-six boxes in each column is to provide for the entry in a particular box of a mark to designate a particular letter of the alphabet as indicated by the alphabet appearing along the right-hand edge of grid 10 in FIG. 2, although if desired the alphabet letters can appear in the applicable grid boxes themselves. Thus, again referring to FIG. 2, it will be observed that the appropriate boxes in the columns appearing above the letters making up the name JOHN DOE have been marked in accordance with their alphabet position in the grid. The manner in which the marks appearing in the alphabet grid 10 are utilized in automatically printing out the examinee's name in conjunction with the test results for the particular examinee is described more fully hereinafter. When each examinee has completed his test answer sheet, all of the test answer sheets can be collected for further processing in accordance with the teaching of the present invention.

The further processing is best accomplished at a location to which all of the individual test answer sheets are sent and where apparatus constructed in accordance with the teaching of the present invention is available for the further processing. In this further processing, a basic or key answer sheet is completed. Such a sheet, shown in FIG. 3 and designated generally by the reference numeral 11, contains marks corresponding to the correct answers to the test questions for the tests involved in the test answer sheet 1. Sheet 11 is a sheet of homogeneous translucent material, preferably paper.

Figure 3:
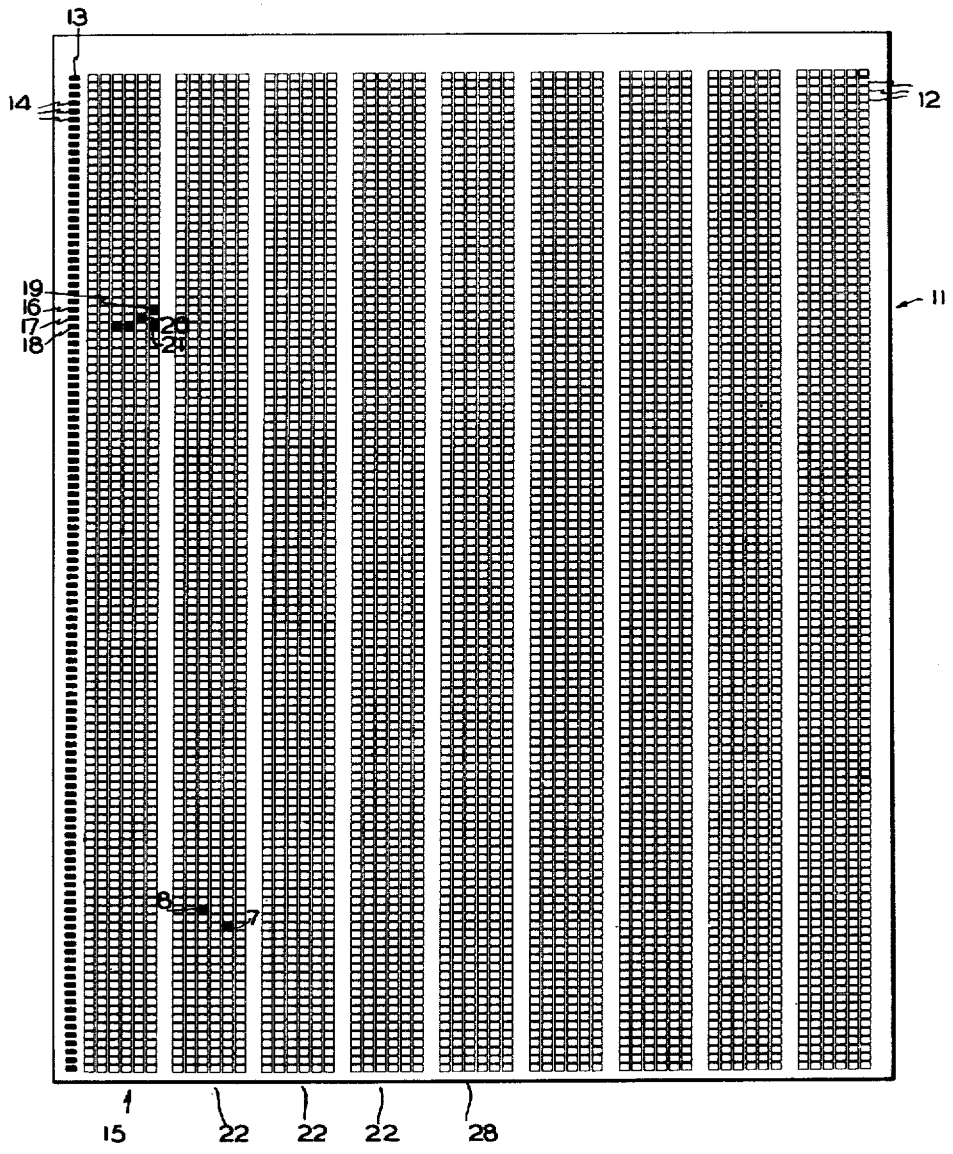
FIG. 3 shows an example of a key answer sheet according to the teaching of the present invention.

One hundred and twenty rows of boxes 12 are printed or otherwise suitably placed upon one side of sheet 11. The boxes in each row are divided into nine sets of six boxes each as is evident from an inspection of FIG. 3. This provides nine columns of sets of boxes. An additional column 13 consisting of one hundred and twenty black marks, hereinafter called "trigger" marks, appears along the left-hand edge of sheet 11 as shown in FIG. 3 and each black mark 14 is located in one of the rows including nine sets of boxes 12. In other words, each mark 14 is part of one of the one hundred and twenty rows.

In completing basic answer sheet 11, the left-hand column 15 of sets of boxes 12 is utilized for coding to determine to which of a number of counters the score data for a particular row is to be sent. Assuming that a total of sixteen individual counters is sufficient to accommodate all of the different tests involved in a given test answer sheet, i.e. that the number of different tests does not exceed sixteen, then a binary code utilizing up to four of the boxes in each set of boxes appearing in column 14 may be utilized. Of course, while a binary code is preferred, it will be apparent to those skilled in the art that other types of coding may be utilized if desired.

In utilizing a binary coding, the person completing the basic answer sheet will mark the appropriate box or boxes in each row of boxes in column 15 to designate the particular counter to which the score information for that row should be sent. Thus, referring to FIG. 3, binary coding has been entered in the rows designated by the reference numerals 16, 17 and 18. Since only sixteen counters have to be accommodated, it is necessary to utilize only four of the six boxes in each row in column 15 and, in the example shown in FIG. 3, the first four boxes proceeding from right to left in each row in column 15 are the four boxes utilized. In row 16, the extreme right-hand box 19 has been filled in and since this is the binary code for one, the score data for row 16 will go to counter 1. In row 17, the second box from the right, designated by the reference numeral 20, has been filled in and this is the binary code for 2 so the score data for row 17 will go to counter 2. In row 18, the fourth box from the right, the third box from the right, and the first box, all as designated by the reference numeral 21, have been filled in and this is the binary code for thirteen so the score data for this row will go to counter thirteen. In this manner, the person completing the basic answer sheet 11 can enter the desired code in column 15 for as many of the one hundred and twenty rows as are involved in the scoring operation. The further detailed description of how the code marks control and cause the sending of the score data for a given row to a designated counter is given hereinafter.

The remaining eight columns 22 appearing on the basic answer sheet 11 are utilized for entering the correct answers for the test items involved in test answer sheet 1. Referring back to FIGS. 1 and 2, it will be observed that there are eight columns of sets of boxes 5 appearing on the front side 2 and rear side 3 of sheet 1. In FIG. 1, the top edge 23 of sheet 1 is uppermost and the lower edge 24 of the sheet is lowermost. However, in FIG. 2, sheet 1 is positioned so that edge 24 is uppermost and edge 23 is lowermost. This is as if one took the sheet as shown in FIG. 1 and lifted it by its lower edge 24 to turn it upside down.

It is to be further noted from FIGS. 1 and 2 that the various rows of boxes 5 are spaced apart a sufficient vertical distance to accommodate another row of boxes between each pair of adjacent rows in a particular test section. The reason for this is that the rows of boxes appearing on one side of sheet 1 are offset vertically with respect to the rows appearing on the other side of the sheet so that when the sheet is held up to a light, one can see the rows on the side toward the light appearing between the rows on the side toward the viewer. This is shown in FIG. 1 where row 25, printed or otherwise suitably placed upon the rear side 3 of sheet 1, is shown as appearing between rows 26 and 27 located on the front side 2 of sheet 1.

By having the rows of boxes on each side of the test answer sheet offset in the manner described, it is possible to utilize both sides of the sheet in a sensing procedure as hereinafter described as if all of the rows were located on just one side of the answer sheet. Moreover, by having the offset arrangement, it is possible to provide greater separation of the rows on each side of the answer sheet, thus making easier the entry of test question numbers in connection with individual sets of boxes and also making it easier for the examinee to identify particular sets of boxes in each row.

In addition to being offset in the manner described, the boxes appearing on each side of the test answer sheet are precisely oriented or located so that every box appearing on the test answer sheet can be placed in registry with a box appearing on the basic answer sheet 11. Inasmuch as each column 22 of the basic answer sheet contains six boxes in a row, it is apparent that every column of the basic answer sheet can accommodate every column of the test answer sheet since no column of the test answer sheet has more than five boxes in a row. Thus, if the test answer sheet as shown in FIG. 2 is superimposed upon the basic answer sheet as shown in FIG. 3, the centers of the four boxes appearing in column 22*a* will coincide with the centers of the respective corresponding four boxes appearing in the left-hand column 22 of FIG. 3. As shown in FIGS. 2 and 3, the four boxes in each row of the left-hand column 22 which will thus correspond will be the four boxes proceeding from the right-hand edge of the left column 22.

Assuming that the top row shown in FIGURE 2 is the row that corresponds to the top row shown in FIG. 3, then the boxes appearing in the bottom row as shown in FIG. 1 will correspond to the boxes shown in the second row from the top in FIG. 3. This is but a repetition of the description that the rows of boxes on the front and back sides of sheet 1 are offset with respect to each other. Thus, proceeding vertically down the left-hand column 22 in FIG. 3, each alternate row of boxes in that column will correspond to a row on the same side of test answer sheet 1. Thus, for example, alternate rows in the left-hand column 22 will correspond to the rows in column 22*a*.

The person completing the basic answer sheet 11 therefore marks, as by pencil, a box in each set of boxes in the columns 22 appearing in FIG. 3 to enter the correct answer for the test question to which the set of boxes applies by virtue of its positional correspondence to a set of boxes appearing on the test answer sheet 1. The correct answers can thus be entered row by row until all of the rows of the test answer sheet have been accounted for and all of the correct information is marked on the basic answer sheet. As an illustration of the manner of entry of correct information on the basic answer sheet, reference is made again to FIG. 1 and the indicated marked box answers 7 and 8 on the test answer sheet. These marked box answers represent the assumed correct answers to the multiple choice questions of Test 1 involved. Thus, marked box 7 indicates that the examinee believed the third choice to be correct for say the first question of Test 1 while marked box 8 indicates that he believed the first choice is the correct answer for say test question 2.

As is described more fully hereinafter, when each examinee's test answer sheet is processed by apparatus according to the teaching of the present invention, the test answer sheet proceeds through the apparatus with the edge 23 leading. In other words, the test answer sheet is in the position shown in FIG. 2. The basic answer sheet proceeds through the apparatus with its edge 28 (see FIG. 3) leading. With such orientation, the correct answers corresponding to items 7 and 8 shown in FIG. 1 would appear in the left-hand column 22 as indicated in FIG. 3. This will be understood more readily when it is remembered that the showing of FIG. 1 is to be turned upside-down and viewed from the rear in order to have the test answer sheet in the position in which it is processed through the apparatus of the present invention. When the showing of FIG. 1 is turned upside-down and viewed from the rear, it is apparent that the marked answers 7 and 8 are in the lower portion of the left-hand column as they appear in the basic answer sheet of FIG. 3.

Another type of data normally put into the apparatus of the present invention prior to actual scoring of the examinee's test answer sheets is so-called conversion code data which, as is described more fully hereinafter, is used to determine the type of conversion to be performed on the raw score data. Various types of conversion input data may be prepared ahead of or concurrently with the preparation of the basic answer sheet and thus form a part of the over-all input data which is to be further processed in accordance with the teaching of the present invention. However, further description concerning the conversion aspect of the present invention is deferred for the present in order to proceed to a description of how the correct answer data is processed and the correct answer total secured inasmuch as the so-called converted scores are derived from the actual or raw scores.

*Input Data Sensing and Recording*

Figure 4:
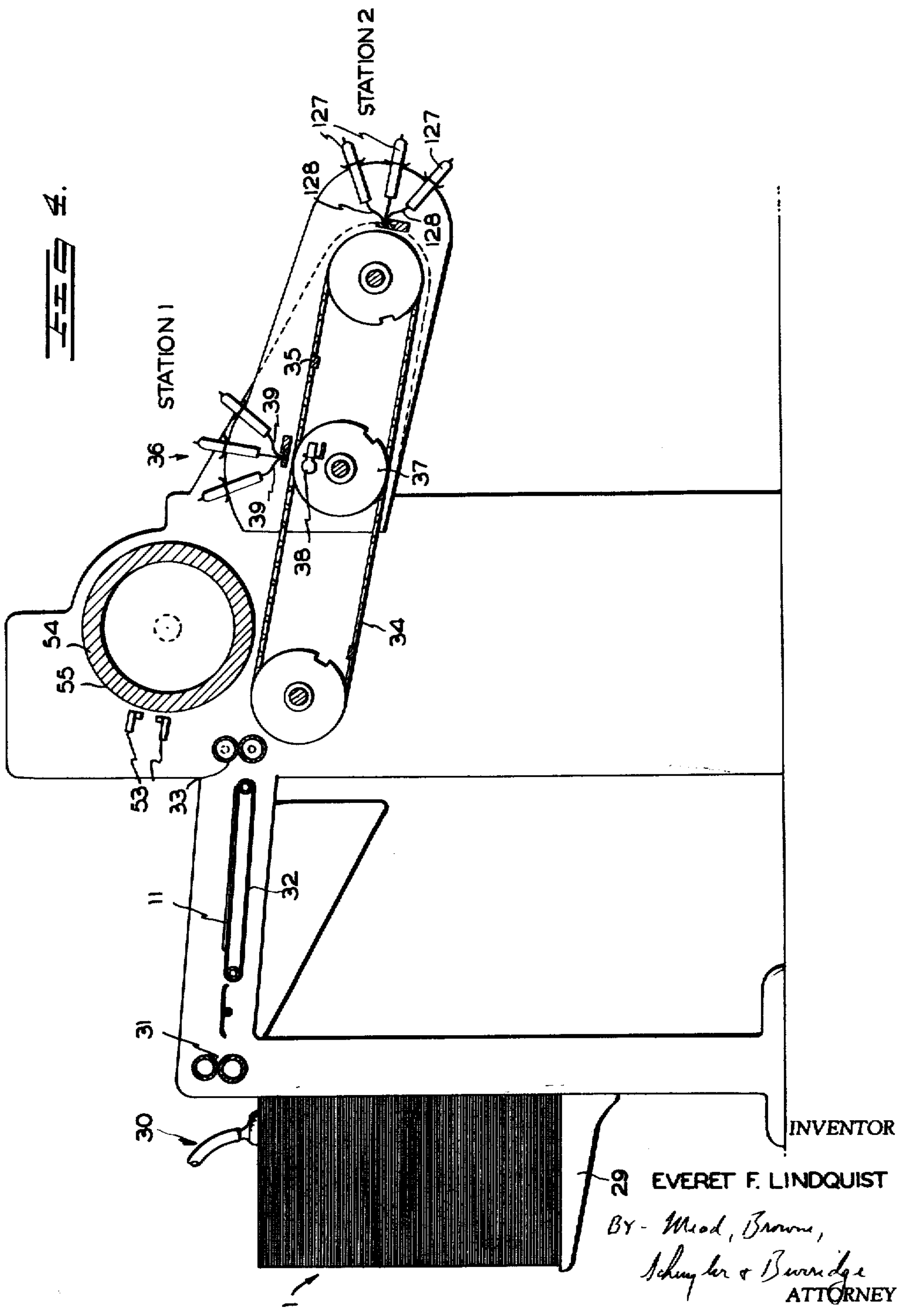
FIG. 4 is a side elevation view of a preferred embodiment of apparatus according to the teaching of the present invention.

After the basic answer sheet 11 has been completed as above described, the binary code and correct answer entries appearing on the sheet are sensed by electrical means and recorded in a memory or storage device for subsequent use in the data processing. A preferred apparatus for accomplishing this is shown in side elevation in FIG. 4 and in end elevation in FIG. 5. Referring to FIG. 4, the sheets to be processed may be stacked on a suitable support 29 from which they are successively picked up in rapid succession by a vacuum type pick-up indicated generally by the reference numeral 30. Each sheet is fed between rollers 31 onto an intermediate conveyor 32 where the sheet is properly aligned for subsequent travel. The sheet then goes between rollers 33 to a conveyor 34 where the leading edge of the sheet (edge 28 of the basic answer sheet 11 and edge 23 of each test answer sheet 1) is gripped firmly so that every sheet is conveyed by conveyor 34 in exactly the same position with respect to the conveyor as every other sheet conveyed by the conveyor. Such high-speed feeding and precise conveying apparatus is known generally in the art and no further detailed description of it is deemed necessary. Suffice it to say that the apparatus is capable of conveying every sheet through precisely the same path of travel. Since corresponding answer boxes are in exactly the same position on each sheet, this means that each corresponding answer box on each sheet travels through precisely the same path of travel.

Later in the description it is brought out that the preferred sequence for feeding sheets into the apparatus shown in FIG. 4 is to first feed a conversion code sheet into the apparatus, then a basic answer sheet 11, and then, in succession, the individual test answer sheets 1. However, at this point in the description, it is being assumed that the basic answer sheet is fed in first. Accordingly, the basic answer sheet 11 is shown as being on conveyor 32 in FIG. 4 with the individual test answer sheets 1 being on support 29 to follow, in rapid succession, the basic answer sheet. The spacing shown between sheet 11 and the sheets 1 remaining on support 29 is illustrative only as each sheet will follow its preceding sheet, no matter whether the preceding sheet is the basic answer sheet or one of the test answer sheets, in the same correctly spaced relation so that data sensing will be accomplished as is hereinafter described.

When the basic answer sheet 11 proceeds from conveyor 32 and then between rolls 33, the leading edge 28 of the sheet is gripped by suitable gripping means on gripper bars 35 carried by conveyor 34. Being thus held, the sheet is carried to the right as viewed in FIG. 4 and, in the process of its travel, it passes under a group of phototubes 36 located at Station 1 (see FIG. 4). In addition to being held by the gripping means on gripper bar 35, the sheet is supported from below by a plurality of relatively thin support discs 37 located below the phototubes at Station 1. The discs 37 are spaced apart transversely of conveyor 34 and the disc edges contact sheet 11 immediately beneath the spaces between columns 22 of sets of boxes 12 so as not to impede the transmission of light through sheet 11 in the space occupied by the various boxes in each column 22. Suitable light source means 38 directs light upwardly through the translucent sheet 11 and the light passes through the sheet in every column on sheet 11 except where light transmission is blocked out by marks placed on the sheet in the various boxes marked by the person completing the basic answer sheet. Of course, light transmission is also blocked at each black mark or what might be termed previously marked box, in the left-hand column of marks 13 on sheet 11.

Figure 5:
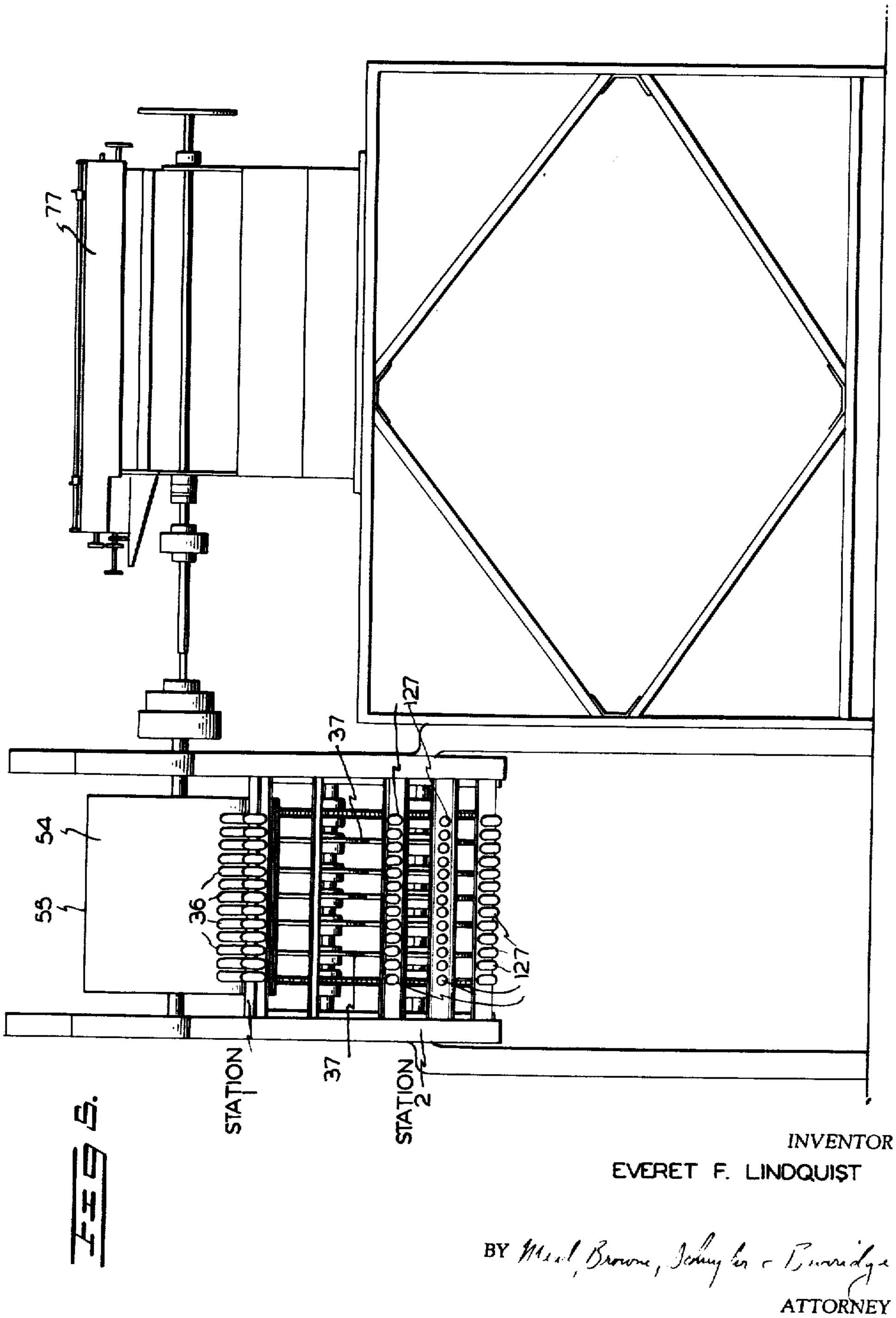
FIG. 5 is an end view in elevation of the apparatus shown in FIG. 4.
Figure 6:
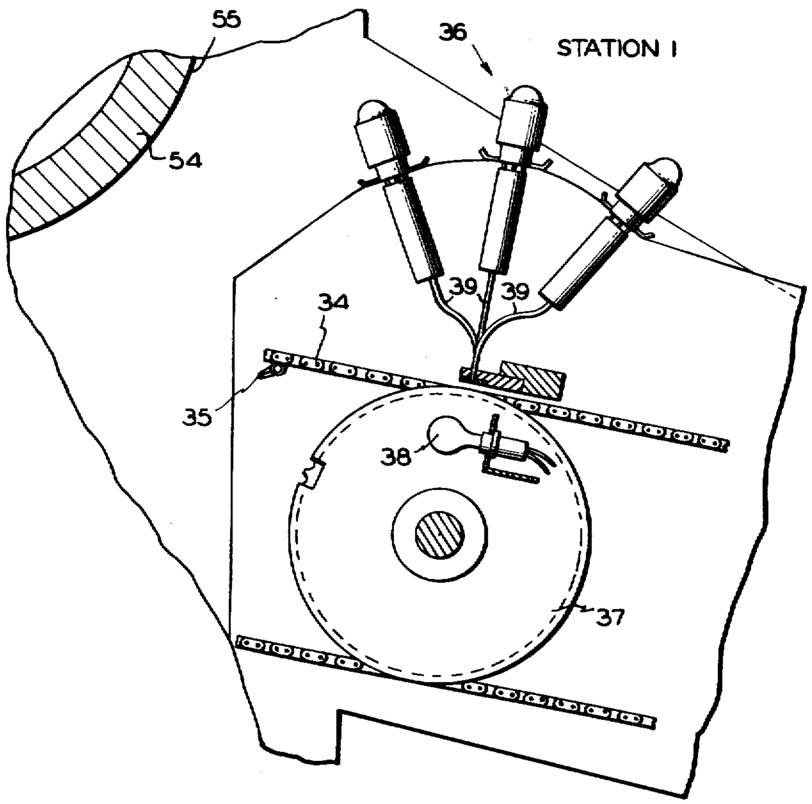
FIG. 6 is an enlarged detail view of a portion of the apparatus shown in FIG. 4.

There are fifty-five phototubes located at Station 1, thus providing one phototube for each of the fifty-five boxes in each row of boxes appearing on answer sheet 11. Inspection of FIG. 3 shows that there are nine sets of six boxes each making a total of fifty-four which, coupled with one of the marked or black boxes 14 appearing in column 13, makes the fifty-five boxes in each row. In order to accommodate the fifty-five phototubes within the space available, they are arranged in three groups as shown in FIGS. 4–6. Furthermore, because the boxes 12 in each row of answer sheet 11 are spaced so closely together in each set of boxes, the light from light source 38 is piped to each phototube by suitable light piping means 39 connected to each phototube. Lucite rods are preferred as the light piping means since, as is known, light directed into one end of a smooth surface Lucite rod will follow the longitudinal curvature of the rod and appear at the other end of the rod with substantially undiminished intensity. By employing small diameter Lucite rods, it is possible to space the rod ends sufficiently close together so that the center of each of the fifty-five rods 39 can be located over the respective centers of the fifty-five boxes appearing in each row of the answer sheet 11.

Figure 7:
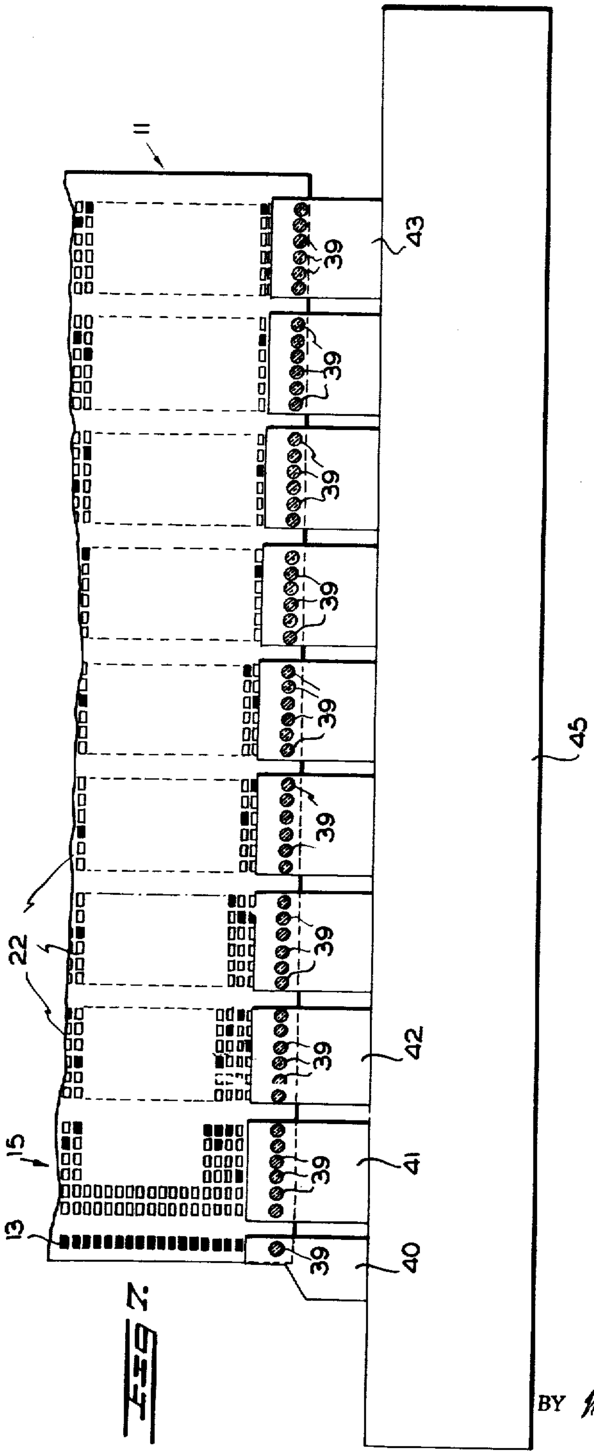
FIG. 7 is an enlarged plan view of a portion of the apparatus shown in FIGS. 4–6.

This disposition of the Lucite rods is shown in FIG. 7. As seen in this figure, the left-hand rod 39 carried by block 40 is directly over the vertical center line of column 13 on sheet 11. Similarly, the six rods carried by block 41 are over the vertical center lines of the six boxes making up the six columns in column 15 on sheet 11. Finally, the six rods in each remaining set of rods shown in FIG. 7 are centered over the respective boxes in each set in each of the columns 22 on sheet 11. The dimensional relation between the rods can perhaps be better realized from the fact that answer sheet 11 is preferably but 8½ inches wide. It is thus apparent that the rod ends are very closely spaced together.

Figure 8:
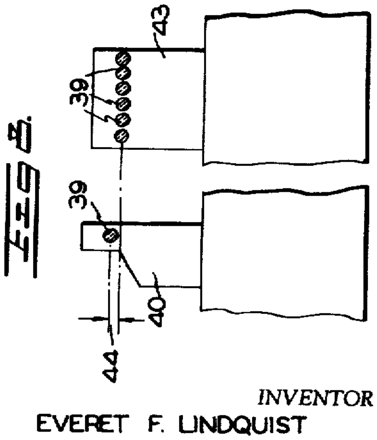
FIG. 8 is an enlarged detail view including a portion of the apparatus shown in FIG. 7.

The six rods carried by each block shown in FIG. 7 are so positioned that the centers of the rods in each block are in horizontal alignment. However, the line of centers of the rods 39 in block 41 is slightly advanced beyond the line of centers of the rods 39 in the adjacent right-hand block 42 shown in FIG. 7. In similar manner, the line of centers of the rods in each block proceeding to the right is offset behind the immediately adjacent left-hand block so that in block 43, which is at the extreme right as shown in FIG. 7, the line of centers of the rods carried by this block is offset farthest to the rear. The center of the single rod 39 carried by block 40 is slightly in advance of the line of centers of the rods 39 carried by block 41. This means that the greatest offset or displacement is between the center of rod 39 carried by block 40 and the line of centers of the rods 39 carried by the extreme right-hand block 43. This is shown in FIG. 8 where the space 44 represents this maximum offset and in the apparatus being described, the magnitude of the offset 44 is slightly less than the distance between rows from center to center, which is $\frac{1}{12}$ of an inch. As between adjacent mounting blocks 41 and 42, it is apparent that the offset between the line of centers of the respective rods carried by these blocks is but a slight fraction of an inch.

Because the various rod ends are offset in groups as just described, it is apparent that when a given row of boxes on sheet 11 passes beneath the rod ends, the first box in the row to become centered under a rod end will be the marked or black box 14 in column 13 since rod 39 carried by block 40 is ahead of all of the other rods in the entire row of fifty-five rods. Then, a minute fraction of a second later, the centers of the six boxes in column 15 will become centered under the six rod ends in block 41. Thus, in succession, even though the spacing is in but minute fractions of a second, the centers of the six boxes in each column 22 proceeding from left to right will come under the rod ends carried by the mounting blocks proceeding from left to right as shown in FIG. 7. The last set of six boxes in a complete row of boxes to pass under the rod ends will be the boxes in right-hand column 22 which pass under the rod ends carried by block 43.

Despite the fact that there is this offset arrangement, the last set of six boxes in a particular row of boxes on the answer sheet becomes centered under the rod ends carried by block 43 before the marked or black box 14 in the next succeeding row of fifty-five boxes passes under rod 39 carried by block 40. It is to be remembered, of course, that on the basic answer sheet all of the fifty-fixe boxes in a given row are in precise horizontal alignment. Furthermore, the manner in which the marked or black box 14 first passes under the rod end 39 carried by block 40 and the manner in which each set of six boxes then comes successively under its associated set of six rod ends makes it apparent that there is a serial positioning of the sets of boxes under the sets of rods for each row on answer sheet 11. Thus, assuming one hundred and twenty rows with six boxes arranged in nine columns in each row, there is a serial positioning of 1,080 sets of boxes wherein each of the 1,080 sets of boxes is exactly centered under its associated rod ends at a different instant of time from all of the other sets of boxes on the answer sheet. Put another way, and as is brought out more fully hereinafter, it is thus possible to effect a serial examination or scanning of the sets of boxes in each row and, in fact, of all of the sets of boxes on the answer sheet.

Lucite has been mentioned as being a preferred material for piping the light to each phototube. Preferably also, the Lucite is in rod form of small diameter circular cross-section. In actually mounting the Lucite rods 39 in the various mounting blocks, block 41 for example, care must be taken not to scar the smooth outer surface of the rod because this will permit light to escape at the scarred area and thus diminish, if not defeat, the light transmitting properties of the rod.

Figure 9:
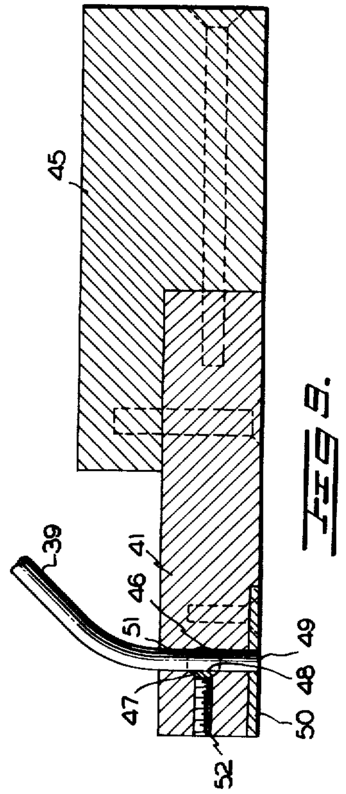
FIG. 9 is an enlarged sectional view taken on line 9—9 of FIG. 7.
Figure 10:
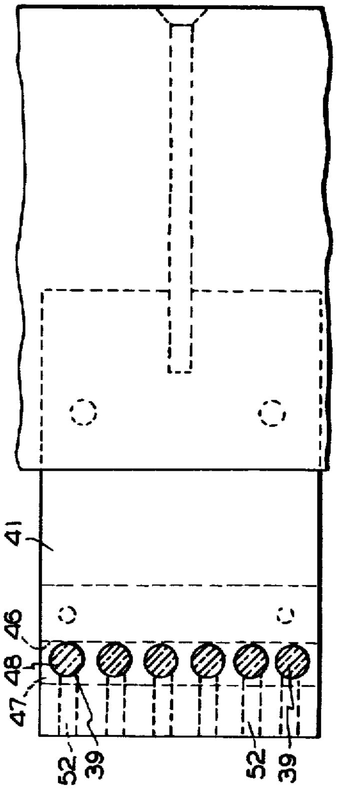
FIG. 10 is a plan view of the portion of the apparatus shown in FIG. 9.

To illustrate how this problem is met according to the teaching of the present invention, reference is now made to FIGS. 9 and 10. These figures show one of the mounting blocks, block 41 for example, which retains six of the Lucite rods 39. Block 41, like the other blocks 42, 43, etc., is attached by suitable means to a transverse bar 45 which extends transversely across the width of conveyor 34. Bar 45 and the various mounting blocks attached thereto are made of material of suitable strength, metal or plastic material, for example. In mounting the six Lucite rods 39, a circular opening 46 is drilled through block 41 from side to side as shown in FIGS. 9 and 10. Then, a solid rod of non-metallic material is placed in opening 46 and the length of the rod is such that it extends from side to side substantially the width of block 41. Furthermore, the diameter of rod 47 is such that it fits very snugly within opening 46, effectively filling the opening or passage from side to side of block 41.

Following this, six circular openings 48 are drilled or otherwise formed through rod 47 from top to bottom as shown in FIGS. 9 and 10, each opening 48 being of sufficient diameter to accommodate a rod 39. After the openings 48 have been thus provided, it is possible to place each rod 39 through mounting block 41 and through the opening 48 in transverse solid rod 47 until the very end 49 of the rod 39 is substantially flush with plate 50 which is mounted at the bottom forward portion of mounting block 41 as shown in FIG. 9. Plate 50 can be made of metal or other suitable material to provide a very smooth bottom surface with which the rod end 49 can be made precisely flush. It is understood, of course, that aligned openings 51 are provided in block 41 to line up with each opening 48 in tube 47.

After each rod 39 has been thus positioned in the mounting block 41, set screws 52 can be tightened against rod 47 to bind or retain the rods 39 in position. It is apparent that tightening of screws 52 will compress the rod 47 at the location where opening 48 extends through this rod and will thus cause the rod to be pressed firmly against the surface of Lucite rod 39. A preferred material for rod 47 is nylon as it is found that this material may be effectively tightened against the Lucite rods 39 without scarring the smooth outer surfaces of these rods. It is apparent that each of the six rods 39 can be individually positioned, its end 49 aligned with respect to the smooth undersurface of plate 50, and then the set screw 52 associated therewith tightened to retain the rod in position.

When the basic answer sheet 11 passes under the fifty-five Lucite rod ends 49, the answer sheet is practically in contact with these rod ends, being separated therefrom by a minute fraction of an inch. Therefore, the light from light source 38 will impinge upon and enter the Lucite rod ends 49 unless it is blocked from entering by the opacity of the answer sheet portion which happens to be immediately beneath a particular Lucite rod end 49 at a particular instant of time. Prior to the time that the leading edge 28 of the basic answer sheet starts to pass beneath the Lucite rod ends, light source 38 has of course been energized and the various phototubes 36 are likewise energized to detect the presence of marked boxes on the basic answer sheet. The various electrical connections for energizing the light source and interconnecting the phototubes for their proper action are omitted since it is well known to those skilled in the art how phototube sensing of this type is accomplished. Suffice it to say that when light from the light source is blocked from entering a particular Lucite rod end 49, the phototube to which that particular Lucite rod is connected will act to cause a signal which is utilized in a manner described hereinafter.

As the first row of boxes 12 passes under the fifty-five Lucite rod ends 49, and assuming that the basic answer sheet is traveling so that edge 28 is the leading edge the first row of boxes will be the row nearest this edge 28, the first box in the row which blocks light to the first Lucite rod end is a box 14 in column 13 at the left-hand edge of the basic answer sheet. The reason, of course, that a box 14 is the first to block light from light source 38 is that the Lucite rod 39 held by mounting block 40 is advanced slightly in front of the remaining sets of Lucite rods as has been previously mentioned. Thus, when this particular box 14 does block light to the Lucite rod 39 held by block 40, the phototube 36 fed by this Lucite rod sends a signal or electrical pulse to an electrical pulse generator which thereupon proceeds to emit a train of nine consecutive but very closely spaced apart electrical pulses. In fact, the spacing between the pulse is but a minute fraction of a second and corresponds to the interval of time taken for a set of boxes to travel the amount of the offset between the lines of centers of adjacent sets of Lucite rod ends. To repeat, for each row of answer boxes on sheet 11, the train of electrical pulses thus coincides with the physical positioning of the sets of answer boxes beneath the sets of Lucite rod ends associated with the sets of answer boxes. It is therefore apparent that each row of boxes on the basic answer sheet is treated as an indivisible unit in entering the correct answer information into the apparatus.

The nine closely spaced electrical pulses "triggered off" by the black mark 14 in column 13 forming a part of the particular row of boxes on the answer sheet which is passing beneath the Lucite rod ends 49 are fed to gates, the time of arrival of each pulse at each gate being coincident with the passage of a set of boxes under a set of Lucite rod ends. Thus, the first pulse of the pulse train will reach its gate at the time the six boxes in column 15 are centered exactly under the Lucite rod ends 49 held by block 41. The second through the ninth pulses reach their gates as the six boxes of each set in the remaining eight sets of boxes in each row become centered under the corresponding six Lucite rod ends.

If one of the boxes in a set of six boxes in a particular row has been marked, light to the corresponding Lucite rod end is blocked at the particular box location and the phototube associated with the particular Lucite rod whose end is blocked emits a signal which is fed to the associated gate which is also receiving one of the generator pulses. Characteristics of the gate are such that, upon receiving the two pulses, one being a pulse in the train of pulses generated by the pulse generator and the other being a pulse or signal from the particular phototube, the gate will pass the generator pulse which is fed through a suitable amplifying circuit and then to a magnetic induction head. In this manner, the boxes 12 appearing on the basic answer sheet are examined or scanned set by set in serial relation in each row of boxes appearing on the answer sheet and row by row until, assuming nine sets of boxes and one hundred and twenty rows of boxes, each of the 1,080 sets of boxes has been scanned. A generator pulse has appeared at the exact proper instant of time in conjunction with each set of six boxes and, if one or more of the answer boxes in the set has been marked, then this generator pulse passes through the gate associated with that particular set of boxes and this pulse goes to a magnetic induction head.

The magnetic induction heads 53, there being fifty-four of them, one for each of the fifty-four phototubes 36 (not including the tube reading the trigger marks), are mounted in operative relation to a rotary drum 54 forming part of the apparatus according to the teaching of the present invention. This is shown in FIG. 4, for example. The fifty-four magnetic induction heads are spaced apart axially on drum 54 so that, as the drum rotates, there are fifty-four portions of the drum width, or tracks, which pass beneath the magnetic induction heads. The ends of the magnetic induction heads are spaced very closely adjacent to, but two thousandths of an inch from, the surface 55 of drum 54.

Figure 11:
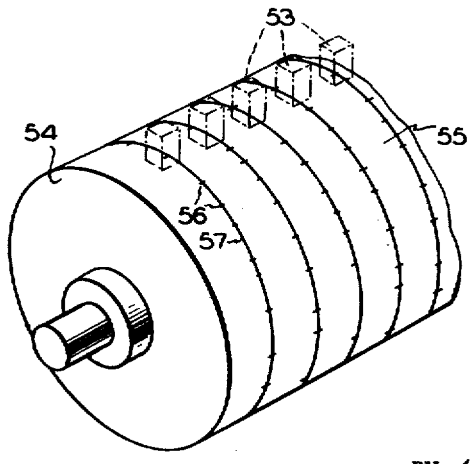
FIG. 11 is a schematic showing of an arrangement for recording data in a preferred embodiment of apparatus according to the teaching of the present invention.

This surface 55 is of suitably magnetizable material capable of being magnetized in discrete areas or bits, each bit retaining its magnetization for a relatively long period of time. The structural arrangement to provide such induction heads and magnetizable drum circumference are well known to those skilled in the art and no need is seen to go into detail on this aspect of the apparatus. Suffice it to say that each time that one of the magnetic induction heads is energized as a writing head, it magnetizes a very small discrete area or bit of the magnetizable drum surface 55 which hapens to be located immediately under the induction head end at that particular instant of time. This is shown schematically in FIG. 11 where five of the fifty-four magnetic induction heads are represented and the marks 56 appearing in each track 57 of the drum surface 55 represent discrete magnetized areas or bits on the magnetizable surface 55. It is to be understood, of course, that drum 54 is rigidly geared, by suitable means not shown, to rotate in synchronism with the movement of conveyor 34 so that, for every sheet passing under Station 1, the same portion of the drum surface 55 will be passing under the magnetic induction heads 53.

It is apparent, therefore, from what has been described that as basic answer sheet 11 travels under the fifty-five Lucite rod ends 49, each time that a marked box, such as boxes 7 and 8 shown in FIG. 3, comes under the Lucite rod end associated therewith, the associated magnetic induction head 53 will magnetize a bit on the circumferential surface 55 of drum 54. Furthermore, these magnetized areas or bits 56 will be located in a positional arrangement on the drum surface corersponding exactly to the positional arrangement of the various marked boxes appearing on the basic answer sheet 11. In other words, by virtue of the synchronized movement of the drum and the answer sheet, the temporal arrangement of the various magnetized bits and the marked answer boxes will be exactly the same. It will be appreciated by those skilled in the art that drum 54 is thus a magnetic drum type of memory for retaining the correct answer input information or data in the apparatus.

Figure 12:
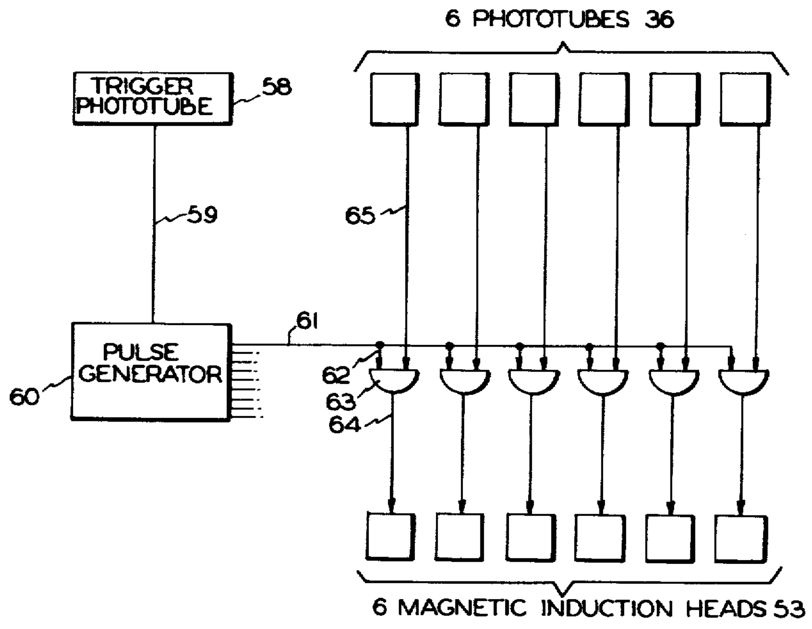
FIG. 12 is a circuit diagram showing circuitry useful for recording data according to the teaching of the present invention.

For a more complete understanding of the electrical circuitry involved in recording correct answer data on drum 54, reference is made to the block diagram shown in FIG. 12. In this figure, block 58 designates the phototube associated with the Lucite rod 39 held by mounting block 40 as shown in FIG. 7, this being the phototube which scans the black marks 14 in column 13. When this trigger phototube 58 senses a black mark 14 it emits a signal on line 59 to the pulse generator designated by block 60. Pulse generator 60 has a number of output lines, one for each of the nine sets of six boxes in the particular row being scanned, one of the output lines 61 being shown in FIG. 12. Thus, when a pulse appears on line 61, all of the input leads 62 connected to line 61 as shown in FIG. 12 feed the pulse into each of the six gates 63 shown in FIG. 12. Gates 63 are of a type known to those skilled in the art which will pass an output pulse to the output lead 64 of the gate only when both of the input leads to the gate are energized. An example of such a gate is a triode gate or a diode coincidence gate familiar to those in the computer art wherein it takes a coincidence of input pulses to obtain an output pulse. Inasmuch as gates of the type involved are well known to those skilled in the art, further detailed description is deemed unnecessary.

It is apparent therefore that whenever one or more of the six phototubes scanning a set of six boxes in a particular row senses a marked box, the particular phototube will cause a signal to appear on the output line 65 of the phototube. If this signal coincides with a signal on one of the lines 62 then a signal will appear on the output line 64 from the particular gate involved. The output lines 64 feed to six magnetic induction heads 53 and thus the magnetic induction head which is fed a signal from the particular line 64 leading thereto will magnetize a bit on surface 55 of the magnetic drum. The phototube, gate, and magnetic induction head circuitry shown in FIG. 12 is the same for the nine sets of such tubes, gates, and heads associated with each of the nine sets of six boxes each in each row appearing on answer sheet 11. Each set of six gates 63 is controlled by a different output lead of the pulse generator.

Figure 13:
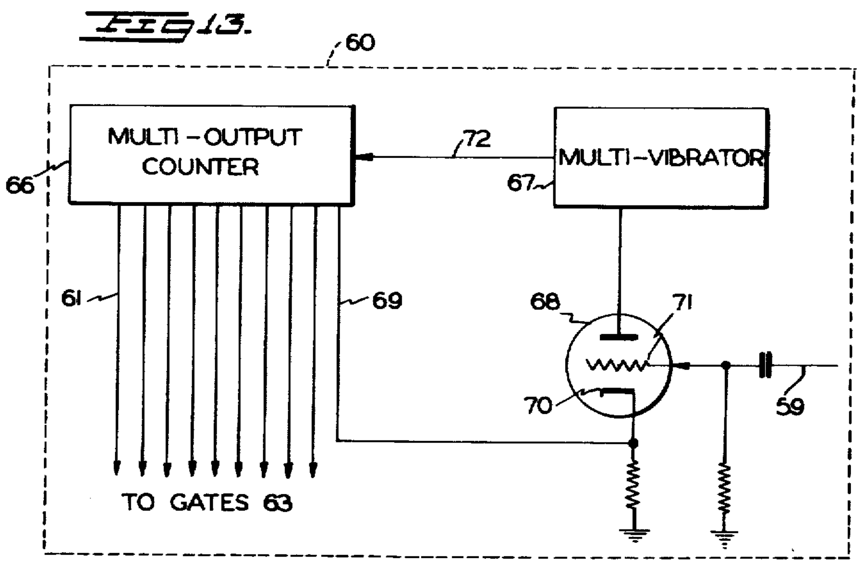
FIG. 13 is a circuit diagram showing, in greater detail, the pulse generator shown in FIG. 12.

FIG. 13 shows the pulse generator circuitry in greater detail. Thus, the pulse generator 60 is shown as comprising a multi-output counter 66, a multivibrator 67, and a control tube or gate 68. Counter 66 may be a multi-cathode gas filled counter tube but any counter which provides a separate output for each of its stable states may be used. Likewise, while a free running multivibrator is preferably used in conjunction with counter 66, any suitable device which will furnish a series of properly timed pulses to the counter may be used. Inasmuch as the structure of a counter and multivibrator of the type described is well known to those skilled in the art, further detailed description of these circuit components is believed to be unnecessary.

When output line 69 of counter 66 is energized, the potential of cathode 70 in control tube 68 is such that the tube is inoperative to start multivibrator 67 running. This may be described as the off or rest position of the counter. However, when a signal appears on line 59 originating at a trigger phototube 58, grid 71 is biased to cause tube or gate 68 to operate to start multivibrator 67 into operation. When the multivibrator starts operating it emits a series of pulses on line 72 feeding into counter 66 causing the counter to go into operation and shift its output from lead 69 to other output leads of the counter. Thus, assuming that the counter output is shifted to line 61, an output pulse appearing on this line is fed to each of the gates 63 shown in FIG. 12 for the duration of the output pulse. The rate of pulse emission from multivibrator 67 depends of course upon the resistance capacitance characteristics of the multivibrator and can be predetermined in advance to achieve a desired rate of pulse shift along the various output lines of the counter which lead to the respective sets of gates 63. In this manner, the pulse train appears on the various counter output lines until line 69 is again energized to bias cathode 70 to cause tube 68 to shut off and thus stop multivibrator 67 until another input pulse appears on line 59.

*Data Sensing and Scoring*

After the binary code data, which determines the counter to which the raw score total is to be sent for each test being scored, and the correct answer marks appearing in each of columns 22 on the answer sheet have been recorded as magnetized bits 56 on the surface of drum 54, the apparatus may then be used to score the individual test answer sheets 1. Preliminary to such scoring, the magnetic induction heads 53 are switched to become reading heads rather than writing heads by suitable means well known to those skilled in the art.

Figure 15:
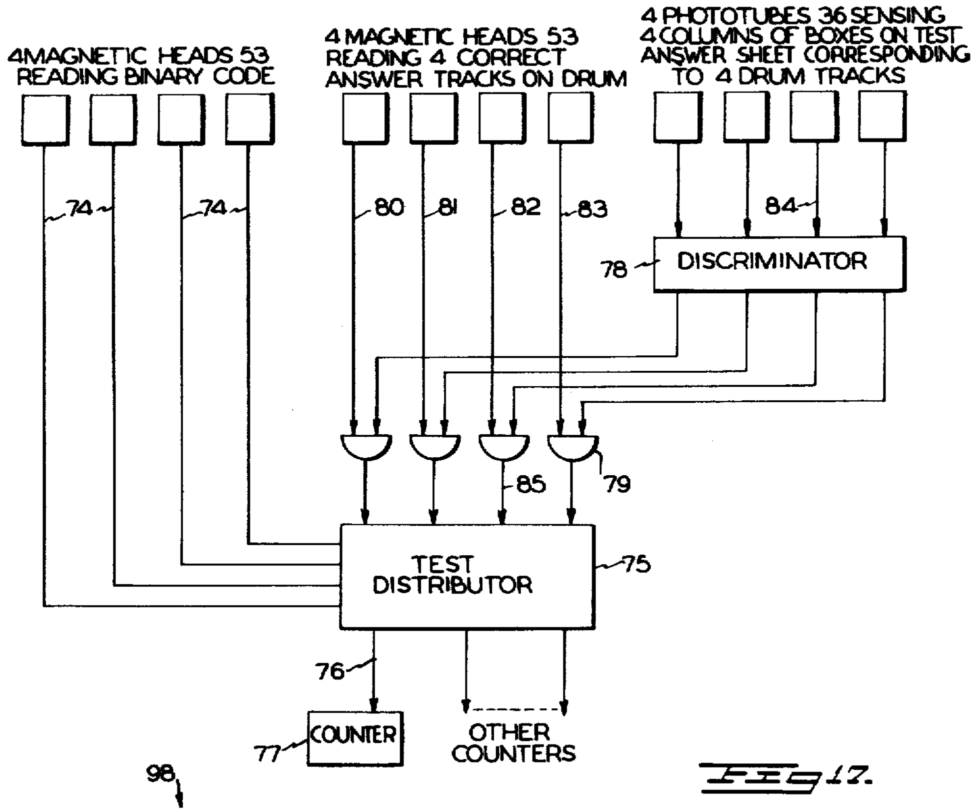
FIG. 15 is a circuit diagram showing circuitry useful for scoring test answer sheets according to the teaching of the present invention.
Figure 15A:
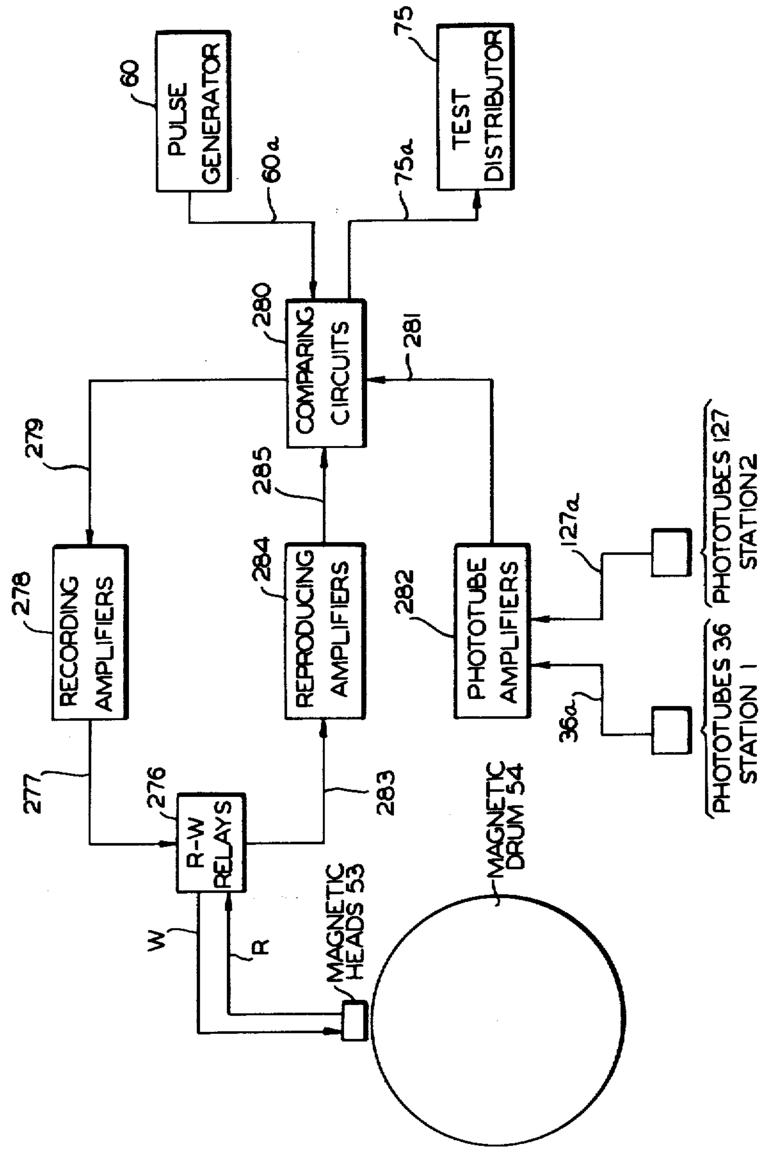
FIG. 15A is a circuit diagram showing a combination of circuitry shown in FIGS. 12 and 15 whereby data may be recorded and reproduced according to the teaching of the present invention.

This is shown in FIG. 15A where block 276 designates high speed electro-mechanical relay switches capable of connecting magnetic induction heads 53 so that the latter either function as recording (writing) heads or reproducing (reading) heads. When the magnetic induction heads 53 function as recording heads, the read-write (R–W) relays designated by block 276 establish a connection between leads designated collectively by reference numeral 277 and leads designated collectively by the letter W (the write leads) so that signals are fed to the magnetic induction heads. The leads designated collectively by reference numeral 277 are output leads of the recording amplifiers designed by block 278. These recording amplifiers have input leads designated collectively by the reference numeral 279, which are output leads of the comparing circuits designated generally by block 280.

The comparing circuits, of course, include the gates 63 shown in FIG. 12 and, when recording is being performed, the comparing circuits are fed by pulse generator output leads designated collectively by the reference numeral 60*a* and by phototube amplifier output leads designated collectively by reference numeral 281. Phototube output leads designated collectively by reference numerals 36*a* and 127*a* feed into the phototube amplifiers designated by block 282. In this way, signals from either the phototubes 36 at Station 1 or from phototubes 127 at Station 2 may be fed to the comparing circuits and the output signals of the comparing circuits proceed via the recording amplifiers and the R–W relays, to the recording heads 53.

When the magnetic induction heads 53 function as reproducing (reading) heads, the R–W relays establish a connection between the read leads designated collectively by the letter R and the input leads, designated collectively by reference numeral 283, to the reproducing amplifiers designated by block 284. The reproducing amplifier output leads, designated collectively by the reference numeral 285, feed into the comparing circuits designated by block 280. As is explained in greater detail hereinafter, when data reproducing or scoring is being performed, the comparing circuits 280 also receive signals from the phototube amplifier output leads 281. The incoming signals on leads 281 and 285 are compared by the comparing circuits 280, which, of course, include gates 79 shown in FIG. 15, and out put signals from the comparing circuits proceed via leads 75*a* to the test distributor designated by block 75.

When a "write" connection is established through the R–W relays 276, the reproducing amplifiers 284 and test distributor 75 are rendered inoperative. Similarly, when a "read" connection is established through the R–W relays 276, the recording amplifiers 278 and pulse generator 60 are rendered inoperative. These units may be rendered inoperative by suitable means known to those skilled in the art, for example, by applying an appropriate bias voltage to them.

After the R–W relays 276 switch from writing to reading connections, the individual test answer sheets 1 may be run through the apparatus in rapid succession. As a matter of fact, in the usual operation of the apparatus, the test answer sheets will follow immediately behind the basic answer sheet 11 since the necessary relay switching can be accomplished substantially instantaneously.

Figure 14:
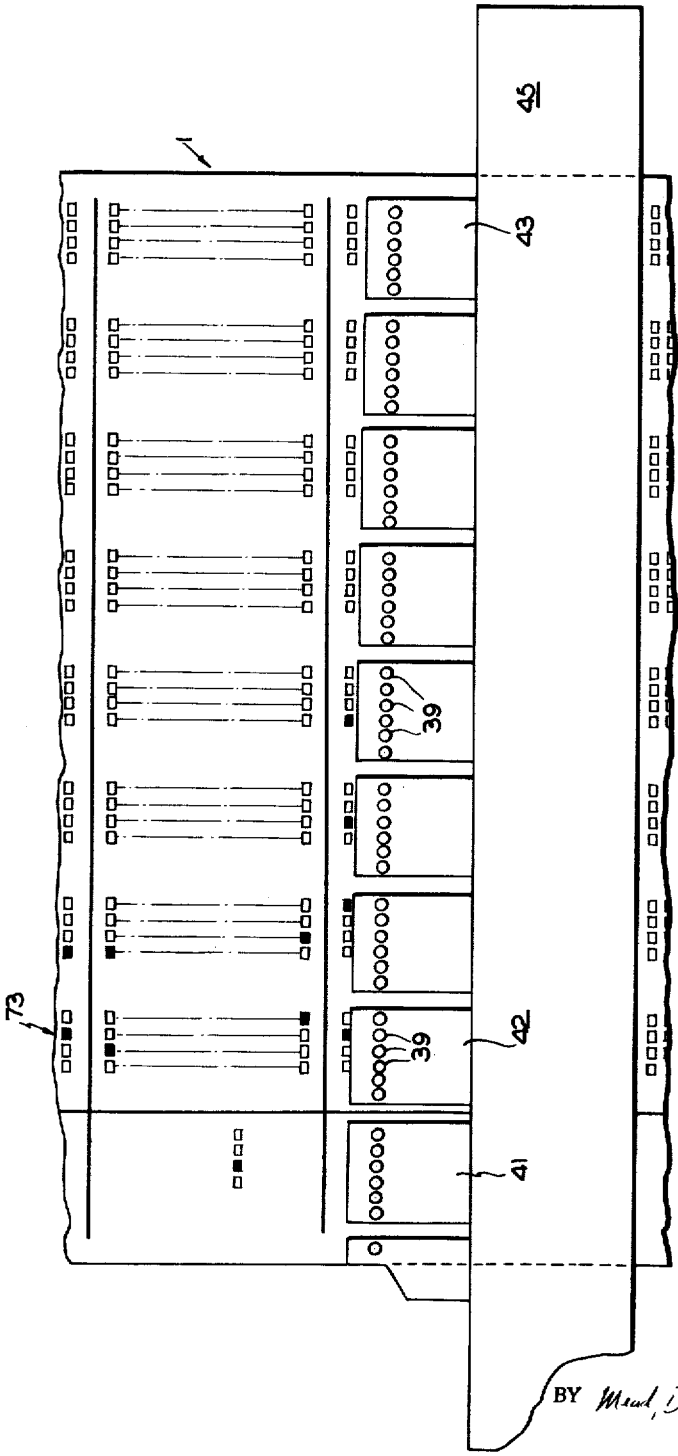
FIG. 14 is a plan view similar to the plan view shown in FIG. 7.

FIG. 14 shows a test answer sheet 1 in process of passing under the 55 Lucite rod ends 49 at Station 1. The eight columns of sets of boxes 5 on the test answer sheet pass beneath eight of the mounting blocks which hold the Lucite rods, the mounting 42 being on the left and 43 being on the right, each mounting block carrying six of the Lucite rods 39 connected to six phototubes. Simultaneously with the passing of sheet 1 under the Lucite rod ends 49 at Station 1, the magnetized bits on the surface of drum 54 representing the correct answers pass under the ends of magnetic induction reading heads 53. Since the temporal relation is precisely determined and the same, the row of magnetized bits representing the correct answers for the first row of boxes on test answer sheet 1 will pass under the magnetic induction reading heads in exact synchronism with the passage of sets of boxes in the first row of boxes on the test answer sheet under the respective sets of Lucite rod ends 49 which scan the row. Thus, it will be recalled that the line of centers of the Lucite rod ends held by mounting block 42 are slightly advanced with respect to the line of centers of the rods in the next adjacent mounting block to the right. Therefore, when the first row of answer boxes in the column designated by the numeral 73 in FIG. 14 becomes centered under the four right-hand Lucite rod ends held in mounting block 42 then, at the same instant of time, four of the magnetic induction heads 53 are sensing the corresponding four small discrete areas under the magnetic heads at that instant of time to determine in which of the four tracks a magnetized bit is present, this being the right answer for that particular set of four boxes on the test answer sheet.

Then, in rapid succession, the phototubes and magnetic heads simultaneously sense the test answer sheet and magnetic drum surface respectively to determine whether the box marked in a particular set of boxes on the answer sheet coincides with the applicable magnetized bit position on the magnetic drum surface. This serial type of scanning or inspection goes on from set to set of boxes in each row of the answer sheet and from row to row until the test answer sheet has been fully compared with the information or data recorded in the magnetic drum. It is important to note that each row is an indivisible unit in the scoring operation since the inspection proceeds from set to set of boxes in each row and then back to the beginning set in the next row, through that next row, and then back to the beginning set in still the next row, etc. The rapidity of the operation is apparent when it is realized that a minute fraction of a second elapses in going from one set of boxes to the next set of boxes in the same row.

It will be recalled that when the person completing the basic answer sheet 11 made entries on this sheet, appropriate entries were made in column 15 (see FIG. 3) to denote the particular counter to which the raw score total for each row is to be sent. The entries were made in the first four right-hand columns of boxes according to a binary code giving a possible total of 16 different counters for the tests. A total of 16 counters is usually quite sufficient since a given test answer sheet 1 will probably not involve more than this number of individual tests. It will also be recalled that when the correct answer information was recorded on the surface of magnetic drum 54, the binary code marks for column 15 were likewise recorded as magnetized bits in four tracks on the drum surface coming under the four magnetic induction heads which correspond to the four phototubes which sensed the binary code marks from column 15. These four phototubes are, of course, those connected to the right-hand four Lucite rods 39 held by mounting block 41 (see FIG. 7).

Since the binary code mark, or marks, appearing in the four right-hand boxes of column 15 for a given row of sets of boxes on sheet 11 was recorded as a magnetized bit on the surface of magnetic drum 54 an instant ahead of the recording of any of the correct answer marks appearing in the remaining eight sets of boxes in that given row, the four magnetic induction heads 53 reading the four tracks on the drum surface containing the binary code marks will, for this given row on the test answer sheet, sense or read the binary code magnetized bit an instant of time before the other magnetic reading heads sense any of the magnetized bits representing the correct answers for this given row. It is thus possible to determine where the output pulses representing the score for a given row will go, i.e. to which counter the raw score data for the row will be sent.

This is shown in FIG. 15 where the four magnetic induction heads reading the binary code are shown as being connected by leads 74 to a test distributor 75. An output signal, or signals, appearing on any of the leads 74 is fed into the test distributor which determines to which of a number of possible counters the subsequent pulse information received by the distributor for a given row being scored is to be sent. Test distributor 75 is designated by a block symbol since it may be any suitable type of circuit capable of receiving a binary type of input from four leads and selecting one of 16 possible output leads as the output depending upon the type of input information received. Thus, the test distributor can be a resistance matrix circuit and further description of the distributor is deemed unnecessary since the type of circuitry capable of achieving the described result is well known to those skilled in the art.

Assuming that the binary coding appearing on leads 74 is such that the test distributor sets up an output path on lead 76 to the counter designated by block 77, then whatever electrical pulses are received by the distributor for that particular set-up will go to counter 77. These pulses represent the count for the eight sets of boxes in the row on the test answer sheet associated with the four boxes which contained the binary coding on the basic answer sheet corresponding to this particular row on the test answer sheet. Assuming next that four of the boxes in a row of boxes in column 73 designated in FIG. 14 become centered under the Lucite rod ends 49 held in mounting block 42, then the phototube associated with a Lucite rod whose end is blocked by a marked box in the set of four boxes will cause a signal to be sent to a discriminator circuit indicated in block symbol 78 in FIG. 15. The function of the discriminator circuit, explained in greater detail hereinafter, is to pass a signal corresponding to the densest or blackest mark in a set of boxes on the answer sheet so that but one signal gets through for the particular set of answer boxes being sensed. In this manner, if the examinee has erased an improperly placed mark and then entered a proper mark in another of the four boxes in the set, the discriminator circuitry prevents a false signal from going through because of the possible smudge which might result from the erasure. If desired, circuitry may also be provided which will render ineffective any attempt to mark more than one box in a set of four boxes, for example.

The output signal from the phototube which senses the examinee's mark in the set of four boxes being considered passes through the discriminator circuit 78 to one of four coincidence gates 79 of the type heretofore described. If, simultaneously with the sensing of the examinee's mark on the answer sheet, the corresponding magnetic induction head has sensed or read a magnetized bit on drum surface 55, then a signal will appear on one of the output leads 80—83 from these magnetic induction heads and will go to the gate 79 connected thereto. Thus assuming that lead 84 receives a signal from the phototube connected thereto and that magnetic induction reading head output lead 82 also receives a signal simultaneously, then gate output lead 85 will be energized to pass a signal into test distributor 75 which feeds a pulse on lead 76 to counter 77. If, however, magnetic induction reading head output lead 80 receives the signal instead of lead 82 then, since lead 80 and the discriminator output lead for lead 84 do not go to the same gate 79, there will be no gate output to the test distributor and hence no score recorded in counter 77.

Counter 77 may be any suitable type of electronic counter, binary or decade or the like. The only requirement is that it be capable of instantaneously accepting and totaling the input pulse information sent to it so as to accumulate the information and be capable of giving up the accumulated information upon proper actuation. Since various types of electronic counters are well known to those skilled in the art no further detailed description of the counter is believed necessary.

The operation of scoring a particular test answer sheet 1 thus proceeds set by set of boxes in each row on the test answer sheet and row by row until all of the rows have been sensed by the phototubes, the corresponding magnetic induction reading heads simultaneously sensing the magnetized bits on drum surface 55 which represent the correct answers. Each time that the examinee's answer to a particular test question, i.e. a marked box on the test answer sheet, corresponds to the correct answer sensed from drum 54 then a pulse is sent to the counter involved thus advancing the counter by one.

In proceeding row by row it is understood of course that the rows appearing on both sides of the test answer sheet are sensed since the light from light source 38 shines through the sheet and illuminates the rows so that all rows are presented to the Lucite rod ends 49. It will be remembered that the rows on one side of test answer sheet 1 are offset from the rows on the other side of the sheet and that therefore a given row is always opposite a blank space on the other side of the sheet thus making it possible for the light to illuminate all rows as if they were on the same side of the sheet. As the scoring operation is completed for each row, the score total, i.e. the total of correct answers for that row, is sent to one counter. This counter was determined by the binary coding which was entered on the basic answer sheet and then recorded on magnetic drum surface 55 so that the counter designation can be sensed and the circuit to the counter involved set up in advance of scoring the particular row involved. The score total of all rows for a particular test can thus be entered in a particular counter. Each test can therefore have its own counter, the total of all of the counter scores giving the over-all total for the tests on the particular test answer sheet involved.

Figure 16:
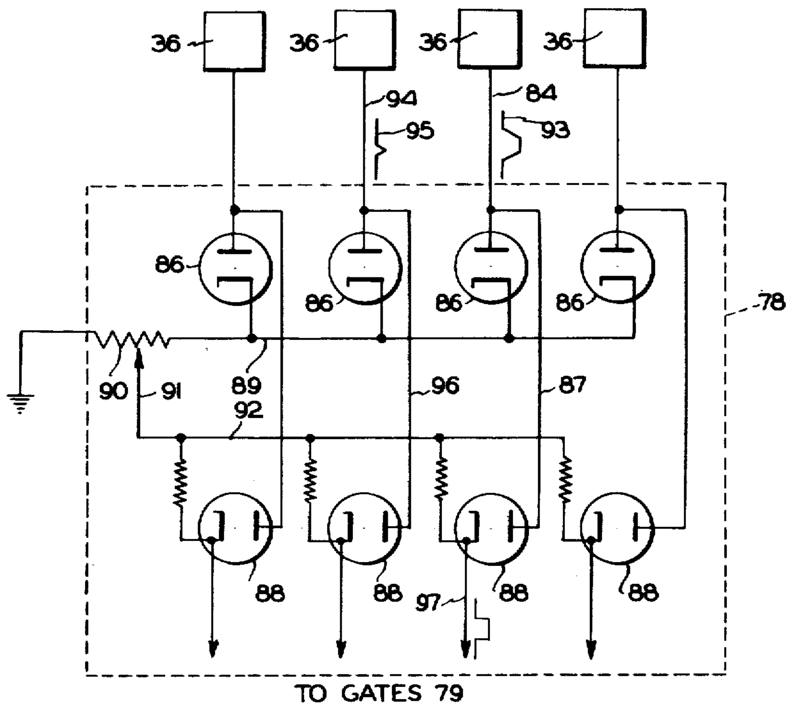
FIG. 16 is a circuit diagram showing, in greater detail, the discriminator shown in FIG. 15.

Referring back to discriminator 78, shown by block symbol in FIG. 15, reference is made to FIG. 16 for a more complete description of the circuitry of the discriminator. The circuit shown in FIG. 16 is for only four phototubes in a set of six phototubes which scan a particular column of sets of boxes on the test answer sheet since, in the example being considered, only four boxes out of six in a set on the answer sheet are being utilized. However, it is to be understood that the FIG. 16 circuit is representative for all of the photo tubes which scan the test answer sheet. As shown in FIG. 16, each of the four phototubes which scans a column of boxes on the test answer sheet in each column of sets of boxes is connected by an output lead to a diode 86, one such lead being designated by the reference numeral 84. Another lead, lead 87 for example, is connected to each of the phototube output leads and to one of another set of diodes 88. The cathodes of diodes 86 are connected to a common lead 89 which goes through a potentiometer 90 to ground. Slider 91 can be adjusted on potentiometer 90 to set the potential of the diode 88 cathodes connected to common lead 92.

Assuming that the phototube connected to output lead 84 is the one which senses the correct mark, i.e. that the box passing under the Lucite rod and associated with this phototube is marked, then a strong signal 93 will appear on output lead 84 and likewise at the anode of tube 88 fed by lead 87. At the same time it is assumed that phototube output lead 94 has a weak signal 95 appearing thereon caused perhaps by a smudge resulting from an erasure in the box associated with the Lucite rod leading to this particular phototube. The weak signal 95 will likewise be fed through lead 96 to a diode 88. However, because of strong signal 93 and the setting of potentiometer 90, the diode 86 fed by lead 84 will conduct and thus raise the potential of each cathode of diode 88. This blocks each diode 88 from conducting except the one fed by lead 87 since this lead carries strong signal 93. In other words, the potential of the anode of this particular diode is high because of strong signal 93 whereas the potential of the anodes of the other diodes 88 is low in relation to the cathode potential. The circuit has thus discriminated between the strong signal 93 and the weak signal 95 and has permitted only the strong signal to pass through. The sensitivity of the circuit is obviously dependent upon such factors as the diode characteristics, potentiometer setting, etc. as will be appreciated by those skilled in the art.

*Multiple-Key Sensing and Scoring*

In the sensing and scoring technique described above it is evident that there is only one "right" answer for each test item on the examinee's test answer sheet 1. In most achievement tests this is true and hence it is necessary to mark only one box in a set of boxes on the test answer sheet and correspondingly to mark one box of the corresponding set of boxes in the basic or key answer sheet 11. There are certain types of tests, however, in which there is no single "right" answer to each item. Rather, a given anwser to a certain item might be scored as "right" for one purpose, a different response as "right" for another purpose, and still another response as "right" for still another purpose. For example, in what might be described as a "personality preference record," each item might consist of a short heterogeneous list of activities, each list preceded by the question "Which of these activities do you like best?" For instance, for a given item the activities might be (1) fishing, (2) playing chess, (3) sketching, (4) reading biographies. It might be shown empirically that successful lawyers characteristically prefer one of these activities, successful architects another, and successful dentists still another. If an examinee is to be given a score which indicates the extent to which he shares the interest or activity preference of lawyers, the activities characteristically preferred by successful lawyers will count as "right," and so on with the activities characteristically preferred by successful architects, dentists, etc. Thus it is possible to secure a number of different scores from the same items for the same individual or examinee. If his "lawyer" score is higher than his "architect," "dentist," and other scores, this fact can be of considerable significance to a counsellor who is advising the examinee concerning his choice of professional careers. There are many other types of tests in which multiple-key scoring may be desirable, but this is one of the most common examples.

Figure 17:
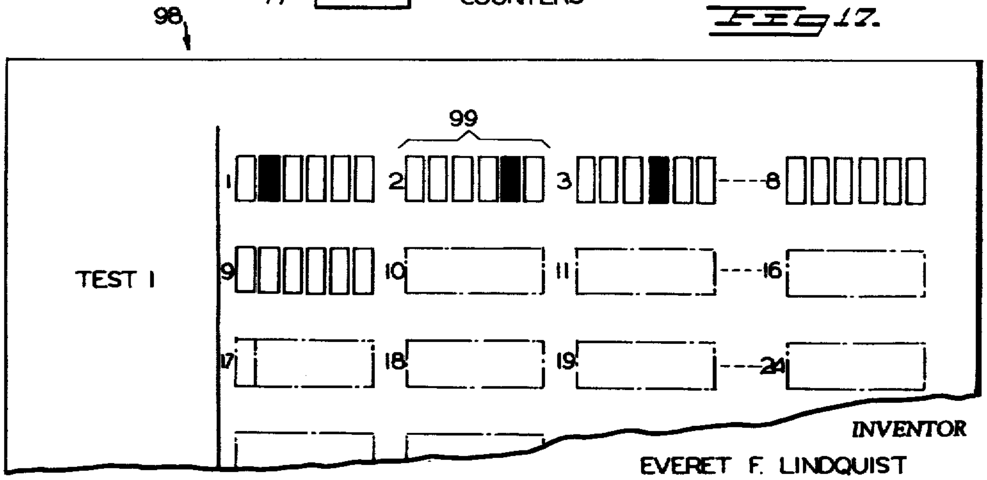
FIG. 17 shows a portion of a test answer sheet useful in multiple-key sensing and scoring according to the teaching of the present invention.
Figure 18:
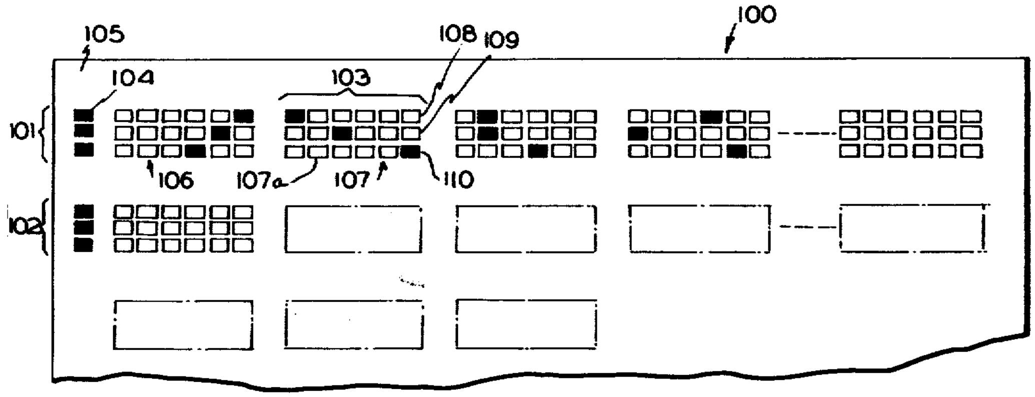
FIG. 18 shows a portion of a key answer sheet useful in such multiple-key sensing and scoring.

To illustrate how the teaching of the present invention is employed in such multiple-key sensing and scoring, reference is made to FIGS. 17 and 18. In FIG. 17, test answer sheet 98 is shown as having printed or otherwise suitably placed thereon a number of sets of answer boxes 99 which correspond to the sets 4 of answer boxes shown in FIG. 1 excepting that the sets 99 in FIG. 17 include six boxes in each set and each of the boxes is longer vertically than any of the boxes 5 shown in FIG. 1. These various sets of answer boxes 99 in FIG. 17 represent six possible answers for each test question or item in Test 1 shown on this portion of the answer sheet 98. As in the case of the sets of boxes 4 on test answer sheet 1, there are eight sets of answer boxes 99 on test answer sheet 98 but, of course, there can be more or less than eight.

The basic or key answer sheet 100 shown in FIG. 18 is similar in layout to basic answer sheet 11 shown in FIG. 3. However, it is to be noted that instead of utilizing but a single row on the basic answer sheet 100 to correspond to a single row on the test answer sheet 98, a plurality of rows are employed. In the example shown, three rows designated by the reference numeral 101 are employed in conjunction with the single row on the test answer sheet 98 including test items or questions 1–8. Similarly, three rows designated by the reference numeral 102 in basic answer sheet 100 are employed in conjunction with the tests items or questions 9–16 appearing in the second row in the test answer sheet 98. The reason for the utilization of three rows in the basic or key answer sheet 100 for each set of items in a row on test answer sheet 98 is that the vertical length or depth of the individual answer boxes in each set of boxes 99 on test answer sheet 98 is equivalent in length to the vertical length or depth of three boxes in each column of boxes on the basic or key answer sheet 100. This is evident from a comparison of FIGS. 17 and 18. While a three box length is shown, it will be appreciated that the vertical length or depth of the boxes in each set of boxes 99 can be made greater than three if desired, and then a greater number of boxes in each column of the basic or key answer sheet will be utilized to correspond to the depth or vertical length of the individual test answer boxes in each set 99.

In the multiple-key sensing and scoring technique according to the teaching of the present invention, the basic or key answer information appearing on sheet 100 is first recorded on the magnetizable surface 55 of drum 54 by passing the basic or key answer sheet 100 under the ends 49 of Lucite rods 39 located at Station 1 of the apparatus. As the basic or key answer sheet 100 proceeds under the Lucite rod ends, any marked box or boxes in each set 103 of boxes will be sensed by phototubes 36 proceeding from left to right of the basic or key answer sheet 100 as shown in FIG. 18 in the manner above described with reference to basic answer sheet 11. Thus, for any given row appearing on basic answer sheet 100, the phototubes 36 will first sense trigger mark 104 which appears in the left-hand column 105 shown in FIG. 18, will then sense the binary code information appearing in column 106, and will then subsequently and in rapid succession sense any marked box appearing in the remaining eight columns 107 in the manner above described in connection with basic answer sheet 11. By this procedure, the correct or key answers are recorded as bits of information or data in the magnetizable surface 55 of drum 54. After the correct or key answer information has been thus recorded in the magnetic drum memory 54, the sensing and scoring of each examinee's test answer sheet 98 may begin.

This sensing and scoring of the test answer sheet 98 proceeds generally in the manner described in connection with sensing and scoring of test answer sheet 1 described above with the difference that, due to the vertical length or depth of each answer box in each row on answer sheet 98, the comparison, for each row on the test answer sheet, between data sensed by the phototubes 36 and data sensed by the magnetic induction reading heads 53 continues for an interval of time sufficient to accommodate the passage of magnetized bits representing 3 rows of boxes in each column of boxes appearing on the basic or key answer sheet 100. Thus, for the three rows of boxes designated by reference numeral 101 for example, the data comparison, in scoring, between the phototubes and the magnetic induction reading heads will persist for the length of time that it takes for the three rows of magnetized bits representing the rows 101 to pass under the magnetic induction reading heads.

In the example shown in FIG. 17, it is assumed that, proceeding from left to right, the examinee has marked the second box as the correct answer to test question 1 and with respect to items or test questions 2 and 3 has marked the fifth and fourth boxes respectively as the correct answers. In the basic or key answer sheet 100, for the set of boxes 103 in the left-hand column 107 which correspond to test item or question 1 in FIG. 17 and again proceeding from left to right, the left-hand answer box has been marked in the top row 108, the third answer box from the left has been marked in the middle row 109, and in the bottom row 110 the right-hand or sixth answer box has been marked. The box marked in the respective rows 108–110 can thus be the correct or characteristic response or answer for the particular profession or other activity involved. For example, in row 108 the marked first box may be the correct or characteristic response for a successful lawyer, in row 109 the marked box in the third position from the left may be the correct or characteristic response for a successful architect, and in the last row 110 the right-hand or sixth marked box may be the characteristic or correct response for a successful dentist.

When the test answer sheet 98 passes under the Lucite rod ends 49 at Station 1, and assuming that test item or question 1 shown in FIG. 17 is the particular set of six answer boxes being sensed or scanned at the particular instant involved, then the Lucite rod end which scans the second box from the left will be blocked from receiving light and the blocking will continue for an interval of time equal to the passage of three answer boxes on the basic answer sheet past the Lucite rod end, as occurred when the correct answers were recorded. If, during this interval of time, the corresponding magnetic induction reading head senses a magnetized bit in any of the three discrete areas on drum surface 55 corresponding in temporal position to the three boxes designated as column 107*a* in FIG. 18 a pulse will be sent to the particular counter designated by the binary code marks appearing in column 106. Thus, for each of the three rows 108–110, a different counter can be designated, one for the lawyer score, another for the architect score and the third for the dentist score, for example. In this manner, the number of responses for each type of profession or activity can go to a separate counter. At the end of the scoring operation it is apparent therefore that if the examinee has marked the test items in every instance with the response which is characteristic for a successful lawyer then his test total will include a maximum in the counter which counts the responses considered characteristic or correct for a successful lawyer.

It so happens that, as shown in FIGS. 17 and 18, the examinee has marked the second box from the left as the answer to test item or question 1 in Test 1 whereas none of the corresponding three boxes in column 107*a* is marked. This means that the examinee has not marked any of the three responses considered to be characteristic of the three activities involved. In other words, the examinee's answer is in position 2 whereas the characteristic response for say a lawyer is in position 1, for an architect is in position 3, and for a dentist is in position 6.

The sensing and scoring of the test answer sheet 98 proceeds set by set of boxes 99 in each row of the answer sheet and row by row as has been described above in connection with the sensing and scoring of test answer sheet 1. However, since the test answer boxes in test answer sheet 98 are, in the example shown, equal in depth to three of the test answer boxes in test answer sheet 1, it is apparent that a particular phototube sensing a marked box on test answer sheet 98 will emit a signal for a period of 3 answer box times as compared to test answer sheet 1. When the basic or key answer sheet 100 was passed under the phototubes at Station 1, a magnetized bit was recorded on magnetic drum surface 55 for each marked box appearing on the basic answer sheet. Since the rows of answer boxes on the basic answer sheet 100 are grouped by threes as shown in FIG. 18 this means that, during the scoring operation, 3 rows of magnetized bits on drum surface 55 are sensed by each magnetic induction reading head 53 during the time interval that a phototube at Station 1 is sensing an answer box on the test answer sheet 98.

It is therefore evident that during the sensing of a single marked answer box on test answer sheet 98, up to 3 magnetized bits can be sensed on drum surface 55 and therefore three pulses can be sent to separate counters. Thus, suppose for example that all 3 boxes in column 107*a* on basic or key answer sheet 100 were marked. Then if the examinee has marked the second answer box from the left for test item 1 as shown in FIG. 17, this single marked box will cause a pulse to go to each of the three counters determined by the binary coding in column 106.

The characteristics of magnetic drum surface 55 are such that as many as fifty to sixty small discrete areas or bits of the drum surface can be magnetized per inch. This obviously makes it possible to utilize a substantial number of rows on the basic or key answer sheet 100 to make up each group of rows which corresponds to a single row on the test answer sheet 98. In fact, with a test answer sheet box one-half inch deep there is no difficulty in employing as many as 12 rows on the basic answer sheet 100 to make up each group of rows such as groups 101, 102, etc. This obviously extends the range of characteristic items which can be tested by a single question to be answered on the test answer sheet.

*Weighted Response Sensing and Scoring*

The sensing and scoring technique described above in connection with multiple-key sensing and scoring is also adapted to a so-called weighted response or item sensing and scoring. This type of sensing and scoring involves giving different weights to different items in the group of items or boxes applicable to a particular test question. Thus, if the first box in a given set of six boxes is the best answer to the test question, a credit of five points can be given to the examinee if he marks the first box. If the second answer box in a particular set of boxes is marked, the credit can be three points as against the five points for the first answer box and, similarly, if the third answer box is marked the credit can be four points. In other words, there are several possible answers to each test item or question on the test answer sheet but the examinee does not get the same credit for selecting and making the least preferred or worst anwser as compared to the best and most heavily weighted answer in the group.

Figure 19:
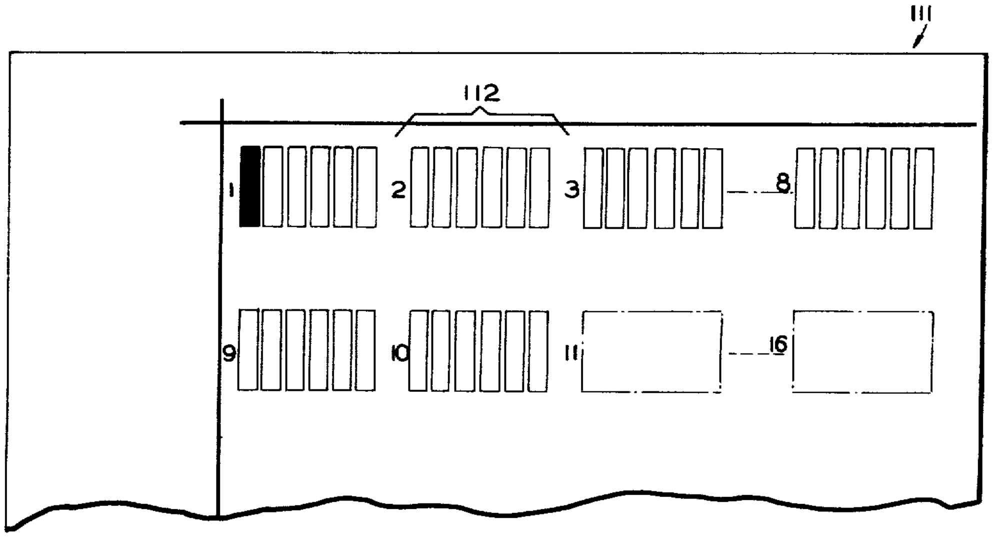
FIG. 19 shows a portion of a test answer sheet useful in weighted response sensing and scoring according to the teaching of the present invention.

Referring to FIG. 19, test answer sheet 111 is shown as having printed or otherwise suitably placed thereon rows of answer boxes, there being six answer boxes in each set 112 of boxes. There are eight sets of boxes 112 in each row, in the example shown, and the sets of boxes can be numbered as indicated by the numbering in FIG. 19 to indicate the test question items 1, 2, etc. for the total number of questions involved in the particular test. It is noted that the test answer boxes in each set 112 are relatively long vertical boxes as compared to the answer boxes in FIG. 1. The reason for this is that, like in connection with the multiple-key sensing and scoring described under the preceding heading, each marked answer box on test answer sheet 111 is to control a plurality of marked answer boxes on the basic or key answer sheet 113 which is used to record the correct or key answer information on the magnetic drum 54 in conjunction with the sensing and scoring operation involving the use of a test answer sheet like 111.

Figure 20:
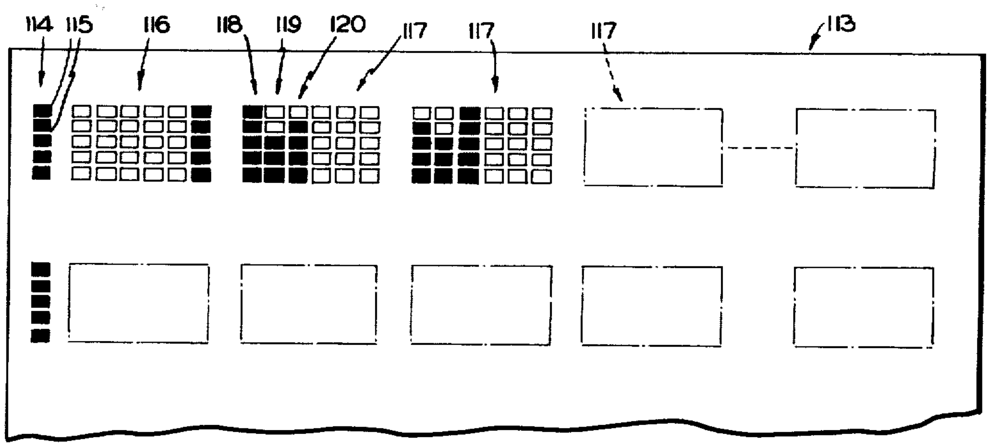
FIG. 20 shows a portion of a key answer sheet useful in such weighted response sensing and scoring.

Referring to basic or key answer sheet 113 shown in FIG. 20, it will be noted that this basic answer sheet contains a column 114 of trigger marks 115, a left-hand column 116 which is six answer boxes wide, and eight other columns 117, each six answer boxes wide, located to the right of column 116. This, of course, is similar to the arrangement in basic answer sheet 11 shown in FIG. 3. Upon examining FIG. 20 in greater detail it is noted that in the left-hand column 116 the right-hand answer box in each column has been marked in the same position for five boxes down in the column. Column 116 is the column which contains the binary coding information which determines to which of several counters the answer data is to be sent during the scoring operation. Since the same box is marked five boxes down it is evident that the score for the corresponding total of five boxes down in each of the columns 117 is to go to the same counter.

In the first column 117 immediately to the right of column 116 it will be noted that in the single column of boxes 118 the first five answer boxes have been marked, in the second single column 119 the first two boxes are not marked but the remaining three are, and in the single column 120 the first box is not marked but the remaining four are. It is evident therefore that when the basic or key answer sheet 113 is passed under the Lucite rod ends 49 at Station 1, the phototube sensing column 118 will send five pulses to the magnetic drum which are recorded as five magnetized bits in a track 57 on the drum surface 55. Similarly, the phototubes sensing columns 119 and 120 will send three and four pulses respectively to the magnetic drum which become three and four magnetized bits occupying the correct temporal relation to each other and to the five magnetized bits derived from column 118. Therefore, during the scoring operation, when any answer box on test answer sheet 111 is marked the phototube at Station 1 sensing the marked box will emit a signal having a duration long enough to coincide with the sensing of up to five magnetized bits by the corresponding magnetic induction reading head 53. In other words, a gate 79 is in effect held open for five pulse times. In the example shown in FIGS. 19 and 20, five pulses will be sent to the counter designated by the binary coding appearing in column 116 since the first answer box on the test answer sheet 111 has been marked for test question 1. Had the second or third answer boxes been marked on the test answer sheet then three and four pulses respectively would have been sent to the counter. It is thus apparent that for one given test question or item it is possible to obtain a plurality of answers of different weights.

The cumulative total of the various weights or credits made by the examinee in answering the total number of test items or questions involved in a particular test can be stored in one counter. In fact, by employing a binary type of counter it is possible, by means of the test distributor, to feed information into different stages of the binary counter and thus increase the range of weights controllable by the type of marking employed on the basic or key answer sheet 113. To accomplish this, boxes in column 116 may be marked appropriately to select a number of addresses corresponding to the number of stages of the same binary counter to which information may be sent. As will be understood by those skilled in the art, it is possible to enter information in up to three stages of the same binary counter by utilizing three rows in column 116, each row selecting one of the stages of the counter. Then, depending upon the marking in column 118 for example, information might go to any one of the stages of the same counter, to two stages of the same counter, or to all three stages of the counter. It is thus possible to secure information representing a range in weights from 1 to 7 by employing only three rows in column 116. A greater range may be obtained if counters are utilized having a number of stages greater than three stages and a corresponding number of rows are utilized in column 116 to select the stages of the counter to which the information is to be sent. The ability of methods and apparatus according to the teaching of the present invention to accommodate weighted response type of tests obviously broadens the scope of application of the teaching of the present invention.

*Conversion*

In educational and psychological testing, the raw scores (number of items answered correctly) on a given test must often be converted into equivalent scores along a different scale. Sometimes these converted or scaled scores are linearly related to the raw scores, or the relationship may be expressed mathematically, but most often the converted scores are an arbitrary function of the raw scores and the relationship can be expressed only in the form of a conversion table. Examples of such converted scores are so-called normalized T-scores, percentile ranks, age or grade equivalents, etc.

Figure 21:
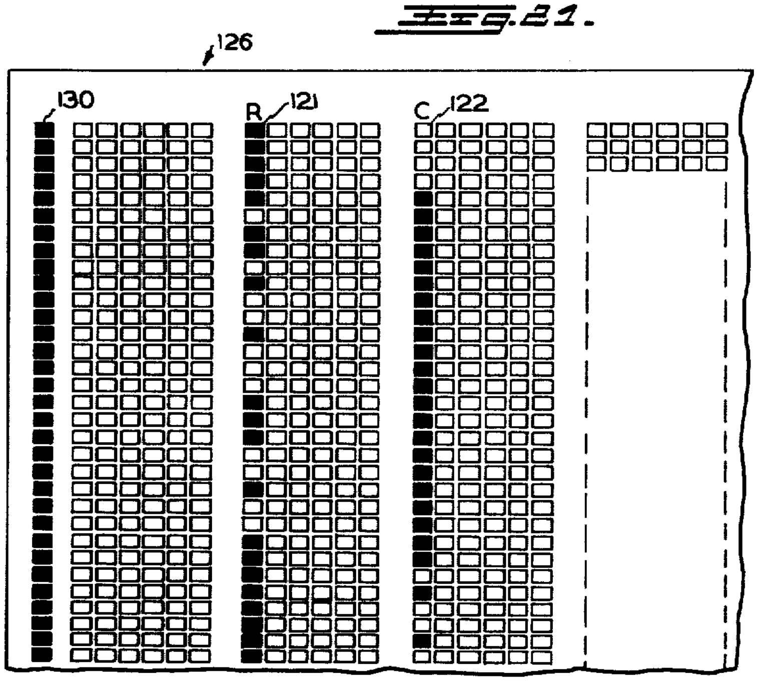
FIG. 21 shows a portion of a sheet useful in accomplishing conversion of raw data to converted data according to the teaching of the present invention.

In employing the teaching of the present invention to obtain a desired conversion of raw score data obtained as described above, the desired conversion table data may be entered upon a sheet like the basic answer sheet 11 shown in FIG. 3. Such a sheet is shown in FIG. 21 where it will be noted that the column 121 heated by the letter R and the column 122 headed by the letter C each contains a number of marked boxes. The letter R stands for the raw score data to be fed into the raw score counters 77 while the letter C stands for the converted score data which is to be fed into the converted score counters. The significance of the marked boxes in columns 121 and 122 shown in FIG. 21 is better understood by reference to FIG. 22.

FIG. 22 shows a table 123 having a column of FIGURES 1 to 21 under the letter R and a column of figures starting with 2 and ending with 24 under the letter C. This is an example of a raw score to converted score table wherein a raw score of six equals a converted score of two, a raw score of seven equals a converted score of three, and so on until the end where the raw score 21 equals the converted score 24. In the table 124 appearing to the right of table 123, the raw score and converted score numbers have been set side by side with additional numbers being placed opposite applicable blanks to give a full continuity of numbers from 1 to 21 in the raw score column and from 1 to 24 in the converted score column. This is matched in table 125 by marked boxes substituted for each of the numbers in the respective raw score and converted score columns in table 124. Thus, in table 125, the first five boxes are blocked out under the raw score heading to correspond to numbers 1 through 5 in the raw score column in table 124 and so on throughout table 125 with the last raw score box corresponding to number 21 in the raw score column in table 124.

It will be observed from table 124 (and the corresponding part of table 125) that the raw scores are each a unit less than the corresponding number in table 123 so that, in table 124, a raw score of six is opposite a converted score of three, etc. whereas, in table 123, a raw score of seven is opposite a converted score of 3, etc. The reason for this is explained more fully hereinafter.

It is apparent that columns 121 and 122 shown in FIG. 21 correspond to the two respective columns shown in table 125 of FIG. 22. To record the raw score and conversion score markings appearing on the sheet shown in FIG. 21 on the magnetic drum 54, sheet 126 shown in FIG. 21 is fed, in the manner described above in connection with the basic answer sheet 11, to conveyer 34 where the sheet is led past Station 1 and then on to Station 2. Sheet 126 is actually read at Station 2, the reason being that it is desired to record the data appearing on sheet 126 on a different portion of the circumference of drum 54 from that on which the basic answer sheet data is recorded. Since Stations 1 and 2 are separated from one another as shown in FIG. 4 and since drum 54 has a sufficient circumference to accommodate data from Station 1 on one portion of the circumference and data from Station 2 on another portion of the circumference, it is thus possible to sense or read data at Station 2 and enter it into the magnetic drum or memory at a different location from the basic answer data.

The sensing of the marked boxes appearing in columns 121 and 122 on sheet 126 is accomplished at Station 2 by phototubes 127 fed by Lucite rods 128 in manner similar to the phototubes 36 fed by Lucite rods 39 at Station 1. A light source may be employed at Station 2 corresponding to light source 38 at Station 1 or, if desired, a light source may be employed which reflects light onto the surface of sheet 126 so that the Lucite rod ends detect reflected light rather than transmitted light. There are enough phototubes located at Station 2 to detect all of the separate columns of boxes employed in entering conversion code data on a sheet such as sheet 126. Furthermore, the Lucite rod ends at Station 2 are arranged in offset sets of six just as at Station 1.

As sheet 126 proceeds past Station 2 and under and closely adjacent to the Lucite rod ends located at that Station, two tracks of magnetized bits will be entered on the magnetizable surface 55 of drum 54 with the bits corresponding in position to the marked boxes appearing in columns 121 and 122 respectively, except that the bits for any set of six boxes in a given row on the conversion sheet will be recorded on the memory drum a split second before the bits from the next (to the right) set of boxes in the same row. In this manner the raw score data and converted score data are entered into the magnetic drum or memory of the apparatus. In the normal sequence of utilization of the apparatus according to the teaching of the present invention, the particular raw score and conversion score data will have been worked out in advance of the scoring of a particular set of test answer sheets 1. Therefore, the sheet bearing the raw score and conversion score markings, such as sheet 126, can be fed into the apparatus in advance of test answer sheets 1 so that the conversion score data is recorded on the magnetic drum or memory 54 to be available to process the raw scores obtained in the actual scoring of the test answer sheets 1. In fact, when a stack of sheets is placed upon support 29, the sheet, such as sheet 126, bearing the conversion code entries or markings will be on top, the basic answer sheet 11 next, and then the test answer sheets 1 to which the sheets 126 and 11 apply will be next.

The conversion code sheet 126 proceeds into the apparatus and is read at Station 2 as above described. The basic answer sheet 11 is read at Station 1 where the basic or correct answers (sometimes called key answers) are read and recorded on the magnetic drum or memory 54 in a different portion of the circumference from the conversion code data on sheet 126. Then each test answer sheet follows in rapid succession. As a test answer sheet passes Station 1, the marked boxes appearing thereon are sensed and the sensed data compared with the correct answers sensed by the magnetic induction heads 53 in the manner heretofore described. This puts the total of the correct answers for each test into the counters 77 as above described.

Then, during that portion of the revolution of the magnetic drum where the circumference portion bearing the conversion code magnetized bits is passing the magnetic induction heads 53, conversion of the raw score appearing in each of the counters 77 is accomplished and the converted score total fed to the correct converted score counters. This occurs for each test answer sheet prior to the obtaining of the raw score for the next succeeding test answer sheet. In other words, for a given test answer sheet 1, the marked answers are sensed, the raw score obtained, and the raw score converted into converted score totals, prior to the sensing, obtaining, and converting of the raw score for the next succeeding test answer sheet.

Figure 23:
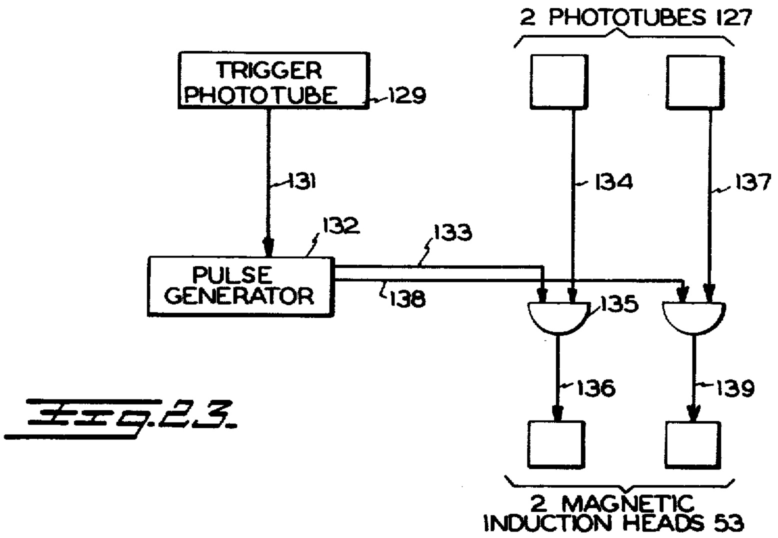
FIG. 23 is a circuit diagram showing circuitry useful for recording raw data and converted data in proper relation to each other.

The electrical circuit diagram showing the sensing and recording of the raw and converted score data appearing on sheet 126 is shown in FIG. 23 which, as will be apparent upon inspection, is similar to the electrical circuit diagram shown in FIG. 12 in connection with the sensing and recording of the correct or key answers entered on basic answer sheet 11. Referring to FIG. 23, block 129 designates the left-hand or trigger phototube 127 at Station 2 which senses the black marks or marked boxes appearing in the left-hand column 130 on sheet 126 as shown in FIG. 21. As will be recalled in connection with the description concerning sensing and recording data appearing on basic answer sheet 11, each black mark or marked box in column 130 forms a part of the row of boxes appearing to the right of the black mark, i.e., is one of the 55 boxes shown in each row on sheet 126.

The raw score data appearing in column 121 are entered in one column of a given set of six boxes while the converted score data are entered in a column of another set of six boxes as shown on sheet 126. Since the center of the Lucite rod end which feeds light to trigger phototube 129 is advanced slightly with respect to the lines of centers of the sets of six Lucite rod ends which scan the sets of six boxes to the right of column 130, then, for a given row on sheet 126, the black mark or marked box appearing in column 130 is sensed first, and then each set of six boxes is sensed in serial relation, there being a fraction of a second between the sensing of the respective sets as has been described above in connection with FIGS. 7 and 8 relating to the sensing and recording of data on the basic answer sheet 11.

Referring back to FIG. 23, when trigger phototube 129 senses a black mark appearing in column 130 a signal appears on line 131 which actuates pulse generator 132 to emit a series of equally spaced apart pulses on line 133. This is the same process as has been described in connection with FIGS. 12 and 13. Then, as one of the phototubes 127 senses a mark appearing in the raw score column 121 a signal appears on line 134 coinciding with the signal 133 to activate gate 135 and thus transmit a signal on line 136 to the magnetic induction head 53 occupying a position corresponding to the position of the phototube 127 which is sensing the raw score column 121. Substantially immediately following the sensing of a mark in column 121, the phototube 127 which is sensing the converted score data appearing in column 122 produces a signal on line 137 when a marked box appears beneath the Lucite rod end feeding this particular phototube 127. Each time that a signal appearing on line 137 coincides with a pulse fed on line 138 then a signal appears on line 139 and energizes the magnetic induction head 53 which occupies a position corresponding to the phototube 127 which is sensing the converted score data in column 122.

The sensing and recording thus proceeds row by row until all of the raw score data and converted score data are recorded on the magnetizable surface of drum 54 and when so recorded will appear on the magnetizable surface in two tracks or columns corresponding to columns 121 and 122 as small discrete areas or bits of information occupying the same relative position (except for the offsetting) with respect to each other as do the marked box entries in columns 121 and 122.

The correct correspondence of raw score to converted score data being thus stored in the magnetic drum 54, which may be considered as being the memory of the apparatus, this information is then available to process the raw score total obtained for each test answer sheet 1. It will be recalled that in the process of sensing and scoring the test answer sheet, the raw score total made by a particular examinee for a particular test answer sheet is entered in a raw score counter 77 (see FIG. 15). This occurs during what might be termed as a first or scoring portion of a complete revolution of magnetic drum 54.

At the end of this first portion of drum revolution, counter 77 is switched by suitable means so that it contains one more entry or count than the complement of the raw score count which was present in the counter at the end of the scoring operation. This means that when the actual count which was present in the counter as a result of the scoring is again fed into the counter, as by a series of electrical pulses corresponding to each item of count, the last pulse making up the total of the initial count will be a spill-over pulse since the counter became filled up upon receipt of the next to the last pulse because of the fact that one more than the complement was already entered into the counter. Electronic counters, binary for example, are well known to those skilled in the art and it is further known that when the predetermined capacity of a counter is exceeded a spill-over or excess pulse can result and be used in a desired manner as appears hereinafter. While the switching of the counter to one more than the complement of the raw score is a desired way to obtain a spill-over pulse which may be utilized as a cut-off pulse, the counter could be of a type that could be run backwards throughout the total of the raw score and cut-off achieved at the end of the backward running.

The particular raw score counter 77 for which a converted score is being obtained according to the coding or relation shown in FIGS. 21 and 22 having been switched to contain one more than the complement of the raw score initially present in the counter, when the magnetic induction heads 53 sense the two tracks on the magnetizable surface 55 of drum 54 which contain the magnetized bits representing the raw score to converted score relation, pulses are sent to the raw score counter, the spill-over pulse from which is sent to a gate feeding a converted score counter as shown in FIG. 24. The magnetic induction heads 53 involved will of course have been switched to be reading heads for this operation. Thus, when the first raw score magnetized bit passes under the magnetic induction reading head designated by block 140 in FIG. 24, a pulse is sent on line 141 and is entered in the raw score counter 77. Likewise, when the first converted score magnetized bit passes under the magnetic induction reading head designated by block 142 in FIG. 24, a pulse is sent on line 143 to gate 144 and from there on line 145 to the converted score counter 146.

In this manner, pulses keep appearing on lines 141 and 143 in accordance with the sensing of magnetized bits on the drum surface by the magnetic induction heads 140 and 142 until the magnetic induction head designated by block 140 senses the next magnetized bit which is in excess of the total then present in raw score counter 77. In other words, the raw score counter already contained one more than the complement of the raw score and hence the next to the last pulse of the pulses representing the raw score count filled up the raw score counter. When the next pulse appears on line 141 it exceeds the capacity of counter 77 and a spill-over pulse appears on line 147. This spill-over pulse is fed to gate 144 and shuts off this gate to prevent further transmission of pulses on line 145 to the converted score counter 146. Details of gate 144 are omitted since any suitable type of electronic gate circuit may be employed which is capable of cutting off upon receipt of a pulse from line 147 as will be evident to those skilled in the art.

When gate 144 cuts off, converted score counter 146 contains the converted score total corresponding to the particular raw score total made by the examinee in the particular test involved in the scoring and converting operation described. If the examinee has answered all of the test questions correctly, his raw score entered into raw score counter 77 will be the maximum possible and the spill-over pulse which appears on line 147 to shut off gate 144 will be the pulse obtained from the magnetized bit on the drum surface corresponding in position to the bottom-most marked box appearing in raw score column 121 shown in FIG. 21. Of course, if the examinee has made less than the maximum raw score, i.e. has answered some items incorrectly, then the spill-over or cut-off pulse will occur at some point farther up from the bottom-most marked box appearing in column 121.

Figure 25:
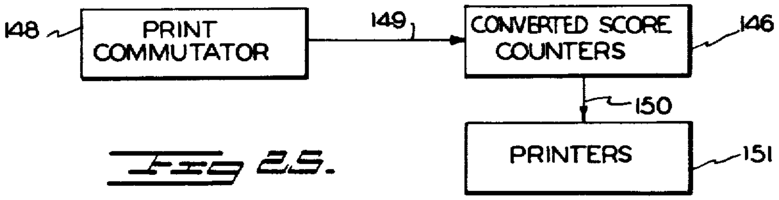
FIG. 25 is a circuit diagram showing circuitry useful for printing out converted data information.

During a remaining portion of a single drum revolution following the obtaining of the converted score total in converted score counter 146, the converted score can be printed out by a high speed automatic printer actuated by electrical pulses. Such printers are known in the art and the printer per se is not part of the present invention. However, reference to FIG. 25 shows in general outline how a particular print-out operation is achieved. Referring to FIG. 25, a series of pulses is produced by a commutator or the like forming a part of the over-all printer mechanism said commutator being designated by block 148 in FIG. 25. These commutator pulses appear on line 149 and are fed into each decade of the converted score counter 146 which by now contains the converted score total as described above. Depending upon the particular converted score total contained in successive decades of the converted score counter, a series of output pulses appears on line 150 and is fed to the printer designated by block 151 which, in accordance with the particular pulse pattern fed into it by line 150, prints the converted score total onto a tape or the like. This description of the print-out operation is given merely to round out the description of how the information as to the converted score total is put into readable form. As stated, such type of printers are known in the art and detailed description of the printer control and pulse patterns are omitted since they do not per se form part of the present invention.

The relationship between the raw score and the converted score for the example shown in FIG. 22 is such that there is not a substantial difference between the highest number of the raw score and the highest number of the converted score. It is thus possible to enter the data for the raw score and the converted score in columns 121 and 122 on sheet 126 (see FIG. 21) without the columns being disproportionate. In some instances, however, there will be a great disparity between the ranges of the raw score nad converted score data.

Figure 26:
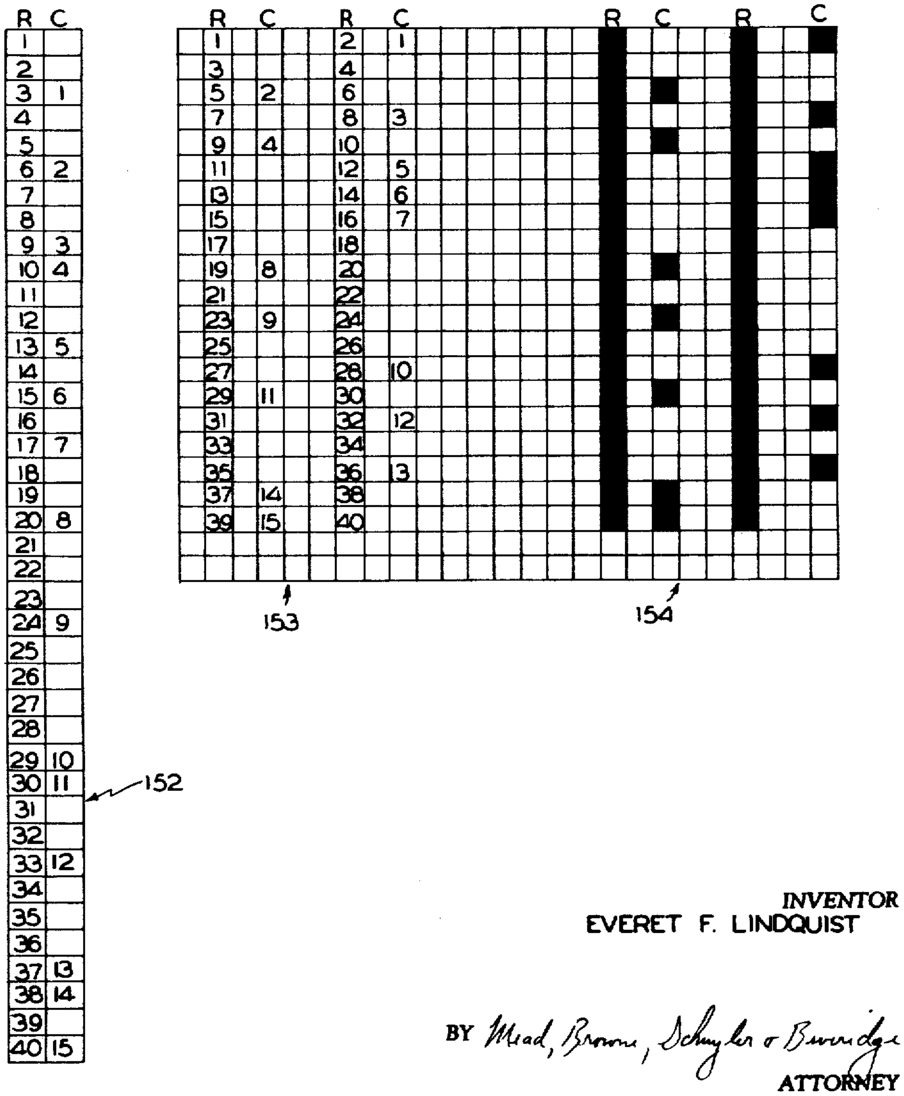
FIG. 26 shows another example of a raw data to converted data relation.

An example of this is shown in FIG. 26 where, referring to the table designated by the reference numeral 152, it is observed that there are only 15 converted score numbers associated with 40 raw score numbers. If the raw and converted score data were entered onto a sheet such as sheet 126 in the manner shown in FIG. 21, then obviously the raw score data would be quite long and would thus take up a much greater track length on the surface of the magnetic drum 54 when entered thereon as magnetized bit of information. To avoid this, the raw score numbers can be broken into two columns as designated generally by the reference numeral 153 with the appropriate converted score numbers being placed opposite the particular raw score numbers to which the converted score numbers correspond. The columns designated by the reference numeral 154 in FIG. 26 show how marked box entries may be made to correspond to the number positions appearing in the columns designated by the reference numeral 153.

Figure 27:
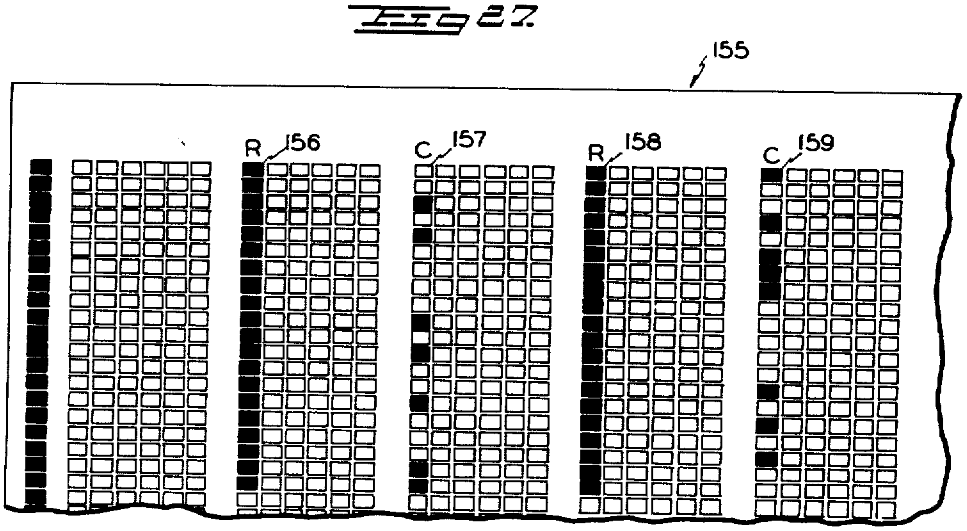
FIG. 27 shows a portion of a sheet useful in accomplishing recording of raw data and converted data having the relation shown in FIG. 26.

In entering the raw score to conversion score data on a sheet containing boxes capable of being marked, the entries are preferably made in the pattern shown on sheet 155 shown in FIG. 27. Thus, proceeding from left to right in FIG. 27, the odd raw score numbers one to thirty-nine are entered as marked boxes in the left-hand column 156 of one of the six box wide columns. Then the converted score numbers corresponding thereto are entered in column 157, the raw score data for the even raw score numbers two to forty entered in column 158, and the converted score data corresponding thereto entered in column 159. When sheet 155 is passed under the phototubes at Station 2 the marked boxes in each of the columns 156–159 are sensed at different instants of time, as described above in connection with the sensing of the correct or key answer data on basic answer sheet 11, and four tracks of magnetized bits are thus entered on the magnetizable surface 55 of drum 54.

The process of converting the raw scores to converted scores is essentially the same as has been described in connection with FIGS. 21–25. Thus, the raw score counter 77 involved is switched so that it contains one more than the complement of the raw score total obtained during the scoring operation and then the magnetic induction heads involved read the four tracks of magnetized bits which are present on the magnetizable surface 55 of drum 54 because of the sensing of the marked boxes shown in columns 156–159 in FIG. 27. The two magnetic induction heads reading the bits on the drum surface which correspond to the marks in column 156 and 158 are of course both connected to the same raw score counter. Each time that a magnetized bit is sensed a pulse is produced. The pulse resulting from the sensing of the magnetized bit corresponding to the first marked box of column 156 is followed by the pulse resulting from the sensing of the magnetized bit corresponding to the first marked box in column 158. The two magnetized bits just mentioned thus correspond to marked boxes from the same row on sheet 155 but the pulses resulting from sensing the magnetized bits are not coincident because the magnetized bits are offset.

It is therefore apparent that the pulses fed to the raw score counter involved come alternately from the two tracks on the magnetic drum surface which correspond to columns 156 and 158, of sheet 155, the odd numbered pulses coming from the track corresponding to column 156 and the even numbered pulses coming from the track corresponding to column 158. The first converted score pulse comes from the track on the magnetic drum surface corresponding to column 159, the second converted score pulse comes from the track corresponding to column 157, the third from the track corresponding to column 159, the fourth from the track corresponding to column 157, and the fifth, sixth, and seventh pulses from the track corresponding to column 159, etc. The reason for this particular pulse pattern for the converted score is due of course to the manner of entry of the converted score data in columns 157 and 159. Had all of the boxes in these columns been marked then the converted score pulses would come alternately first from the track corresponding to column 157 and then from the track corresponding to column 159. When the raw score counter fills up and a spill-over pulse appears, further pulses to the converted score counter are blocked. By this time, however, the converted score counter contains the proper converted score total.

Figure 28:
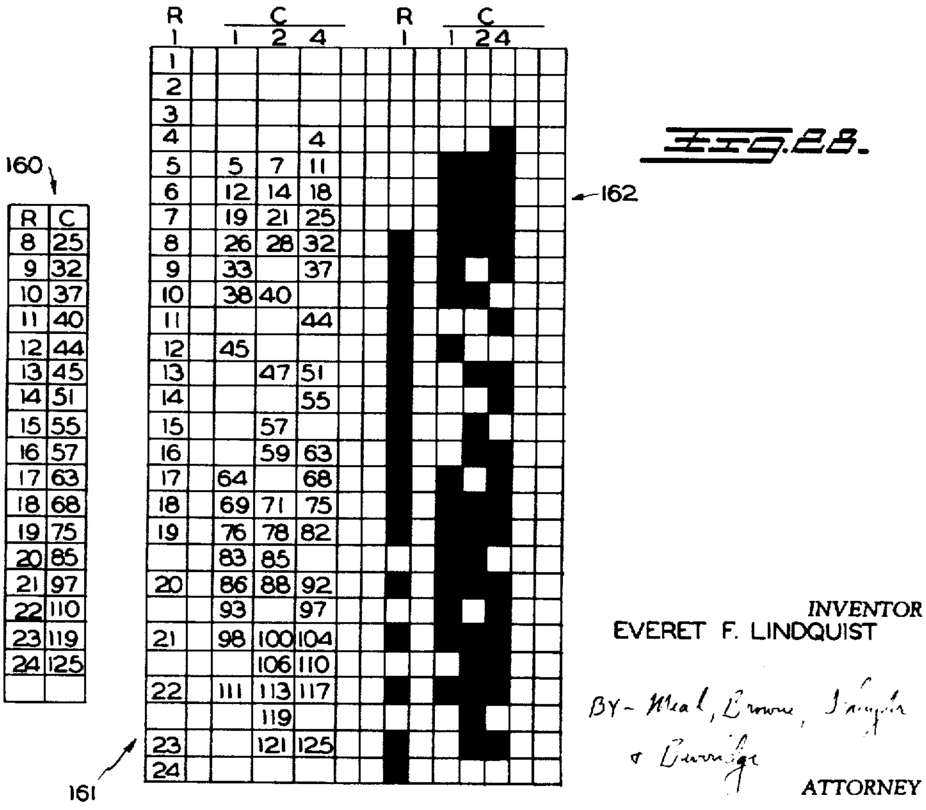
FIG. 28 shows another example of a raw data to converted data relation.

FIG. 28 illustrates a raw score to conversion score relation wherein the converted score numbers are substantially larger than the raw score numbers. Thus, as illustrated in the table designated by the reference numeral 160, for raw score numbers going from eight to twenty-four, the converted score numbers go from twenty-five to one hundred twenty-five. Obviously, if the converted score numbers were to be placed in a single column of marked boxes on a sheet like sheets 126 and 155 shown in FIGS. 21 and 27, the converted score column would be exceedingly long and in fact could exceed the circumferential length of the magnetizable surface of drum 54 which is to accommodate the converted score magnetized bits. A preferred way to overcome this difficulty is to utilize a binary counter to count the converted score pulses and to feed different stages of the binary counter with different pulse information so that the counter can advance in jumps so to speak rather than accumulating successive individual pulses.

Referring to the columns in FIG. 28 designated by the reference numeral 161, it will be noted that the raw score data appears in the left-hand column and goes from 1 to 24. The converted score data appears in three columns under the headings 1, 2, and 4 which represent the first, second and third stages of a binary counter. Numbers representing the converted score data thus progress from the first entry, the numeral four, from left to right in each succeeding row in one, two, and four steps in accordance with the binary system. The marked block columns designated by the reference numeral 162 illustrate how the respective numbers shown in the columns designated by the reference numeral 161 may be represented by marked block information capable of being entered onto a conversion code sheet like sheets 126 and 155 in FIGS. 21 and 27.

Figure 29:
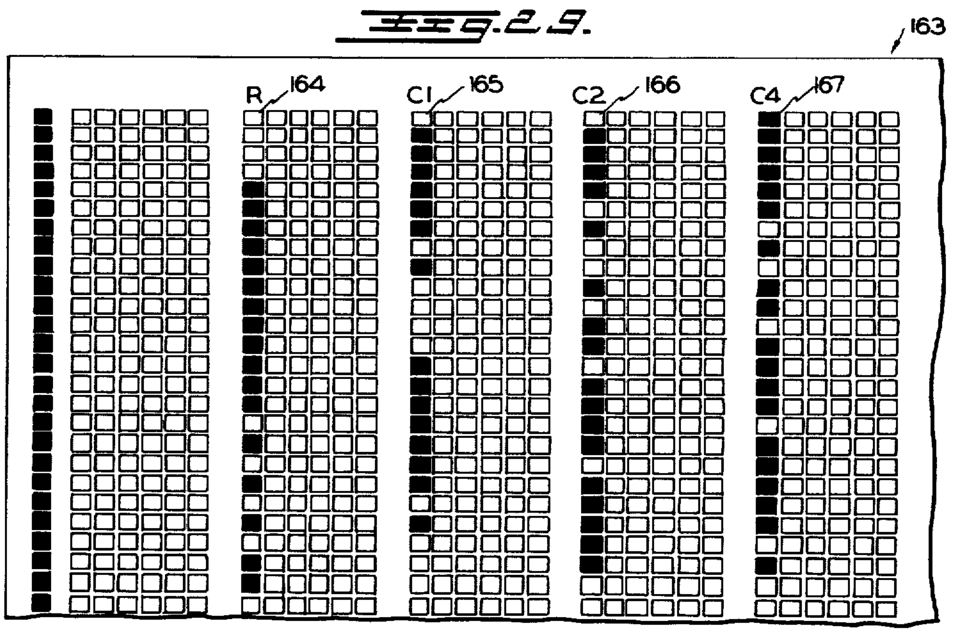
FIG. 29 shows a portion of a sheet useful in accomplishing recording of raw data and converted data having the relation shown in FIG. 28.

Marked boxes corresponding to the layout shown in the columns in FIG. 28 designated by the reference numeral 162 are shown on sheet 163 in FIG. 29. The boxes for the raw score data are entered in the left-hand column 164 of one of the six box wide columns shown in FIG. 29. The three columns containing the converted score data are separated so that each converted score column is located in a different six box wide column as shown in FIG. 29. Thus, column 165 contains the converted score data appearing under the heading C1, column 166 contains the converted score data appearing under the heading C2, and column 167 contains the converted score data appearing under the heading C4. Upon comparing the converted score data columns shown in FIG. 29 with the converted score data columns in the group of columns designated by the reference numeral 162 in FIG. 28, it will be evident that the arrangement shown in FIG. 29 is simply a horizontal spacing apart of the columns with the vertical relation between the respective columns remaining the same in FIGS. 28 and 29.

When sheet 163 is passed under the Lucite rod ends which feed the phototubes 127 at Station 2, the apparatus operates in the manner heretofore described to cause four columns or tracks of magnetized bits to appear on drum surface 55, the magnetized bits corresponding in position to the marked boxes appearing in the columns 164–167. Because columns 164–167 are located in different six box wide columns on sheet 163, the magnetized bits located in each row on the drum surface are entered from left to right a fraction of a second apart as has been described above in connection with the sensing and recording of the correct answers on basic answer sheet 11. The significance of this is that, in later reading the magnetized bits on the drum surface, signals obtained in each row making up the converted score data columns 165–167 are spaced apart a minute fraction of a second thus enabling individual pulses to be sent, for each of these columns, to different stages of an electronic counter of the binary type.

Figure 30:
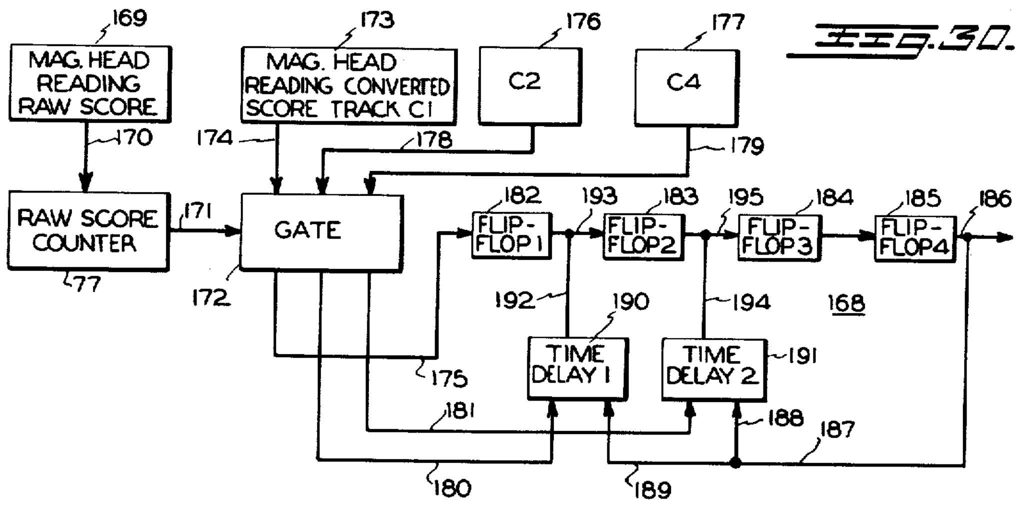
FIG. 30 is a circuit diagram showing circuitry useful to obtain converted data totals where the raw data to converted data relation is like that shown in FIG. 28.

Such a counter, designated generally by the reference numeral 168, is shown in the block diagram of FIG. 30. When the magnetic drum 54 revolves so that the four tracks thereon containing the magnetized bits of information corresponding to the pattern shown in columns 164–167 of FIG. 29 begin to pass under four of the magnetic induction reading heads 53, these reading heads sense the magnetized bits and emit signals. Thus, the magnetic induction head reading the raw score track on the magnetic drum surface corresponding to column 164 in FIG. 29 is designated by the block 169 in FIG. 30 and produces pulses on line 170 which are fed to the raw score counter 77. This counter has previously been switched to include one more than the complement of the raw score entered therein during the scoring operation so that, as described above, when the number of pulses fed to the raw score counter equals the raw score made by the examinee for the test involved, a spill-over pulse appears on line 171 and shuts off the gate 172 thus blocking further passage of pulses representing converted score data.

In the meantime, however, and until the cut-off occurs, the magnetic induction heads reading the three tracks on the drum surface containing magnetized bits according to the pattern shown in columns 165–167 in FIG. 29 are causing signals to appear as these respective magnetic induction reading heads sense magnetized bits. Thus, the magnetic induction head designated by block 173 is reading the C1 converted score data and sending signals on line 174, through gate 172 and onto line 175. Correspondingly, the magnetic induction heads designated by blocks 176 and 177 cause signals to be transmitted on lines 178 and 179 which, after going through gate 172, appear on lines 180 and 181 respectively.

Blocks 182–185 designate four electronic or electromechanical devices, such as vacuum tube flipflops, each of which has two stable states and which can be changed from one stable state to another by an input pulse. Such flipflops are known to those skilled in the art and hence further detailed description of them is deemed unnecessary. If the flipflops were simply connected in series and input pulses fed into the first flipflop 182 from line 175, they would form a binary counter with sixteen unique combinations which can represent numbers zero through fifteen as is well known to those skilled in the art. Hence, if a train of pulses were fed into flipflop 182 from line 175 the sixteenth input pulse would cause an output pulse to be emitted from flipflop 185 and appear on line 186.

However, as shown in FIG. 30, a feed-back line 187 is connected to output line 186 and feeds, through lines 188 and 189 into two time delay devices designated by blocks 190 and 191. From time delay device 190 the feed-back is through line 192 to line 193 which is the input to flipflop 183. Similarly, for time delay device 191, the feed-back is through line 194 to line 195 which is the input to flipflop 184. Time delay devices 190 and 191 may be any suitable electronic or the like device capable of delaying the passage of pulse information through the device for a predetermined period of time. The reason for the time delay devices is so that pulses fed therethrough will arrive on lines 193 and 195 in proper spaced relation to carry pulses fed from flipflop 182 to 183 and from 183 to 184. In other words, if an output or carry pulse is emitted from flipflop 182 or 183 it should not coincide exactly with a feed-back pulse appearing on line 193 or 195.

The effect of the feed-back arrangement shown in FIG. 30 is to convert the counter 168 into a scale of ten or decade counter rather than a scale of sixteen pure binary counter. The manner in which the circuitry of counter 168 accomplishes this will be apparent to those skilled in the art. More importantly, the feed-back arrangement permits a so-called broadside feed to the counter. Thus, if a single input pulse is fed into the counter on line 175 to flipflop 182 it advances the counter to the next successive state and the counter has effectively counted one or has added one to whatever number has previously been stored in the counter. However, a single pulse fed into the counter on line 180, through time delay device 190, line 192 and line 193 to flipflop 183, will advance the counter two successive stages and therefore will add two to whatever number was stored in the counter. This is because flipflop 183 is in the second binary position. A train of input pulses fed by line 193 into flipflop 183 will cause the counter to count by twos. Similarly, any input pulse appearing on line 195 and fed into flipflop 184 will advance the counter four successive states and add four to whatever number the counter contains.

Input pulses can be fed into the counter substantially simultaneously on different lines so that substantially simultaneous input pulses on line 175 and line 195 will add five into the counter. A single input pulse on each of lines 175, 193, and 195 at substantially the same time will add seven into the counter. Thus, any number from zero through seven can be added into the counter at practically one instant of time. The rate at which successive pulses can be fed into the counter on the various lines 175, 180 and 181 from gate 172 is dependent on the characteristics of time delay devices 190 and 191 as well as the inherent time delays of whatever bistable devices are used as flipflops 182–185.

It is therefore evident that, as the magnetic induction reading heads 53 involved sense the magnetized bits in each row of the tracks on drum surface 55 containing the converted code data C1, C2 and C4, signals are fed through lines 175, 180 and 181 into the counter 168 depending upon the magnetized bits sensed to advance it any amount from one to seven. This enables converted score numbers to be obtained which are quite large as compared to the corresponding raw score numbers. As output pulses appear on line 186, each output pulse representing a count of ten, they can be fed into other counters to accumulate larger totals than the capacity of counter 168 and the counting process will continue until gate 172 shuts off. By this time a converted score total of 125 will have been processed through counter 168 for the example described.

While the preceding description refers to broadside feeding of the converted score counters, if the range of raw scores is very much greater than that of the converted scores, broadside feeding of the binary raw score counters may be accomplished. Also, if the ranges of both raw and converted scores are large, but there are relatively few entries in each column of the conversion table, broadside feeding of both the raw and converted score counters may be desirable to save space on the magnetic drum surface.

In summary, as regards converting raw score totals according to the teaching of the present invention, the proper conversion score to raw score data is fed into the apparatus and recorded in the magnetic drum or memory 54 in advance of the actual scoring of each test answer sheet. Then, during a portion of the revolution of the magnetic drum following the actual obtaining of the raw score for a particular test answer sheet, the raw score is converted to a converted score and the converted score total entered into a converted score counter from which it can be printed out by a high speed printer mechanism. If desired, the various converted scores for the individual test answer sheets being scored can be further processed as converted scores to obtain a total, for example, of all of the converted scores or to perform any other desired operation on the converted scores. Thus, during a single revolution of the memory or magnetic drum 54 each test answer sheet is scored, the raw score converted to a converted score, and the converted score either further processed or printed out directly as the converted score for the particular test involved. Since drum 54 revolves rather rapidly the extremely high speed of the apparatus is evident.

*Alphabetic Data*

Referring back to FIG. 2, the rear side 3 of test answer sheet 1 is shown as including an alphabet grid 10 in the lower right-hand corner thereof. This grid has been described as having twenty-six rows, one row for each letter of the alphabet, and twenty columns. The name JOHN DOE is printed in seven of the boxes in row 9 beneath the grid as shown in FIG. 2 and the column above each letter making up the name has been marked at the box corresponding to the position of that letter in the twenty-six rows making up the alphabet. When this particular test answer sheet 1 is fed into the apparatus, side 3 of sheet 1 is uppermost. The alphabet grid 10 is read at Station 2 by twenty of the fifty-seven phototubes 127 located at Station 2.

Figure 31:
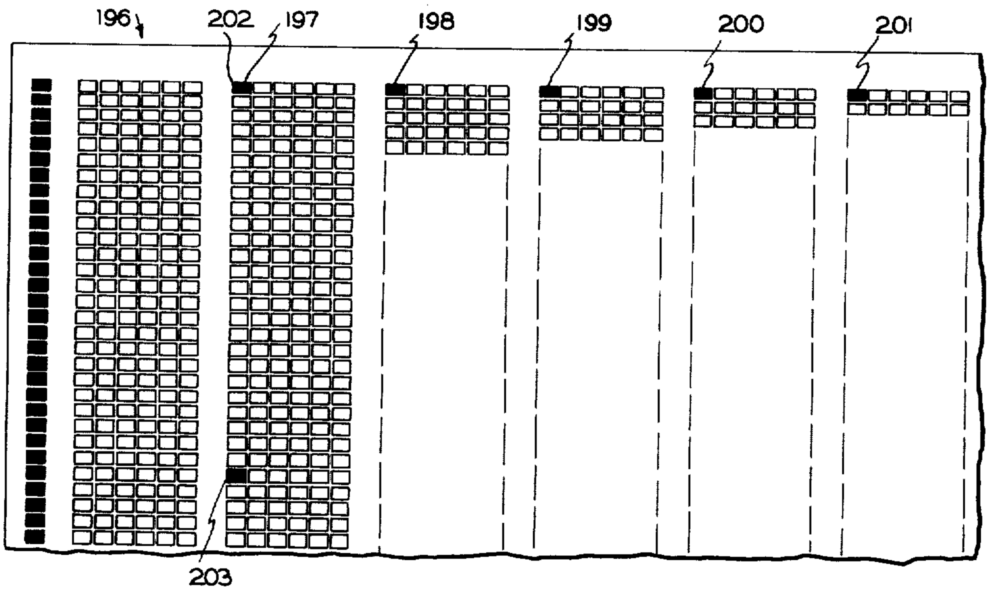
FIG. 31 shows a portion of a sheet useful for accomplishing recording of alphabetic data according to the teaching of the present invention.

However, in order to enable this reading to be effective for the purpose intended, it is necessary that the memory or magnetic drum 54 contain the correct alphabet code information for comparison with the marked boxes in grid 10 actually sensed by the phototubes at Station 2. Accordingly, a sheet 196 shown in FIG. 31 is employed upon which boxes are marked in accordance with the particular coding utilized to designate the different letters of the alphabet. A preferred type of coding is to utilize five positions or boxes since this makes available, according to the binary system, thirty-two possible combinations of markings. Since there are only twenty-six letters involved in the alphabet there is ample capacity in a thirty-two possible combination system.

The five box positions in each row of five boxes are preferably located in five separate six box wide columns as shown in FIG. 31 since, due to the slightly offset position of the phototube pickups which sense each set of six boxes in a particular row, the magnetized bits entered onto drum surface 55 are thus slightly offset time-wise from each other to give a train of closely spaced pulses in each row. This, of course, has been described in general above in connection with the sensing and recording of data on basic answer sheet 11. The five boxes in each five box row are thus located in columns 197–201 shown in FIG. 31. There are twenty-six rows of boxes utilized in these columns and for any given row the marking of the various ones of the five boxes in the row will depend of course upon the coding which represents the particular letter of the alphabet involved. Thus, the boxes marked in row 202 can be the code for the letter A of the alphabet while the boxes marked in row 203 can be the code for the letter Z of the alphabet. It is re-emphasized that each row 202, 203, etc. consists of five boxes with each box being located in a particular column 197–201.

When sheet 196 proceeds past Station 2, the marked boxes are sensed by phototubes 127, as has been described in serial relation within each row and row by row until all twenty-six rows of boxes have been sensed. Small discrete areas or bits are magnetized on the drum surface 55 in five tracks wherein the bits in the tracks correspond in position to the marked boxes in columns 197–201. The alphabet code information is thus recorded in the memory or magnetic drum 54 and is available for sensing in conjunction with the sensing of marked entries in the alphabet grid 10 on the particular test answer sheet being scanned at Station 2.

While the alphabet code markings are shown as being entered on a sheet 196, it is preferred in practice to enter both the conversion code markings of the various types shown in FIGS. 21, 27, or 29 and the alphabet code markings on the same sheet since, normally, ample room will be present on the sheet for such entries. Then, both the conversion code markings and the alphabet code markings are read at Station 2 and are entered as magnetized bits on the drum surface 55 in that portion of the drum revolution which follows the sensing and scoring of each particular test answer sheet passing under the phototubes at Station 1.

When a test answer sheet 1 does pass under the phototubes at Station 2, each of the twenty phototubes 127 which scan the twenty columns making up the alphabet grid 10 will sense any mark appearing in the column which the particular phototube is sensing. The sensing occurs row by row for the twenty-six rows of the alphabet grid 10 since the test answer sheet is proceeding lengthwise with the edge 23 leading as shown in FIG. 2. At the same time, the five magnetic induction heads 53 which recorded the alphabet code information on the drum surface 55 initially are now reading the recorded magnetic bits simultaneously with the passage of the alphabet grid under the twenty phototubes 127 at Station 2. If, for any given row of magnetized bits on the drum surface, there is a mark, or marks, present in the corresponding row of the alphabet grid then the phototube reading that particular mark will emit a signal which permits the corresponding alphabet code information being sensed by the five magnetic induction reading heads 53 to go to storage counters.

Figure 32:
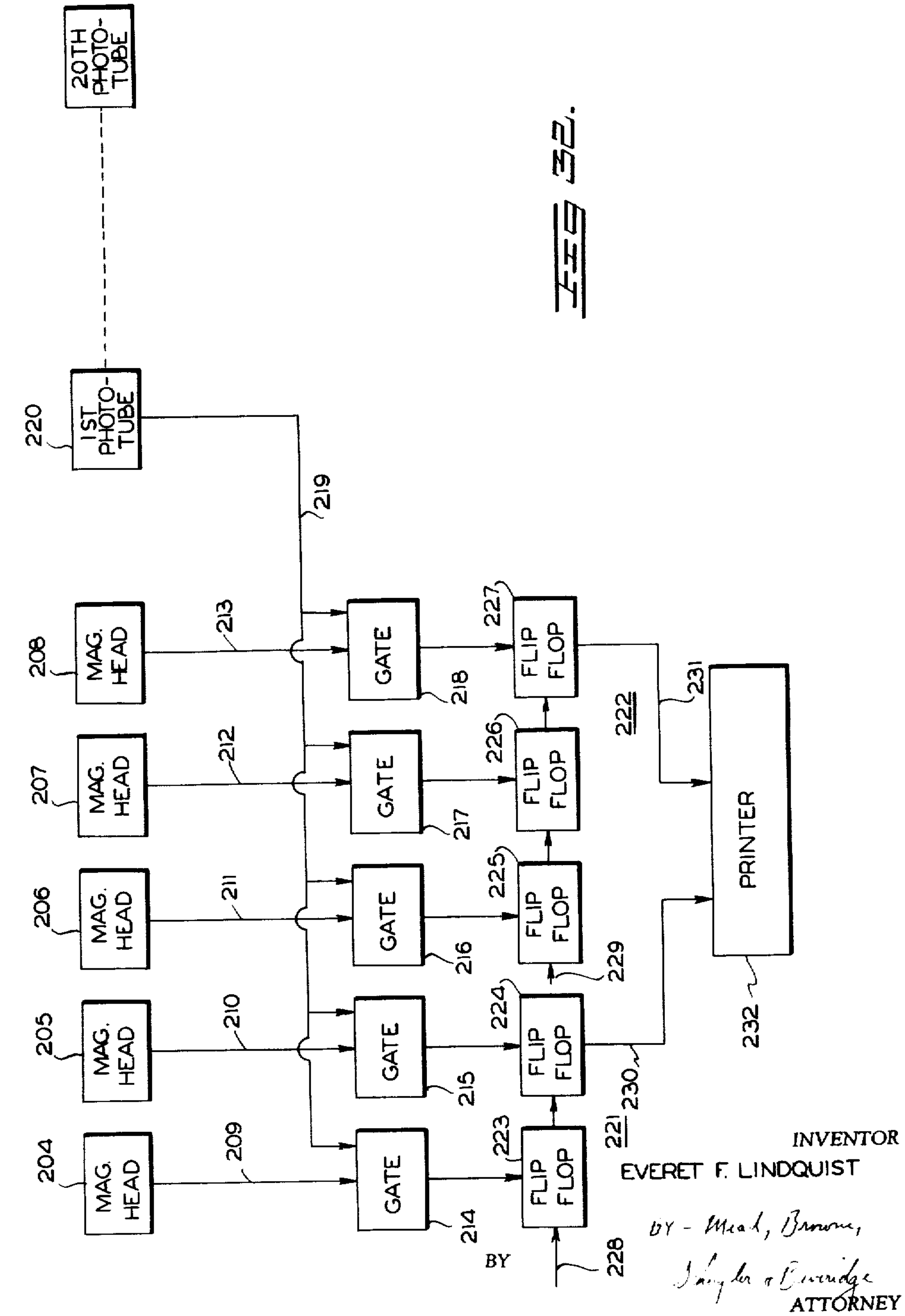
FIG. 32 is a circuit diagram showing circuitry useful for accomplishing printing out of alphabetic data.

All of this is shown more fully in the block diagram of FIG. 32 where the five magnetic induction reading heads 53 involved are designated by blocks 204–208. As these magnetic induction heads sense the twenty-six rows of magnetized bits on drum surface 55 containing the alphabet code, signals will appear on the output leads 209–213 for the respective magnetic induction reading heads. Furthermore, within a given row, the signals will be spaced apart a minute fraction of a second.

The leads 209–213 feed into electronic gates 214–218. These gates are of the type known in the art which will produce an output signal only if two proper input signals to the gate occur. Lead 219 is shown as feeding into each of the five gates 214–218 and this lead is the output lead of a phototube 127 designated by block 220. This can be assumed to be the first of the twenty phototubes at Station 2 which scan the alphabet grid. Thus, if the phototube designated by block 220 senses a marked box in the column of the grid 10 which it is scanning then a signal will appear on line 219 and be fed to each of the five coincidence gates 214–218.

Correspondingly, the signals appearing on lines 209–213 will be the signals resulting from the magnetic induction heads 53 involved sensing the particular magnetized areas or bits present in the corresponding row of the five tracks on the magnetic drum containing the alphabet code. Consequently, this alphabet code will pass, in the form of electrical pulses, through the particular gates 214–218 involved and will go to either one or both of the electronic counters designated generally by the reference numerals 221 and 222. Counter 221 is a two stage binary counter made up of flipflops 223 and 224 while counter 222 is a three stage binary counter made up of flipflops 225–227. While a two stage and a three stage binary counter are shown, any suitable type of storage device may be employed to receive and retain the pulse information transmitted through gates 214–218, the object being to pass the code sensed by the magnetic induction reading heads designated by blocks 204–208 whenever a particular phototube senses a marked box in the alphabet grid which requires this particular code.

Therefore, as the alphabet grid 10 is scanned row by row and the magnetic drum surface 55 is scanned for the corresponding rows of magnetized bits, then each time that a marked box on the grid is sensed the corresponding sensed magnetized bit information is, in effect, gated through to a suitable control means for the printer to cause the printer to print the particular letter involved. As an example of one type of control means for the printer, control or input pulses can be fed into counter 221 on line 228 and likewise into counter 222 on line 229 to cause carry pulses to appear on lines 230 and 231 respectively which will be fed into the printer, through suitable intermediate devices or circuitry if desired, to cause the printer to print a particular letter. The number of carry pulses appearing on lines 230 and 231 will obviously depend upon the state of the flipflops in each of the counters 221 and 222.

FIG. 32 shows five gates 214–218 and five flipflops 223–227 associated with one phototube designated by block 220. There are five gates for each of the twenty phototubes sensing the alphabet grid 10 and, in the example illustrated as the type of counter employed, five flipflops for each of the twenty phototubes. The five magnetic induction reading heads designated by the blocks 204–208 connect to each of the twenty sets of five gates. There are therefore five magnetic induction heads, twenty phototubes, one-hundred gates and one-hundred flipflops involved in the alphabet sensing and printing out operation according to the embodiment described and illustrated.

By using a suitable high speed output printer the examinee's name can thus be printed onto the information sheet containing his converted score total or other data which is printed thereon. Furthermore, all of this is accomplished in the slight amount of time taken for the magnetic drum 54 to make one revolution.

*Numeric Data*

In some instances it is desirable to record numeric information (such as chronological age or scores on other tests) concerning the examinee who is completing a particular test answer sheet so that the numeric information may be sensed and printed together with the convereted score or other information which is printed out at the completion of the converting operation as has been described above. In this way, the numeric information entered on the test answer sheet by the examinee, for example, a score obtained on a previous test or whatever type of numeric information may be called for, may be correlated with the score data obtained in the sensing and scoring of the particular test answer sheet involved.

Figure 34:
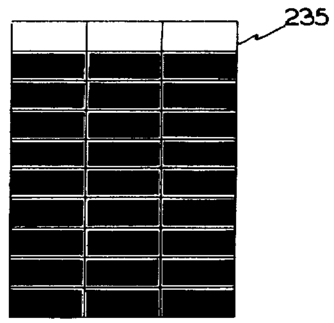
FIG. 34 shows a marked grid for recording key numeric data.
Figure 35:
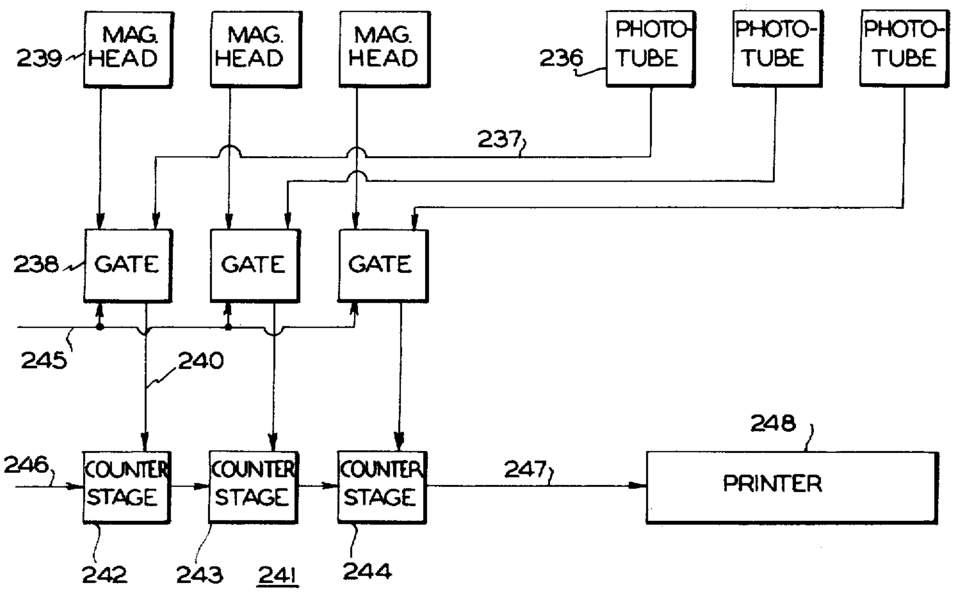
FIG. 35 is a circuit diagram showing circuitry useful for accomplishing printing out of numeric data.

It is believed apparent that numeric information may be entered on the test answer sheet by the examinee in the manner described above in connection with the entering of alphabetic data, such as the examinee's name. In other words, instead of employing letters of the alphabet in conjunction with the grid 10 shown in FIG. 2, numerals could be employed and the marked numerals sensed and processed in the manner described above in connection with the processing of the marked alphabet information to obtain a desired numeric output. In addition to the handling of numeric data in the manner described above in connection with alphabetic data, there are various other ways in which the numeric information can be entered by the examinee on the test answer sheet and then sensed and processed to obtain a desired numeric data output printed out by the printer. One other way of accomplishing this is illustrated in FIGS. 33–35.

Figure 33:
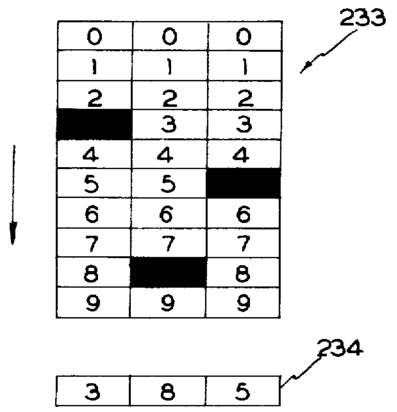
FIG. 33 shows a numeric grid useful for entering numeric data according to the teaching of the present invention.

Referring to FIG. 33, a numeric grid 233 is shown as comprising three columns each containing the numerals zero to nine. Beneath the grid 233 is a row 234 of three boxes in which the examinee will enter the numeric information. In the example shown, three columns are employed giving a range of numbers into the hundreds but obviously any desired number of columns could be provided to give a greater range if needed. Grid 233 and the row of boxes 234 can be printed or otherwise suitably placed on the test answer sheet like the alphabet grid 10. The examinee will enter the numeric data in row 234, marking out in the columns above, the boxes corresponding to the numbers entered in row 234 as shown in FIG. 33. In the example shown, the examinee has entered the number 385 in row 234 and has correspondingly marked out the boxes 3, 8 and 5 in the respective columns above the boxes in row 234.

Prior to the actual sensing of numeric grid 233, numeric code information will have been entered on the magnetizable surface 55 of the magnetic drum or memory 54. This is accomplished by suitably marking boxes on, for example, any of the sheets containing the conversion code information for converting raw score to converted score totals. Thus, boxes appearing on the conversion sheet, such as sheet 126 shown in FIG. 21, or for that matter on the sheet such as 196 in FIG. 31 which contains the alphabet coding, can be marked in a manner shown in FIG. 34 as the code for numeric grid 233. Referring to FIG. 34, it will be noted that there are ten rows divided into three columns thus providing a number of boxes equal to the number of boxes in the numeric grid 233. All rows except the uppermost row 235 are blocked out, i.e. the boxes in these rows are marked by pencil or the like so that they are suitably opaque. When the marked boxes appearing in the three columns shown in FIG. 34 pass under the reading ends of three of the phototubes 127 at Station 2, three columns or tracks of magnetized bits are written into or recorded on the magnetizable surface of drum 54 by the three magnetic induction heads 53 corresponding to the particular three phototubes 127. Each track of magnetized bits will contain 9 bits and all of the bits will occupy the same relation as the marked boxes shown in FIG. 34.

With the numeric code information thus entered in the memory or magnetic drum 54, when an examinee's test answer sheet goes to Station 2 for sensing of the information or data appearing in numeric grid 233, the three phototubes reading the three columns of figures shown in FIG. 33 will sense any marked boxes appearing in these columns. Assuming that the numeric grid is proceeding in the direction of the arrow shown in FIG. 33, then the phototube scanning the hundreds column will not find a marked box until box three. However, when it does find marked box three, it will emit a signal which will permit three signals from the magnetic induction reading head 53 which is reading the corresponding track on the magnetic drum surface. Similar action will take place with respect to the phototubes and magnetic induction reading heads involved in the sensing of any marked boxes appearing in the tens or digit column of the grid shown in FIG. 33.

Referring to FIG. 35, if it be assumed that the phototube designated by the block 236 is sensing the hundreds column of grid 233 then, as explained above, this phototube will find the first marked box in numeral three position. When it does sense this marked box it will transmit a signal on line 237 to gate 238. The signal on line 237 opens gate 238 and holds it open while the corresponding magnetic induction reading head designated by block 239 senses the remaining three magnetized bits appearing in the track on the drum surface corresponding to the upper three marked boxes in the left-hand column shown in FIG. 34. Gate 238 therefore passes three pulses or signals to line 240, these pulses being fed into a suitable electronic counter.

In FIG. 35, an electronic counter is designated generally by the reference numeral 241 and is shown as comprising three stages designated by the blocks 242–244. Stage 242 can be the hundreds stage of the counter and consequently the three signals fed into this stage on line 240 will advance this particular stage of the counter three hundred units. In similar manner, the boxes marked in the tens and the digit columns of the numeric grid 233 are sensed and the respective pulse or signal totals fed into the respective stages of counter 241. It is to be re-emphasized that any suitable type of electronic counter known to those skilled in the art may be employed for receiving and cumulating the pulses or signals fed to the counter in the manner desc: ibed.

After the last or zero row of numeric grid 233 has passed under the reading ends of the three phototubes 127 reading this grid at Station 2, gates 238 are reset, as by a signal fed into the gates by line 245, to reset the circuitry for the reading of the next numeric grid appearing either on the same test answer sheet or on a subsequent test answer sheet. Gates 238 are any suitable type of electronic gate circuit known to those skilled in the art capable of remaining open for a period of time upon receipt of what might be called an opening signal and then being reset at the end of the period of time.

In a manner similar to that described above in connection with alphabetic data, signals can be fed by line 246 into counter 241 to cause predetermined carry pulses or signals to appear on line 247 depending upon the count held by counter 241, these carry pulses or signals actuating printer 248 to print the particular number involved.

Figure 36:
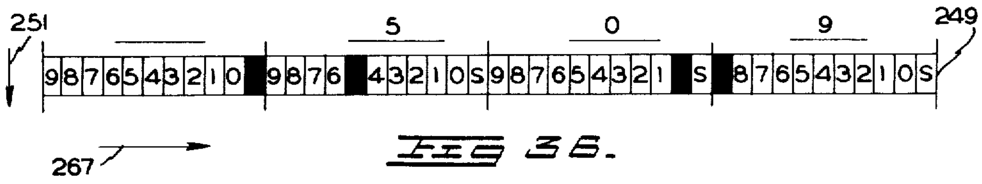
FIG. 36 shows another arrangement for entering numeric data.
Figure 37:
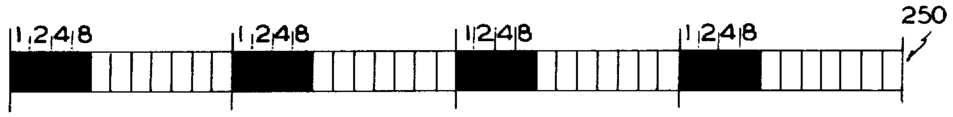
FIG. 37 shows another arrangement for recording key numeric data.
Figure 38:
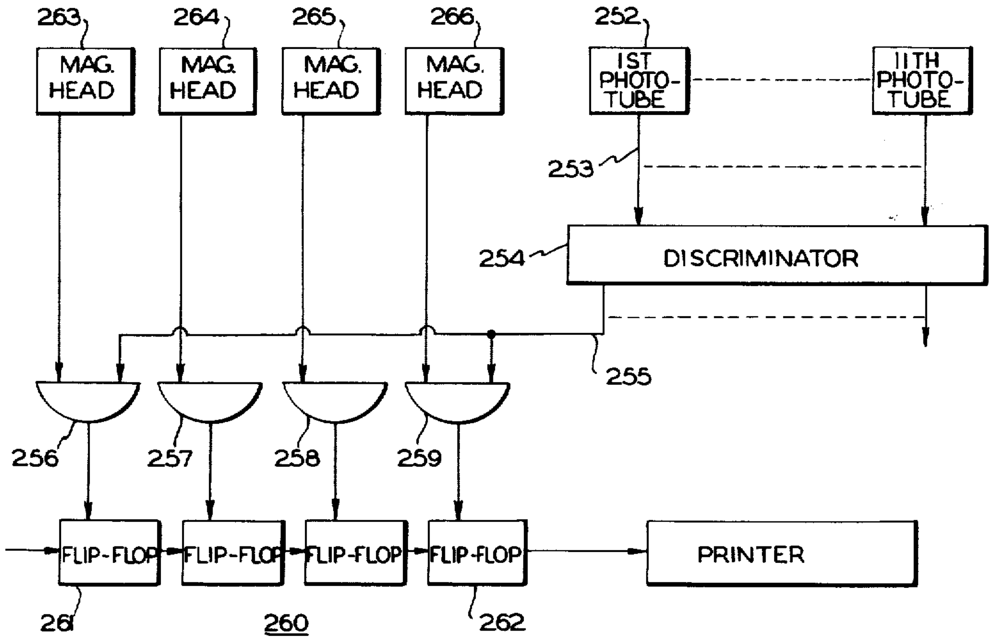
FIG. 38 is a circuit diagram showing circuitry useful for accomplishing printing out of numeric data entered according to the arrangement shown in FIGS. 36 and 37.

Still another example of processing numeric data is shown in FIGS. 36–38. FIG. 36 shows a row of boxes which can be printed or otherwise suitably placed on a test answer sheet and there can be but a single row of the boxes as shown or plural rows of such boxes if it is desired to have the examinee enter more than one set of numerical data on the test answer sheet. However, assuming for the moment that there is but the one row printed or otherwise suitably placed on the test answer sheet, it will be noted that the examinee can enter the numerical data on lines appearing above each of the four sets of eleven boxes making up the complete row shown in FIG. 36. Thus, this type of numerical entry provides for a number in the thousands range but, obviously, a higher number can be accommodated within practical limits.

In the example shown in FIG. 36 the examinee has entered the number 509 on the lines above the sets of boxes and in each eleven box set beneath each entry has marked the box corresponding to the entered numeral. The corresponding row on the conversion code sheet or its equivalent is marked so that four boxes in each set of eleven boxes are filled in. The reason for marking four boxes is that it is preferable to utilize a binary coding which is ample to accommodate the eleven possible entries in each set of eleven boxes shown in row 249 in FIG. 36. Then, when the marked boxes in row 250 of the conversion sheet or its equivalent are sensed by phototubes at Station 2, a row of magnetized bits is written into, recorded, on the surface of magnetic drum or memory 54. In the example shown, sixteen phototubes 127, four phototubes for the four marked boxes in each set of the eleven boxes in row 250, and the corresponding sixteen magnetic induction heads 53 will be involved in the sensing and recording of the marked boxes in row 250 as magnetized bits on drum surface 55.

When a test answer sheet proceeds to Station 2, and assuming that the direction of travel of the sheet is as indicated by arrow 251 in FIG. 36, each box making up row 249 is sensed or scanned by a phototube 127 at Station 2. This involves a total of forty-four of the fifty-seven phototubes at Station 2 since there are eleven boxes in each set of boxes making up row 249. Whichever phototube of a given set of eleven phototubes senses a marked box in that set of eleven boxes, the sensing phototube will cause a signal to be sent to particular gates according to the binary coding employed in entering the numeric code data as magnetized bits on drum surface 55. The electrical circuitry involved in the numeric data sensing according to the particular example being considered is set forth in block diagram 38.

This block diagram shows circuitry involved in the sensing of one of the eleven box sets making up row 249 and it will be understood that the circuitry of FIG. 38 is duplicated in conjunction with the other three eleven box sets making up the complete row 249. Thus, there is a circuit for the units digit, a circuit for the tens digit, the hundreds digit, and the thousands digit making up any particular number entered by the examinee as numeric data. In the example shown, and for the units digit nine of the number 509, the phototube sensing the box containing the numeral nine in the right-hand set of eleven boxes making up row 249 senses a marked box since nine is the units digit. This phototube, which is designated by block 252 in FIG. 38, causes a signal to be emitted on line 253 which is fed into a discriminating circuit indicated by block 254. The discriminating circuit may be of the type shown in FIG. 16 and the purpose of feeding the phototube signal through the discriminating circuit is to pass only the stronger signal in case there has been a smudged entry in another box or possibly an erasure in another box which causes a weak signal to be picked up by another phototube.

After passing through the discriminating circuit indicated by block 254, the signal is fed on line 255 to those coincidence gates 256–258 which feed to the proper stages of a binary counter designated generally by the reference numeral 260. In the example being described, the signal is fed to gate 256 and 259 because these gates feed into the first and fourth stages of the binary counter designated by blocks 261 and 262. It is assumed of course that the first stage of the counter designated by reference numeral 261 is the units stage of the counter and that the fourth stage designated by block 262 is, in the binary system, the fourth or "8" stage. Thus, a signal fed into these two stages will enter a total of one plus eight or nine into the counter. Then, by suitable control signals, carry pulses can be produced to actuate the printer to print out the units digit 9 of the total number 509.

The sensing of marks in the tens and hundreds sets of boxes in row 249 will proceed as has been described in connection with the sensing of the units digit nine. The result is that the total number 509 is printed out. It is understood of course that the four magnetic induction heads designated by blocks 263–266 are reading or sensing the magnetized bits on the drum surface, there being four bits in a row on the drum surface corresponding to the marked boxes in the set of boxes in the units digit position of row 250, as the eleven phototubes are sensing the eleven boxes making up the units digit boxes in row 249. In this way the signals from the magnetic induction reading heads appear at gates 256–259 and are allowed to pass in accordance with the control signals fed through the discriminating circuit 254 from the respective phototubes involved.

Processing of numeric data as described in connection with the examples shown in FIGS. 36–38 has the advantage of increased reliability due to the fact that the phototube sensing signals are fed through discriminating circuit 254 thus eliminating erasures and other unintentional markings which might otherwise be detected by one or more of the phototubes. Reliability can be increased even further by passing the row of boxes containing the numeric data under a single phototube at Station 2 and stopping the phototube pickup beyond the highest numeral in the particular number entered. Thus, in the example shown in FIG. 36 it will be noted that in each set of eleven boxes there is one box containing the letter S. In the example shown the numeral is 509 and hence there is no digit in the thousands position. Accordingly, the S box in the set of eleven boxes applying to the thousands digit is marked. Therefore, assuming that the row of boxes proceeds past a phototube pickup in the direction of the arrow designated by the reference numeral 267 in FIG. 36, then the phototube pickup will finally sense the marked S box in the group of boxes for the thousands digit. The circuitry can be arranged that when an S box is sensed because it is marked, then further phototube pickup will cease and hence any unintentional marks to the left of a marked S box will not be picked up. In the event that the numeric data is passed in the direction of the arrow 267 then of course the output from the phototube pickup will have to be coordinated in connection with the position of a particular box in each set of eleven boxes so that proper coding pulses or signals are sent to the respective gates 256–259. However, such details of the actual circuitry needed to achieve the desired result can be provided by those skilled in the art and hence further description thereof is deemed to be unnecessary.

*Graphic Plotting of Data*

When a group of test answer sheets are processed according to the teaching of the present invention and the raw or converted scores made by each examinee obtained as described above, it is often desirable to know how the scores are distributed over the range of possible scores. In other words, for the same test on a number of test answer sheets, information may be desired as to the high score, the low score, and the distribution of scores from high to low. This may be referred to as obtaining the frequency distribution of scores on any given test for a succession of individual test answer sheets.

Figure 39:
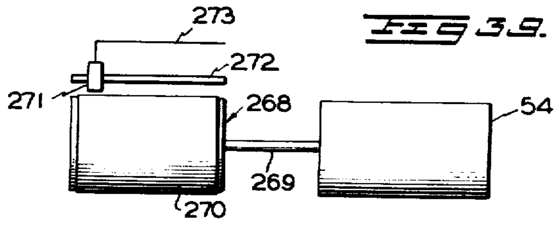
FIG. 39 is a schematic showing of an arrangement for obtaining frequency distribution of data according to the teaching of the present invention.

Such information may be obtained according to the teaching of the present invention at the same time that the raw scores are being obtained for each test appearing on an individual test answer sheet. In a preferred embodiment, this is accomplished by suitably connecting another drum to revolve with magnetic drum 54 and providing means on this other drum to make a record each time that a raw score for a particular test is available. A schematic showing of such an arrangement is given in FIG. 39. As shown there, a drum indicated generally by the reference numeral 268 is mounted on a shaft extension 269 extending from magnetic drum 54. The object is to have drum 268 rotate with magnetic drum 54 and the desired coupling may be accomplished in any suitable manner either directly as shown or by suitable gearing.

Drum 268 carries a readily detachable wide magnetic tape indicated by the reference numeral 270, this tape being mounted on drum 268 so as to be held tightly thereon. A magnetic induction head 271 is located in close proximity to magnetic tape 270 so as to be able to magnetize discrete areas or bits in the tape and to be able to sense any such magnetized bits. Magnetic induction head 271 is supported by any suitable means, such as rod or rods 272, so as to be movable axially with respect to drum 268. As drum 268 revolves, magnetic induction head 271 is moved slightly axially of the drum by any suitable means, not shown, so that the magnetic induction head moves slowly in a path parallel to the axis of rotation of drum 268. Assuming that magnetic induction head 271 moves at a slow constant rate of movement, it is apparent that, as drum 268 revolves, any bits magnetized in tape 270 will lie in a spiral path.

Magnetic induction head 271 is energized via lead 273. Lead 273 may be connected to lead 147 for example (see FIG. 24) so that each time that a spill-over pulse appears on lead 147 it will also appear on lead 273 and energize magnetic induction head 271 thereby causing a bit to be magnetized in tape 270. Since, as explained above in connection with the description under the heading Conversion, the spill-over pulse which appears on lead 147 represents the raw score made by an examinee for a particular test, the bit magnetized in tape 270 also represents this raw score. Therefore, whenever magnetic induction head 271 is energized for a given test in a succession of test answer sheets, the magnetized bits can provide a comparison as to the raw scores obtained for this given test in the succession of test answer sheets involved.

The position of each magnetized bit along the circumference of drum 268 will depend upon the magnitude of the raw score. However, all raw scores of equal value will lie in the same row extending across the circumference of drum 268, i.e. in a line extending parallel to the axis of rotation of drum 268. The total number of parallel rows extending axially across the circumference of drum 268 depend upon the number of rows of answer boxes involved in the particular test under consideration. It is also apparent that the circumferential distance on drum 268 occupied by the total number of rows for any given test will correspond to the circumferential length on the surface of drum 54 occupied by the raw score information for this particular test, i.e. by the bits on the surface of drum 54 corresponding to the marked boxes in column 121 of FIG. 21 for example.

The scores for more than one test may be recorded with a single magnetic induction head. For example, suppose that on the conversion sheet the raw score and converted score marks for Test 1 occupied the first 32 rows, as in FIG. 21. Suppose that the raw score and converted score marks for Test 2 occupied the next 40 rows (but different columns) and that the raw and converted score marks for Test 3 occupied the next 45 rows, or a total of 117 rows. If the spill-over pulses during conversion from the raw score counters for Tests 1–3 were all fed to the same magnetic induction head, there could be one row of magnetized bits on tape 270 for each row on the conversion sheet containing a raw score mark for one of these tests. The first set of rows on tape 270 would represent raw scores for Test 1. This set of rows would be followed by a number of rows each representing a different raw score on Test 2, after which would come a number of rows each representing a different raw score on Test 3.

Since the entire conversion sheet occupies less than one-third of the circumference of magnetic drum 54, the magnetized bits for the assumed Tests 1–3 would occupy less than a third of the circumference of drum 268. By mounting additional magnetic induction heads, say three induction heads altogether, spaced 120 degrees apart, each magnetic induction head can record raw scores from say three tests, so that the scores for the three tests could be recorded around the whole circumference of drum 268.

Figure 40:
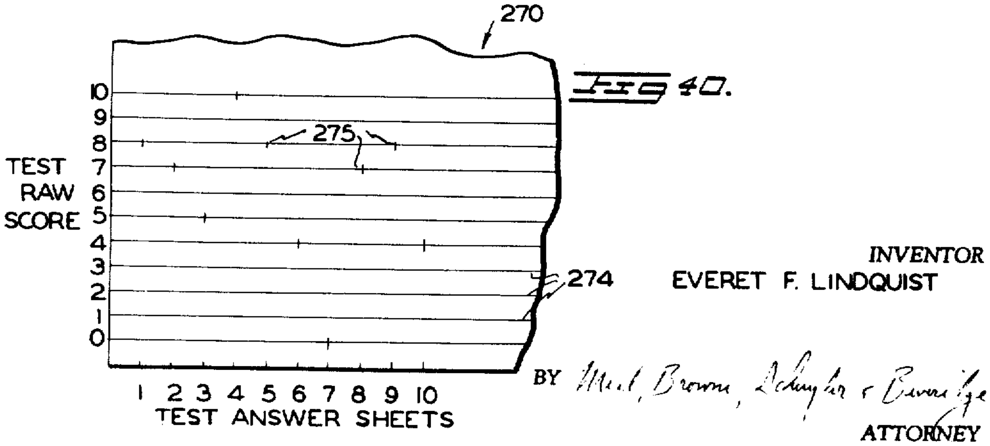
FIG. 40 is a showing of a portion of a recording medium for recording frequency distribution of data.

FIG. 40 shows a portion of magnetic tape 270. It is assumed that the frequency distribution of raw scores is being obtained for a single test having a maximum raw score of 10 in a succession of 10 test answer sheets. Since the maximum raw score is 10, there are eleven rows 274 in which a magnetized bit may appear for this particular test for each test answer sheet. The left-hand edge of the portion of magnetic tape 270 shown in FIG. 40 has these eleven rows indicated by the numerals 0–10.

The dots 275 represent magnetized bits in the portion of magnetic tape 270 shown in FIG. 40. It is observed that for the assumed 10 test answer sheets the distribution of raw scores ranges from one raw score of 0 to one raw score of 10. There are three raw scores of 8, two raw scores of 7, one raw score of 5, and two raw scores of 4. There is thus a total of 10 dots 275 since 10 test answer sheets are assumed as having been scored and the distribution of the raw scores made for the same test on these test answer sheets has been obtained as described.

It is quite apparent that the size of drum 268 will determine the size of the magnetic tape 270 which may be accommodated thereon and will thus determine the number of individual test answer sheets for which the frequency distribution of scores may be obtained as described. The latter is primarily a matter of the axial length of drum 268. When a number of test answer sheets have been processed so that the raw scores for the tests have been obtained, the magnetized bits located in the rows for a given test, such as rows 274, may be sensed to obtain a count of the number of scores appearing in each row. This is preferably accomplished according to the teaching of the present invention by repositioning the magnetic tape 270 on drum 268 so that the rows, such as rows 274, extend circumferentially with respect to drum 268. In other words, the magnetic tape 270 is turned 90° from the position shown in FIG. 40. Magnetic induction head 271 may then be switched to be a reading head instead of a writing head and drum 268 rotated so that the magnetic induction head senses a particular row to detect any magnetized bits appearing therein. Of course, the magnetic induction head will be maintained against axial movement while each row is being sensed and the rows can be sensed in succession until all magnetized bits have been detected.

The teaching of the present invention also comprehends obtaining the frequency of correct responses to individual test questions. This involves magnetizing a discrete area or bit on magnetic tape 270 each time that a correct answer appears for a given test item in a particular test. This can be accomplished by energizing magnetic induction head 271 each time that a correct answer is sensed by a phototube 36 at Station 1. If there is a correct answer then the pulse which goes to the raw score counter can also cause a signal on line 273 to energize magnetic induction head 271 and cause a bit to be magnetized in magnetic tape 270.

If there are 50 items, for example, involved in one test and the examinee answers all 50 items correctly, then there will be 50 magnetized bits in magnetic tape 270 for this one test for one test answer sheet. Correspondingly, each succeeding test answer sheet could result in as many as 50 magnetized bits for this same test and the possible 50 magnetized bits for each test answer sheet would lie along a spiral path on magnetic tape 270. However, for the same test in a succession of test answer sheets, a correct answer to the same test item will result in a magnetized bit in the same row of magnetic tape 270 just as has been described above in connection with obtaining the frequency distribution of the raw score totals. To put it another way, where the frequency distribution of correct responses to individual test items is being obtained, instead of merely obtaining one magnetized bit for a given test on one test answer sheet there can be as many magnetized bits obtained as there are individual test items in said given test.

While magnetic tape has been described as a preferred medium to be placed about the circumference of drum 268, other suitable recording mediums may also be employed. Thus, a readily detachable sheet of electrical conductive paper or the like may be employed in conjunction with a stylus so that each time current passes through the stylus, it will cause a mark to appear on the conductive paper. Also, while the above description has been concerned with the obtaining of the frequency distribution of raw scores, for example, it is apparent that the frequency distribution of converted scores may also be obtained if desired.

*Conclusion*

It is considered evident, from the detailed description given under the various subject headings above, that methods and apparatus according to the teaching of the present invention enable desired output data to be obtained from a tremendous number of sources of original input or raw data at very high speed. In describing the particular utility of methods and apparatus according to the teaching of the present invention in relation to wide scale testing programs in the education field, it has been pointed out that the large amount of manual labor heretofore required for scoring marked answer sheets and for subsequent statistical work has been substantially eliminated. Moreover, many more converting, analyzing and reporting operations can be performed upon the raw score data without sacrificing, to any appreciable extent, the speed of completing the desired reports. The methods and apparatus whereby alphabetic information, such as the examinee's name, and numeric information, such as his age, may be readily processed and printed out and whereby the frequency distribution of test scores and correct responses to individual test items may be plotted further enhance the utility of the present invention in the field of education.

While attention has thus been focussed on the field of education, it is also brought out that methods and apparatus according to the teaching of the present invention also have utility in fields where the problems involved are similar to those described in connection with wide scale testing programs in the field of education. Mention has been made of aptitude and proficiency tests conducted by various Government agencies and by private industry and of census taking and mass surveys of various types. Mention has also been made of such operations as the processing of time cards, inventory sheets, sales slips and the like where it is possible to enter the information or data in accordance with the teaching of the present invention and then process the card, sheet or slip and obtain and report the desired raw or converted information or data in accordance with the teaching of the present invention. A factor worthy of note in relation to all such operations is that the time card, inventory sheet, sales slip or the like upon which the bits of raw data may be entered in accordance with the teaching of the present invention may be processed directly to obtain and report the desired raw or converted information or data. In other words, it is unnecessary to collect the time cards, inventory sheets, sales slips or the like and then transfer the bits of raw data contained thereon to another medium, such as a punched card, in order to further process the raw data.

A magnetic drum has been shown and described as a preferred type of cyclically movable memory capable of recording or storing such bits of data as the correct or key answers to examination questions and bits of data representing the raw to converted data relation. A magnetic drum type of memory has advantages such as reliability, ruggedness, and ease of erasure and replacement of stored information. However, the type of memory employed need not be restricted solely to a magnetic drum type as long as the memory is capable of storing bits of data and of having the stored bits of data read from the memory in accordance with the teaching of the present invention. For example, the memory may be a type employing photoelectric reading means instead of magnetic induction heads.

Accordingly, while I have shown and described embodiments of the present invention I wish it to be understood that I do not intend to be restricted solely thereto but that I do intend to cover all modificaions thereof which would be apparent to one skilled in the art and which come within the spirit and scope of the present invention.

What I claim as my invention is:

1. An apparatus useful for comparing the positions occupied by bits of raw data, such as marks, in a raw data containing means with the positions occupied by corresponding bits of key data, such as marks, in a key data containing means, said apparatus comprising phototube means, means to automatically feed said key data containing means and said raw data containing means in succession past and in proximity to said phototube means to enable said phototube means to sense bits of data contained in said key data containing means and said raw data containing means, a rotatable drum having a magnetizable surface, said drum being rotatable in synchronism with movement of said data containing means, magnetic induction means positioned adjacent to the magnetizable surface of said drum, said magnetic induction means being operable to magnetize a discrete area on said magnetizable surface in any one of a predetermined number of positions in said surface at the same instant of time means connecting said phototube means and said magnetic induction means to magnetize a discrete area on said magnetizable surface when said phototube means senses a bit of key data contained by said key data containing means whereby said bit of key data may be recorded in said drum surface, each bit of key data being recorded in said drum surface in a position correlated to the position occupied by said bit of key data in said key data containing means, means connectible between said phototube means and said magnetic induction means to simultaneously read said recorded bits of key data as said phototube means senses corresponding bits of raw data contained in said raw data containing means, said connectible means emitting a signal each time that a bit of raw data sensed by said phototube means corresponds in position to the position occupied by the corresponding bit of key data read by said magnetic induction means.

2. An apparatus useful for comparing the positions occupied by bits of raw data, such as marks, appearing in a plurality of successive rows on a raw data containing sheet with the positions occupied by corresponding bits of key data, such as marks, appearing in a corresponding number of successive rows on a key data containing sheet, said apparatus comprising a plurality of sheet examining members, means to move said key data containing sheet and said raw data containing sheet in succession past and in proximity to said sheet examining members to enable said members to examine bits of data appearing on said sheets, said sheets examining members examining bits of data serially in each row and row by row until all of the bits of data on a sheet are examined by said examining members, a memory, recording means connected to said examining members to record bits of key data examined by said examining members, in said memory, said bits of key data being recorded in said memory in the row by row relation that said bits of key data occupy on said key data containing sheet, and means connectible between said examining members and said recording and reproducing means to compare a bit of raw data being examined by an examining member with the corresponding recorded bit of key data, said bits of raw and key data being compared in serial relation within each row of bits of data and row by row until all rows of bits of data have been compared.

3. A apparatus useful for comparing positions occupied by bits of raw data, such as marks, appearing in a row in a raw data containing means with the positions occupied by corresponding bits of key data, such as marks, appearing in a corresponding row in a key data containing means, said apparatus comprising a plurality of data sensing members, there being a separate data sensing member for sensing each bit of raw data or its corresponding bit of key data, means operatively associated with said data sensing members to cause a data sensing member to be in sensing relation to a bit of data being sensed at a separate instant of time from when every other sensing member is in sensing relation to the bits of data being sensed by said other sensing members whereby bits of data may be sensed in serial relation by separate data sensing members, a memory, data recording and reproducing means connected to said data sensing members to record bits of key data sensed by said data sensing members in said memory in the same time relation in which said key data sensing is accomplished, said data recording and reproducing means being operable to read the recorded bits of key data simultaneously with the sensing of bits of raw data by said data sensing members, said data recording and reproducing means reading the recorded bits of key data in the same temporal relation in which said data sensing members sense bits of raw data, and means connectible to said data sensing members and said data recording and reproducing means to emit a signal each time that a bit of raw data being compared with a bit of key data occupies a position in said raw data containing means corresponding to the position occupied by the bit of key data in the key data containing means.

4. An apparatus useful for recording bits of data, such as marks, located in a common row on a data containing sheet, said apparatus comprising means to move said sheet edgewise in a direction substantially perpendicular to said common row, a plurality of data sensing devices having sensing ends offset from each other in a direction corresponding to the direction of movement of said data containing sheet, there being a separate sensing device for each bit of data to be sensed whereby the bits of data may be sensed in serial relation, a trigger sensing device, an electrical pulse generator connected to said trigger sensing device and operative in response to a signal from said trigger sensing device to emit a train of electrical pulses, a data recording device electrically connected to each data sensing device, and means electrically connected to each data recording device to fed a pulse from said pulse generator to said recording device in synchronism with a pulse obtained from the data sensing device connected to said data a recording device, said pulse generator delivering electrical pulses at a rate corresponding to the rate of serial sensing of bits of data by said data sensing devices.

5. An apparatus useful for recording bits of data, such as marks, located in a common row on a data containing sheet, said apparatus comprising a plurality of phototubes having reading ends offset from each other whereby said common row may be brought opposite each reading end in succession, a plurality of magnetic induction heads corresponding in number to the number of phototubes, a plurality of coincidence gates electrically connected between said phototubes and said magnetic induction heads, there being a coincidence gate connected between each corresponding phototube and magnetic induction head, means to move said data containing sheet past and in proximity to the reading ends of said phototubes in a direction such that said reading ends sense the bits of data appearing in a common row on said data containing sheet in serial relation, and means electrically connected to said gates to deliver a succession of pulses to said gates, each gate receiving a single pulse from said means and said pulse appearing at said gate in synchronism with the passage of said common row under the reading end of the phototube connected to said gate whereby a pulse from said phototube will coincide with said pulse from said pulse feeding means connected to said gate, each magnetic induction head being energized upon a coincidence of two pulses to the gate associated with said magnetic induction head whereby said magnetic induction heads are energized in succession in accordance with the timing of said pulse feeding means.

6. An apparatus according to claim 5 wherein there is a plurality of phototube reading ends reading said common row at one instant of time, there is a corresponding number of magnetic induction heads, and there is a coincidence gate electrically connected between each corresponding phototube and magnetic induction head, said pulse feeding means being electrically connected to each gate to deliver a pulse to each gate simultaneously whereby a bit of data appearang in any one of a number of different positions in said common row may be recorded in a position correspoding to the position occupied by the bit of data in said common row.

7. An apparatus useful for counting the number of bits of raw data, such as marks, appearing in a plurality of successive rows in a raw data containing means which correspond in row position to bits of key data, such as marks, appearing in a corresponding number of successive rows in a key data containing means, said apparatus comprising a plurality of counters, counter selector means connected to each of said counters to select one of said counters at a time, means to examine bits of raw data in each raw data row in serial relation within said row, means to examine bits of key data in each corresponding key data row in corresponding serial relation within said key data row, means connecting said raw data examining means and said key data examining means to enter a count in a selected counter each time that a bit of raw data occupies a position in a raw data row corresponding to the row position occupied by the bit of key data with which said bit of raw data is being compared, a counter selector data source, and means connecting said counter selector means to said counter selector data source, said counter selector means being responsive to data from said counter selector data source to select a counter in advance of comparing each row of bits of raw data with a corresponding row of bits of key data whereby the count for each raw data row may be entered in a selected counter.

8. An apparatus useful for scoring multiple choice type examinations where the examinee's answer to each examination question is a mark in one of a set of positions on the examination sheet, there being a number of said sets of positions in a row on said examination sheet and there being a plurality of rows on said sheet, said apparatus comprising a plurality of phototubes corresponding in number to the total number of positions in each row on said examination sheet whereby a mark in any one of said positions may be sensed by a phototube, each phototube having a reading end, the reading ends of a set of phototubes corresponding in number to a set of positions in a row on said examination sheet being aligned and each succeeding set of aligned reading ends being offset from its preceding set of reading ends whereby a set of positions in said examination sheet row may come opposite a set of phototube reading ends at a separate instant of time from when the other sets of positions in said row come opposite phototube reading ends to enable a serial scanning of said sets of positions, a rotatable drum having a magnetizable surface, a plurality of aligned magnetic induction heads corresponding in number to the number of phototubes, means electrically connecting each phototube to its corresponding magnetic induction head, means to move a correct answer sheet past and in proximity to the reading ends of said phototubes, said correct answer sheet having a correct answer mark in one of each of the sets of positions in a common row on said correct answer sheet, means to energize a magnetic induction head each time that a correct answer mark is sensed by a corresponding phototube connected to said magnetic induction head to magnetize a discrete area on said magnetizable drum surface in a position corresponding to the position occupied by the correct answer mark on the correct answer sheet, a magnetic induction head in each set of magnetic induction heads corresponding to a set of phototubes being energized in succession whereby the magnetized discrete areas on the drum surface are offset circumferentially of the drum surface in a pattern corresponding to the offset of the sets of phototube reading ends, means electrically connectable between each phototube and its associated magnetic induction head to emit a signal when an examination sheet is passed in proximity to said phototube reading ends and a mark on said examination sheet occupies a positional arrangement correlated to the positional arrangement of the discrete areas on said drum surface, counter means, and means connecting said signal emitting means to said counter means to enter a count of the correct answers made by the examinee.

9. An apparatus useful for comparing the positions occupied by bits of raw data, such as marks, located in a row in a raw data containing means with the positions occupied by corresponding bits of key data, such as marks, located in a corresponding row in a key data containing means, said apparatus comprising means to examine bits of key data in succession, the bits of key data in the key data row being examined in serial relation proceeding from one end of the row to the other end of the row whereby each bit of key data is examined at a different instant of time from every other bit of key data, and means connected to said examining means to record the bits of key data so examined, said recording means including means to record each bit of key data in any one of a predetermined number of positions at the same instant of time.

10. An apparatus useful for comparing the positions occupied by bits of raw data, such as marks, appearing in a plurality of successive rows in a raw data containing means with the positions occupied by corresponding bits of key data, such as marks, appearing in a corresponding number of successive rows in a key data containing means, said apparatus comprising means to examine successive rows of bits of key data in succession, the bits of data in each key data row being examined in serial relation proceeding from one end of the row to the other end of the row whereby each bit of key data is examined at a different instant of time from every other bit of key data, means to record the bits of key data so examined, each bit of key data being recorded in a position in said recording means correlated to the position occupied by the bit of key data in said key data containing means, and means connected to said examining means and said recording means to energize said recording means at each instant of time that said examining means examines a bit of key data whereby bits of key data are recorded in the same sequence in which they are examined, said recording means including means to record each bit of key data in any one of a predetermined number of positions at the same instant of time.

11. An apparatus useful for recording correct answers to examination questions where the correct answers appear as marks on a correct answer sheet and said sheet contains a plurality of correct answer positions located in a plurality of rows and columns on said sheet, said apparatus comprising means to sense the correct answer marks in each row of correct answer positions on said correct answer sheet, a memory device capable of storing each correct answer mark as a bit of information, and means connecting said sensing means to said memory to enter bits of information in said memory as the correct answer marks are sensed by said sensing means, said information entering means entering bits of information into said memory in serial relation as each row of correct answer positions is sensed by said sensing means, said memory being capable of storing the bits of information entered for each row of correct answer positions as bits of information successively offset with respect to each other from a common line in said memory, and each offset bit of information being located in one of a predetermined number of column positions in said memory located in a line parallel to said common line in said memory, the column position occupied by each stored bit of information corresponding to the column position occupied by the corresponding correct answer mark on said correct answer sheet.

12. An apparatus useful for comparing the positions occupied by bits of raw data, such as marks, located in a common row on a raw data containing sheet with the positions occupied by bits of key data, such as marks, located in a plurality of rows on a key data containing sheet, each row position of said raw data sheet and said key data sheet being located in a common column position, said apparatus comprising a key data memory, memory recording and sensing means, data sensing members connected to said memory recording and sensing means, means operatively associated with said data sensing members to move said key data sheet and said raw data sheet is succession past and in proximity to said data sensing members, means connecting said data sensing members to said memory recording and sensing means to record bits of key data sensed by said sensing members in said key data memory in row and column positions correlated to the row and column positions occupied by said bits of key data on said key data containing sheet, said memory recording and sensing means being operable to sense the plural row recorded bits of key data in synchronism with the sensing of a single row of bits of raw data, and means connected to said data sensing members to emit a signal when a bit of raw data is sensed by said sensing members, said signal persisting in duration sufficiently long to enable a plurality of rows of recorded bits of key data to be sensed by said memory recording and sensing means.

13. An apparatus useful for obtaining a converted data total corresponding to a raw data total, said apparatus comprising means to store bits of raw data and bits of converted data according to a predetermined relation, a converted data counter, a raw data counter, converted data reading means operatively associated with said storage means to feed a signal to said converted data counter each time that said converted data reading means reading a bit of converted data stored in said storage means, raw data reading means operatively associated with said storage means to feed a signal to said raw data counter each time that said raw data reading means reads a bit of raw data, and means connecting said raw data counter to said converted data counter to block the feeding of signals to said converted data counter when a predetermined number of signals have been fed to said raw data counter.

14. An apparatus useful for obtaining a converted data total corresponding to a raw data total, said apparatus comprising a memory capable of storing bits of raw data and bits of converted data according to a predetermined relation, means operatively associated with said memory to read said stored bits of converted data in succession and produce an electrical pulse each time that a bit of converted data is so read, electrical gate means connected to said converted data reading means, a converted data counter connected to said gate means, said counter being capable of entering a count each time that an electrical pulse is fed thereto via said gate means, means operatively associated with said memory to read said stored bits of raw data and produce an electrical pulse each time that a bit of raw data is read by said raw data reading means, and means connecting said raw data reading means to said gate means to feed a pulse to said gate means when a predetermined number of bits of raw data have been read by said raw data reading means, said gate blocking further transmission of pulses from said converted data reading means to said counter when said gate receives a pulse from said raw data reading means.

15. An apparatus useful for obtaining a converted data total corresponding to a raw data total, said apparatus comprising a memory capable of storing bits of raw data and bits of converted data according to a predetermined relation, means operatively associated with said memory to read bits of converted data in succession and produce an electrical pulse each time that a bit of converted data is so read, means operatively associated with said memory to read bits of raw data and produce an electrical pulse each time that a bit of raw data is so read, a converted data counter capable of entering a count each time that said counter receives an electrical pulse, an electrical gate connected between said converted data reading means and said converted data counter to transmit electrical pulses from said converted data reading means to said converted data counter, a raw data counter connected to said raw data reading means, said raw data counter being capable of entering a count each time that said raw data counter receives an electrical pulse from said raw data reading means, and means connecting said raw data counter to said electrical gate to feed an electrical pulse to said electrical gate when said raw data counter has received a predetermined number of electrical pulses from said raw data reading means.

16. An apparatus useful for obtaining a converted data total corresponding to a raw data total, said apparatus comprising a cyclic memory capable of storing bits of raw data and bits of converted data, means operatively associated with said memory to enter bits of raw data and bits of converted data in said memory according to a predetermined relation and during a portion of a memory cycle, said converted data entering means also being operative to read bits of converted data stored in said memory, a raw data counter capable of being actuated by electrical pulses, means connected to said raw data counter to feed pulses to said raw data counter during another portion of said memory cycle, a converted data counter capable of being actuated by electrical pulses, means connecting said converted data entering means to said converted data counter to feed an electrical pulse from said converted data entering means to said converted data counter each time that said converted data entering means reads a bit of converted data stored in said memory, and means connected to said converted data counter to block the feeding of pulses to said converted data counter during a portion of a memory cycle which is subsequent to the portion during which electrical pulses were initially fed to said raw data counter.

17. An apparatus useful for obtaining a converted data total corresponding to a raw data total, said apparatus comprising a cyclic memory, means operatively associated with said memory to enter bits of raw data and bits of converted data into said memory according to a predetermined relation and during a portion of a memory cycle, said means being operative to read said stored bits of raw data and converted data during subsequent memory cycles, said reading means furnishing a signal each time that a bit of converted data is read thereby, means to compare other bits of raw data with bits of key data during a portion of a memory cycle different from the portion during which said raw data and converted data relation is recorded, and means connected to said comparing means and to said memory reading means to block the furnishing of signals by said memory reading means.

18. An apparatus useful for obtaining a converted data total corresponding to a raw data total, said apparatus comprising a memory movable through a plurality of repetitive cycles, means operatively associated with said memory to enter bits of raw data and bits of converted data into said memory according to a predetermined relation and during a portion of a single memory cycle, said means also being operative to read said recorded bits of raw data and recorded bits of converted data during a subsequent memory cycle, a raw data counter, means connected to said raw data counter to enter counts in said counter during a portion of a memory cycle different from the portion during which said raw data and converted data relation was stored, a converted data counter, means connecting said reading means to said converted data counter to actuate said converted data counter each time that a bit of converted data is read by said reading means, and means connecting said raw data counter to said connecting means to block actuation of said converted data counter by said memory reading means.

19. An apparatus useful for comparing bits of raw data with bits of key data, obtaining a count of the number of bits of raw data which correspond to bits of key data, and converting said count into a converted data count, said apparatus comprising means to store a plurality of bits of key data, means to examine in sequence bits of raw data, means connected between said examining means and said storage means to compare each bit of raw data with a bit of key data, a raw data counter, means connecting said raw data counter to said comparing means to energize said counter each time that a bit of raw data corresponds to a bit of key data with which it is being compared, a converted data counter, means associated with said storage means to actuate said converted data counter after said comparison between bits of raw data and bits of key data is completed, and means connecting said raw data counter to said converted data counter to stop said converted data counter in accordance with the count contained by said raw data counter.

20. An apparatus useful for obtaining a converted data total corresponding to a raw data total, said apparatus comprising a magnetic drum, a plurality of magnetic induction heads operatively associated with said drum, a first phototube station, a second phototube station spaced from said first phototube station, means associated with said phototube stations to move a sheet containing marks representing bits of raw data and bits of converted data according to a predetermined relation past and in proximity to one of said phototube stations, means connecting said one phototube station to said magnetic induction heads to record said bits of raw and converted data in said magnetic drum according to the relation occupied by the marks representing said bits of data appearing on the sheet moved past and in proximity to said one phototube station, a raw data counter, means connecting said raw data counter to the other phototube station and said magnetic induction heads to energize said raw data counter when a sheet containing marks representing bits of raw data is moved past and in proximity to the other phototube station, a converted data counter, means connecting said magnetic induction heads to said converted data counter to actuate said converted data counter each time that said magnetic induction heads read a stored bit of converted data, and means connecting said raw data counter to said converted data counter to stop actuation of said converted data counter in accordance with the count contained by said raw data counter.

21. An apparatus useful for obtaining the frequency distribution of raw data totals such as a succession of test scores, said apparatus comprising a test score counter, a magnetic tape, a magnetic induction head positioned adjacent said magnetic tape, means movably supporting said magnetic induction head for movement with respect to said magnetic tape, means connected to said counter to enter a succession of raw data totals in said counter, means connecting said counter to said magnetic induction head to energize said magnetic induction head when each raw data total has been entered in said counter, and means connected to said magnetic induction head to move said magnetic induction head at a uniform rate of speed whereby a series of discrete areas may be magnetized in said magnetic tape, said areas being disposed in said tape in a pattern indicative of the magnitudes of the raw score totals with all discrete areas representing the same raw data total being located in a common row in said magnetic tape.

22. An apparatus useful for processing alphabetic or numeric data wherein each letter or numeral is represented by a bit of raw data occupying a predetermined position in a raw data containing means, said apparatus comprising a memory capable of storing bits of code data representing letters of the alphabet and numerals, each letter or numeral being represented by one or more stored code bit, means operatively associated with said memory to enter said bits of code data in said memory, said code data entering means being capable of being switched to become code data reading means capable of reading the bits of code data entered in said memory, means to read said bits of raw data, switching means connected to said code data entering means and operable to switch said code data entering means to code data reading means, said code data reading means being capable of reading bits of code data entered in said memory simultaneously with the reading of bits of raw data by said raw data reading means, data comparing means connectible between said raw data reading means and said code data reading means, a printer, and printer controlling means connecting said printer to said data comparing means.

23. An apparatus useful for processing alphabetic or numeric data wherein each letter or numeral is represented by a bit of raw data in a raw data containing means, said apparatus comprising a memory capable of storing bits of code data representing different letters and numerals, means operatively associated with said memory to enter said bits of code data in said memory, said code data entering means being capable of being switched to become code data reading means, switching means connected to said code data entering means to switch said code data entering means to code data reading means, said code data reading means being capable of emitting signals representing, in accordance with the code employed, the coded letters and numerals being read by said code data reading means, gate means connectible to and capable of passing signals fed to said gate means by said code data reading means, means to read said bits of raw data, means connecting said gate means to said raw data reading means, said raw data reading means being capable of emitting signals as bits of raw data are read by said raw data reading means, said raw data signals controlling the passage of code data signals by said gate means, a printer, and means connecting said printer to said gate means to control said printer in accordance with the output of said gate means.

24. An apparatus according to claim 23 wherein there is a storage counter connected between said gate means and said printer and said printer is controlled by said storage counter.

25. An apparatus useful for obtaining the frequency distribution of raw data totals such as a succession of test scores, said apparatus comprising a counter, a recording medium, a plotting means positioned adjacent said recording medium, said plotting means being operable when energized to enter a bit of information in said recording medium, means movably supporting said plotting means for movement with respect to said recording medium, means connected to said counter to enter a succession of raw data totals in said counter, means connecting said counter to said plotting means to energize said plotting means when each raw data total has been entered in said counter, and means connected to said plotting means to move said plotting means at a uniform rate of speed whereby a series of bits of information may be entered in said recording medium, said bits of information being disposed in said recording medium in a pattern indicative of the magnitudes of said raw data totals with all bits of information representing the same raw data total being located in a common row in said recording medium.

26. An apparatus useful for obtaining the frequency distribution of raw data totals such as a succession of test scores, said apparatus comprising a test score counter, a rotatable drum having a magnetizable surface, a magnetic induction head positioned adjacent said surface, means movably supporting said induction head for movement with respect to said surface in a direction parallel to the axis of rotation of said drum, means connected to said counter to enter a succession of raw data totals in said counter, means connecting said counter to said magnetic induction head to energize said magnetic induction head when each raw data total has been entered in said counter, and means connected to said magnetic induction head to move said magnetic induction head at a uniform rate of speed whereby a series of discrete areas may be magnetized in said drum surface, said areas being disposed in said drum surface in a pattern indicative of the magnitudes of the raw score totals with all discrete areas representing the same raw data total being located in a common row in said drum surface.

27. An apparatus useful for obtaining the frequency distribution of a succession of bits of raw data located on a raw data containing medium and representing the answers to a series of test questions, said apparatus comprising a recording medium, a plotting means positioned adjacent said recording medium and operative to enter a bit of information in said recording medium each time that said plotting means is energized, means movably supporting said plotting means for movement with respect to said recording medium, raw data sensing means, means for moving a plurality of said raw data containing mediums past and in proximity to said raw data sensing means, said raw data sensing means being operable to sense the bits of raw data on a raw data containing medium in succession as said raw data containing medium is moved past and in proximity to said sensing means, means connecting said raw data sensing means to said plotting means to energize said plotting means to enter a bit of information in said recording medium each time that said raw data sensing means senses a bit of raw data in a predetermined position on a raw data containing medium which is being moved past and in proximity to said raw data sensing means, and means connected to said plotting means to move said plotting means at a uniform rate of speed relative to said recording medium, whereby a series of bits of information may be entered in said recording medium, the bits of information recorded in said recording medium representing the correct answers to the same test question in each raw data containing medium being located in a common row in said recording medium whereby the number of said correct answers to said particular test question may be determined readily.

28. An apparatus according to claim 27, wherein said recording medium is a rotatable drum having magnetizable surface, said plotting means is a magnetic induction head, and said magnetic induction head moves parallel to the axis of rotation of said drum.

29. An apparatus useful for comparing the positions occupied by bits of raw data, such as marks, in a raw data containing means, with the positions occupied by corresponding bits of key data, such as marks, in a key data containing means, said apparatus comprising sensing means, means to automatically feed said key data containing means and said raw data containing means in succession past and in proximity to said sensing means, a memory, memory recording and reproducing means, means connecting said sensing means to said memory recording and reproducing means to record bits of key data in said memory as said key data containing means is fed past said sensing means, said bits of key data being recorded in the sequence in which they are sensed by said sensing means and said memory recording and reproducing means being operable to record each bit of key data in one of a predetermined number of positions in a row in said memory, and means to compare the position occupied by each bit of raw data in the raw data containing means with the position in said memory occupied by the corresponding bit of key data, said comparing means including means connectible between said sensing means and said memory recording and reproducing means to enable said sensing means to sense a bit of raw data while said recording and reproducing means simultaneously reads the corresponding recorded bit of key data to determine whether the position occupied by said bit of raw data in the raw data containing means compares in position to the memory position occupied by the corresponding recorded bit of key data.

References Cited in the file of this patent

UNITED STATES PATENTS

| | | |
|---|---|---|
| 2,010,653 | Warren | Aug. 6, 1935 |
| 2,150,256 | Warren | Mar. 14, 1939 |
| 2,310,437 | Johnson | Feb. 9, 1943 |
| 2,476,449 | McDonnell | July 19, 1949 |
| 2,527,469 | Vernon et al. | Oct. 24, 1950 |
| 2,687,253 | McMillan | Aug. 24, 1954 |
| 2,700,503 | Crosman | Jan. 25, 1955 |
| 2,721,990 | McNaney | Oct. 25, 1955 |
| 2,738,925 | Lapham et al. | Mar. 20, 1956 |
| 2,789,759 | Tootill et al. | Apr. 23, 1957 |